US008887363B2

(12) United States Patent
Boyes et al.

(10) Patent No.: US 8,887,363 B2
(45) Date of Patent: Nov. 18, 2014

(54) UNIVERSAL TOOL MOUNTING SYSTEM FOR A MACHINING CENTRE

(76) Inventors: Barrie John Boyes, Lower Hutt (NZ); David Aaron Boyes, Lower Hutt (NZ)

(*) Notice: Subject to any disclaimer, the term of this patent is extended or adjusted under 35 U.S.C. 154(b) by 917 days.

(21) Appl. No.: 13/058,326

(22) PCT Filed: Aug. 7, 2009

(86) PCT No.: PCT/NZ2009/000159
§ 371 (c)(1),
(2), (4) Date: Feb. 9, 2011

(87) PCT Pub. No.: WO2010/019054
PCT Pub. Date: Feb. 18, 2010

(65) Prior Publication Data
US 2011/0137452 A1    Jun. 9, 2011

(30) Foreign Application Priority Data
Aug. 11, 2008  (NZ) ........................... 570391

(51) Int. Cl.
*B23P 23/02*   (2006.01)
*B23B 29/32*   (2006.01)
*B23B 11/00*   (2006.01)
*B23B 29/24*   (2006.01)
*B23B 3/16*    (2006.01)
*B23Q 39/02*   (2006.01)

(52) U.S. Cl.
CPC ............ *B23B 29/242* (2013.01); *B23B 29/323* (2013.01); *B23B 3/165* (2013.01); *B23B 2220/40* (2013.01); *B23B 2260/004* (2013.01); *B23Q 39/024* (2013.01); *Y10S 29/05* (2013.01); *Y10S 82/90* (2013.01)
USPC ............... 29/36; 29/40; 29/DIG. 50; 29/27 C; 82/900

(58) Field of Classification Search
CPC .......... B23B 3/165; B23B 3/065; B23B 3/162
USPC ......... 29/36, 40, 39, DIG. 50, DIG. 54, 27 C, 29/27 R; 82/159, 900; 483/24–25
See application file for complete search history.

(56) References Cited

U.S. PATENT DOCUMENTS 3,355,797 A * 12/1967 Lohneis ........................... 483/66
3,726,363 A *  4/1973 Sussman ....................... 184/39.1

(Continued)

FOREIGN PATENT DOCUMENTS

| EP | 1543917 B1 | 3/2007 |
|----|------------|--------|
| WO | WO-03/006203 A1 * | 1/2003 |
| WO | WO-2007/012351 A1 * | 2/2007 |

OTHER PUBLICATIONS

International Search Report for PCT/NZ2009/000159, Completed by the Korean Patent Office Apr. 9, 2010, 3 Pages.

*Primary Examiner* — Erica E Cadugan
(74) *Attorney, Agent, or Firm* — Brooks Kushman P.C.

(57) ABSTRACT

A universal tool mounting system for a machining center relates to CNC machine tools, comprising a main drum into which mounts a plurality of tool holder unit stations, these create a platform to attach, mount and interchange tool holder units on each station, where each tool holder unit is chosen from a designed selection which can turn, mill, bore, drill and rapidly machine components with multicut tools or alternately each performs a combination of these operations and each holds a plurality of tools. The main drum is indexed to position the tool holder unit station with the attached tool holder unit to the operative position, then the tool holder unit station is indexed to position a selected tool to the machining position. The tool holder unit stations also provide live tooling functions to any attached live tooling tool holder units. Tool holder unit stations can also be preindexed.

24 Claims, 58 Drawing Sheets

(56) References Cited

U.S. PATENT DOCUMENTS

| | | | |
|---|---|---|---|
| 4,051,750 A * | 10/1977 | Berly | 29/36 |
| 4,057,881 A * | 11/1977 | Stephens | 29/36 |
| 4,843,691 A * | 7/1989 | Hafla et al. | 29/36 |
| 5,044,055 A | 9/1991 | Howarth et al. | |
| 6,716,146 B2 * | 4/2004 | Kato | 483/58 |
| 7,143,489 B1 | 12/2006 | Giebmanns | |
| 8,707,528 B2 * | 4/2014 | Ozdyk et al. | 29/36 |
| 2005/0091812 A1 | 5/2005 | Hiramoto et al. | |

* cited by examiner

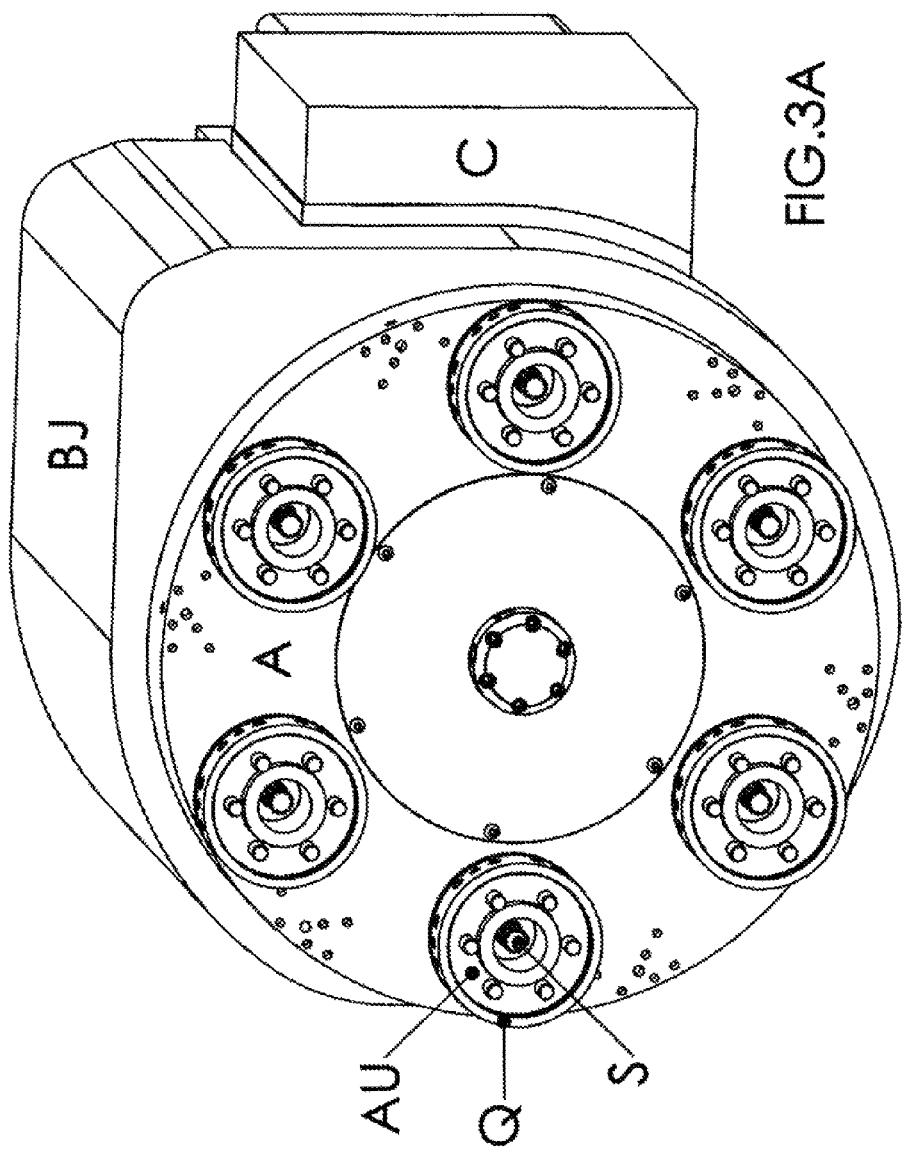

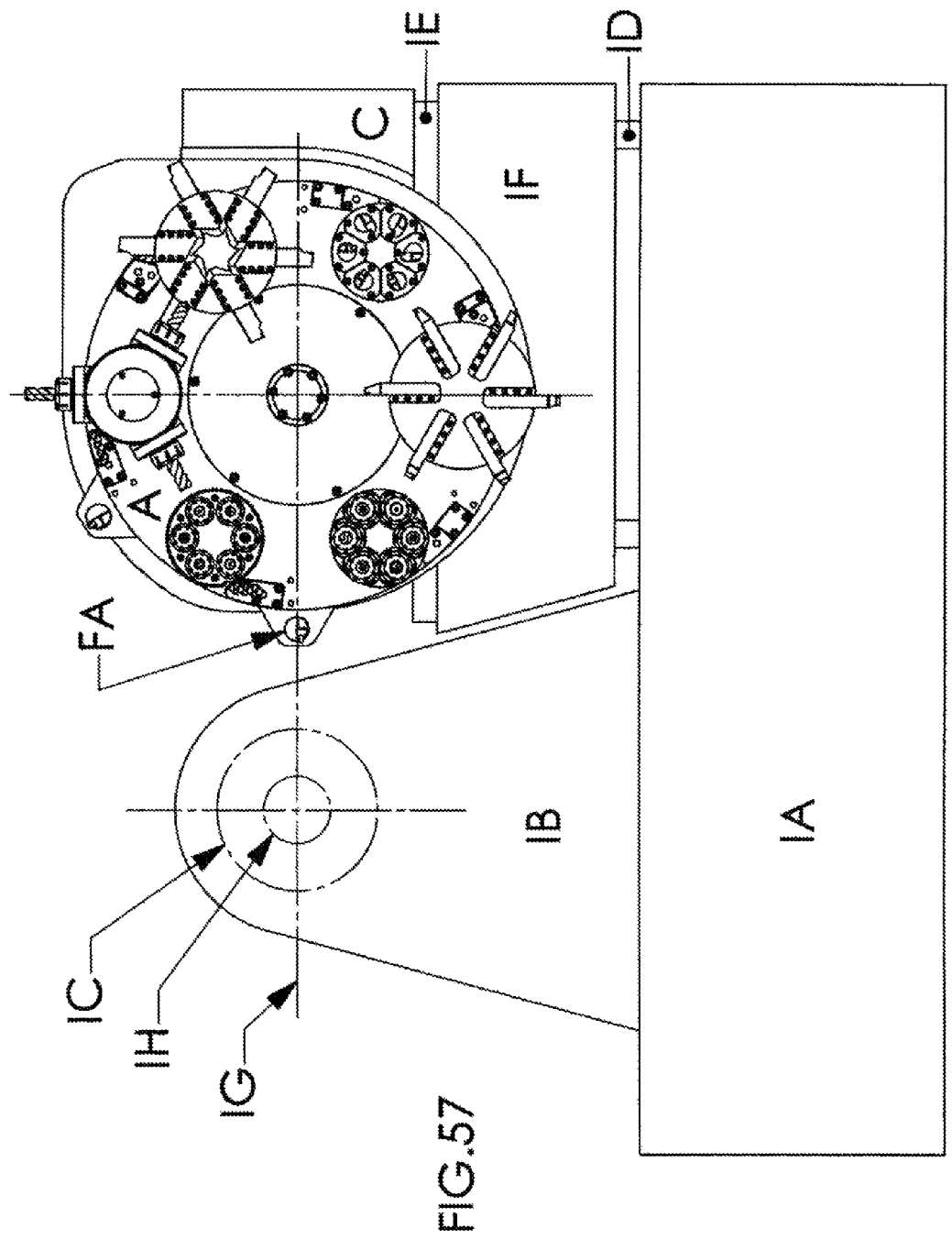

UNIVERSAL TOOL MOUNTING SYSTEM FOR A MACHINING CENTRE

CROSS-REFERENCE TO RELATED APPLICATION

This application is the U.S. national phase of PCT Application. No. PCT/NZ2009/000159 filed Aug. 7, 2009 which claims priority to New Zealand application NZ 570391 filed Aug. 11, 2008, the disclosure of which is incorporated in its entirety by reference herein.

The universal tool mounting system for a machining centre relates to CNC machine tools that are used to machine components and workpieces of multiple material types throughout the engineering industry. Current CNC lathe turret designed machine tools are restricted by the number, selection and arrangement of tools positioned on their turrets due to the design layout of them. This type of tooling layout and the amount of tools on them limits the time the lathe can remain in productive operation. This is due to the need to replace worn cutting tools that affect the production tolerances and quality of the surface finish on the machined component or workpiece. Production time is lost due to the replacement and resetting of a new compliment of cutting tools in these machines and then the recommencement of production again, which is a reoccurring operational sequence during the productive life of this type of machine design.

The limited number of tools that can be accommodated on all current CNC lathe turret designs restricts the versatility and types of cutting tools that can be set up on the lathe turret which restricts its ability to machine complex components in some circumstances. The layout of tools on current turret designed lathes also restricts the ability to mount customized tooling systems with variable tooling configurations and functions on them. The limited number of tools on a CNC turret lathe usually causes it to be set up to machine only one component at once, which restricts the function ability of this type of design.

The main objective of the universal tool mounting system for a machining centre is to mount a plurality of indexable tool holder unit stations in a main turret, to create a platform to attach and mount and interchange tool holder units on each one, wherein each tool holder unit holds a plurality of tools And to index the main turret so that the tool holder unit stations and any attached and mounted tool holder unit or another tool mounted on the main turret can be rotationally positioned. The tools in each tool holder unit are selected, attached, mounted and interchanged to suit the operational machining procedures to be performed on components and workpieces. Tool holder units with driven tooling functions known as live tooling can also be used and attached to the tool holder unit stations. A chosen selection of tool holder units can be designed, manufactured and sold as a set to compliment the machine. Tool holder units can also be custom designed and built to mount onto the tool holder unit stations. Internal assemblies and componentry mounted within the universal tool mounting system for a machining centre at a chosen position provides two main functions to a tool holder unit station in the main turret when it engages into it. The first function indexes the attached tool holder unit to a desired rotational position. The second function provides the driving means to any attached live tooling tool holder unit so that the tools mounted in it are driven around at the desired machining speed.

A further objective of the universal tool mounting system for a machining centre is to mount a plurality of live tooling multiple milling, drilling and tapping tool holder units to the tool holder unit stations. A live tooling multiple milling, drilling and tapping combination tool holder unit can also be mounted to the tool holder unit stations.

A further objective of the universal tool mounting system for a machining centre is to preindex a tool holder unit station and the attached and mounted tool holder unit, this occur via internal assemblies and componentry mounted within the universal tool mounting system for a machining centre at a chosen position by engaging into it.

A further objective of the universal tool mounting system for a machining centre is to attach and mount a tool holder unit to a tool holder unit station with a selection of tools mounted in it that will completely machine a component by only using this tool holder unit. The universal tool mounting system for a machining centre with tool holder units attached and mounted on to it gives a large increase in the tool capacity in the way the tools are configured on it. This vast increase in the number of tools increases the machines operational time and the tool life is used more efficiently, to give higher sustained accuracy and surface finish on all components and workpieces to give optimum quality control and delivery.

FIELD OF INVENTION

A Multicut Turning Unit M9 relates to CNC machine tools and conventional machine tools that are used to turn components of multiple material types throughout the engineering industry.

Problem which Invention Solves

The Multicut Turning Unit M9 solves three problems of which:

Firstly in turning operations in machine tools the tools used are set to the optimal depth of cut or the desired depth of cut to remove material from off the outside diameter of a component. After the depth of cut is set the tool is guided longitudinally relative to the work piece axis to remove the material. This procedure can be described as the first roughing cut to a component or workpiece with a tool. Sequential roughing cuts follow to further rough down a component or workpiece to a roughed profile and shape before a finishing cut is turned onto the component or workpiece.

Secondly in thread cutting in machine tools preferably lathes the thread is produced by mainly the thread chasing method. In this method here, a tool is used which comprises only one single tooth shaped cutting edge with a profile adapted to that of the thread to be produced and which is advanced in accordance with the pitch of the thread in the direction of the workpiece spindle axis. The thread is produced in several runs, between which the tool is fed in a radial direction. This method produces a high quality thread, but it is time consuming since more than half of the work time is required for the radial and axial retraction and also for the radial feed of the tool.

Thirdly in general machine tools don't perform bar peeling operations as a result there is a restriction on how fast material is turned from off the diameter of a component or workpiece. While performing turning operations these machine tools generally use one tool, here the tool is advanced in the direction of the workpiece spindle axis at an optimal feed rate and radial depth to turn the component or workpiece.

Objective

It is the principle objective of the Multicut Turning Unit M9 to facilitate the turning of multiple diameters on a component in which a stepped profile of different reduced diameters is produced longitudinally in one passing cut of the unit like seen in FIG. 38.

It is another objective of the Multicut Turning Unit M9 to rapidly cut a thread on a component.

It is another objective of the Multicut Turning Unit M9 to perform bar peeling operations where multiple tools are used to rapidly turn a component to a single reduced diameter at very high feed rates like seen in FIG. 39.

FIELD OF INVENTION

The Multicut Boring Bar Unit M10 relates to CNC machine tools and conventional machine tools that are used to bore holes in components or workpieces of multiple material types throughout the engineering industry.

Problem which Invention Solves

The Multicut Boring Bar Unit M10 solves three problems of which:

Firstly in boring operations in machine tools the tools used are set to the optimal depth of cut or the desired depth of cut to remove material from off the internal bore of a component or workpiece. After the depth of cut is set the tool is guided longitudinally relative to the workpiece or components axis to remove the material.

This procedure can be described as the first roughing cut to a component or workpiece with a tool. Sequential roughing cuts follow to further bore out a component or workpiece to a roughed profile and shape before a finishing cut is bored into the component or workpiece.

Secondly in internal thread cutting in machine tools preferably lathes the thread is produced in many ways with the thread chasing method being one of these.

In the thread chasing method a boring bar which only comprises a single tooth shaped cutting edge tip insert, with a profile adapted to that of the thread to be produced and which is advanced in accordance with the pitch of the thread in the direction of the workpiece spindle axis. The internal thread is produced in several runs, between which the tool is fed in a radial direction. This method produces a high quality thread but it is time consuming since more than half the work time is required for the radial and axial retraction and also for the radial feed of the tool.

Thirdly in general machine tools don't perform bore peeling operations as a result there is a restriction on how fast material is bored from off the internal diameter bore in a component or workpiece. While performing boring operations these machine tools generally use one tool, here the tool is advanced in the direction of the workpiece spindle axis at an optimal feed rate and radial depth to bore the component or workpiece.

Objective

It is the principle objective of the Multicut Boring Bar Unit M10 to facilitate the boring of multiple diameter bores in a component or workpiece in which a stepped profile of different increased diameter bores is produced longitudinally in one passing cut of the unit like seen in FIG. 50.

It is another objective of the Multicut Boring Bar Unit M10 to rapidly cut a partial depth thread or complete depth thread in a component or workpiece.

It is another objective of the Multicut Boring Bar Unit to perform bore peeling operations where multiple tools are used to rapidly bore a hole in a component or workpiece to a single increased diameter at very high feed rates like seen in FIG. 51.

BRIEF DESCRIPTION OF THE DRAWINGS

One preferred form of the invention will now be described with reference to the accompanying drawings, of which;

FIG. 3A Shows a front side view of the universal tool mounting system for a machining centre.

FIG. 57 Shows an end view of the universal tool mounting system for a machining centre mounted on a CNC lathe configuration with one of the extra tools mounted on it in the machining position.

Figure 1:
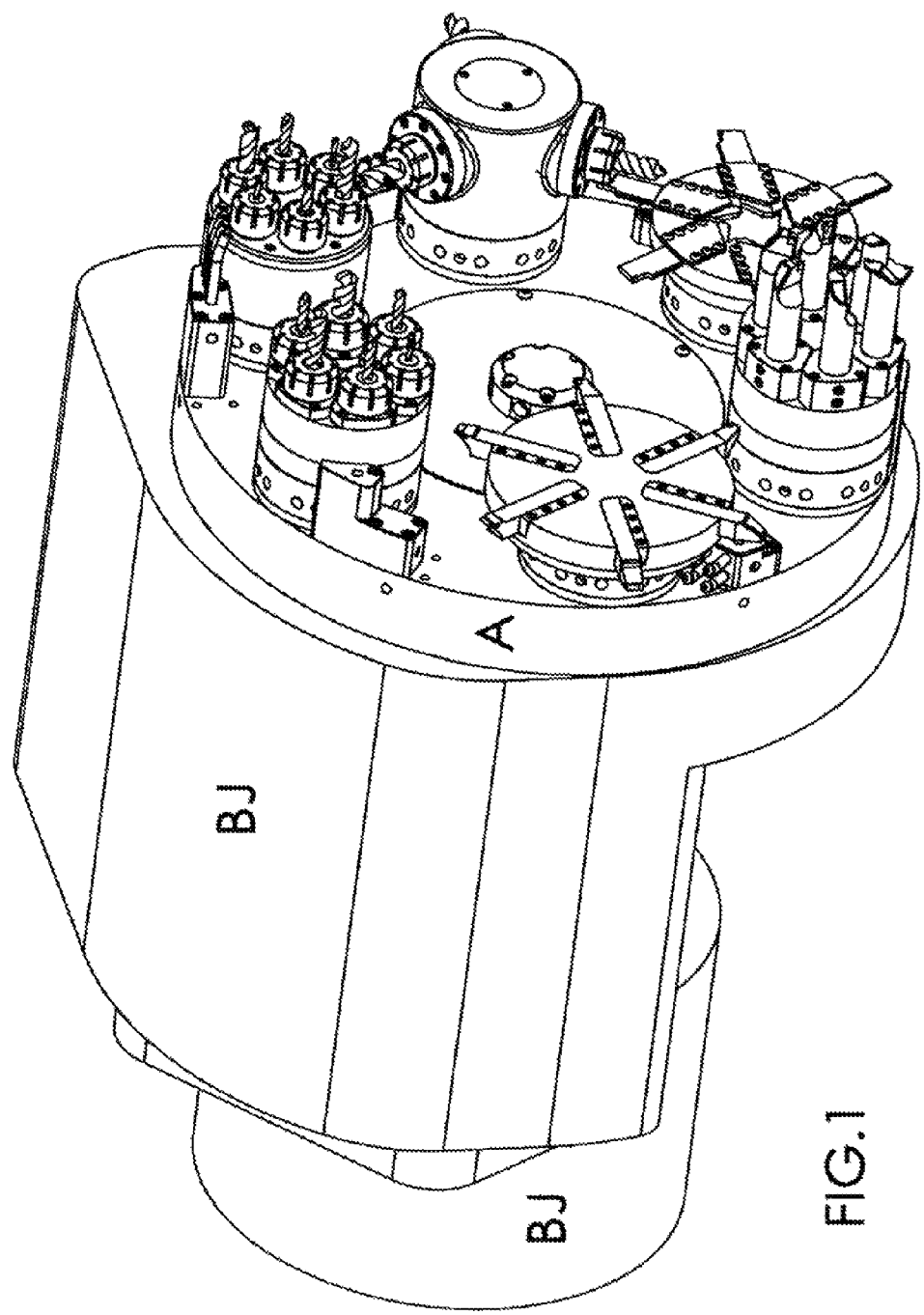
FIG. 1 Shows a front side view of the universal tool mounting system for a machining centre with tool holder units and coolant manifold blocks attached and mounted onto it.

In the embodiment the universal tool mounting system for a machining centre shown in FIG. 1, FIG. 2, FIG. 3 and FIG. 3A there are 7 main assemblies namely, hydraulic cylinder G, coolant manifold blocks AR, hydraulic cylinder L, tool holder unit station H, spindle and index drive unit W, index drive unit AE and the magnetic brake drum assembly. There are also 13 main components namely, drum A, spindle B, casting C, servo gear drive motor AK, linear guideways BH, servo motor AD, hydraulic and distribution plates AY, brake and pulley drum BE, pillars AO, pipes AS, endplate AP, endplate BC and sheet metal covers BJ. Attaching and mounting and interchanging to the tool holder units stations H in a universal tool mounting system for a machining centre are the tool holder units. These are shown in FIG. 23 to FIG. 30 and FIG. 33 to FIG. 44 and FIG. 45 to FIG. 51. A selection of these tool holder units can be designed and manufactured and can consist of the following types shown in 10 assemblies namely, The cutting tool unit M1, the parting blade unit M2, the ninety degree milling unit M3, the cutting tool unit M4, the milling unit M5, the turning unit M6, the milling unit M7, the multiple tool type tool holder unit M8, the multicut turning unit M9 and the multicut boring bar unit M10. The components are all made of a suitable metal or material to achieve the full design function of the universal tool mounting system for a machining centre. The universal tool mounting system for a machining centre may consist of more than one of the above components and assemblies.

The embodiment of a universal tool mounting system for a machining centre is also shown mounted on an example CNC lathe configuration in FIG. 52 to FIG. 57 and shows the components and assemblies namely, bed IA, headstock IB, Workpiece chuck IC, Linear guideway ID, Linear guideway IE, Carriage IF and a universal tool mounting system for a machining centre. Casting C of a universal tool mounting system for a machining centre is the main body of the whole assembly shown in FIG. 1, FIG. 2, FIG. 3 and FIG. 3A in which all other components and sub assemblies connect into and onto. Some of the following features in casting C are described as follows. There is the main hole BQ running through casting C in which spindle B is mounted into, with two cavities in the front and back face of casting C to mount the bearings D into. Into the back face of casting C there is the hole BK for the servo gear drive motor AK to mount into and on two calculated diameter hole circles from the centre of the main central hole BQ for spindle B are several holes in a random position or evenly spaced pattern. These holes are used to secure the hydraulic and distribution plates AY to the back face of casting C (The hole circle is the circle determined by the position(s) of the hole(s), the centre of every hole lies on the circumference of the hole circle). In the back face of casting C are the holes BR located on two calculated diameter hole circles from the centre of the main hole BQ in a random position or evenly spaced pattern. The holes BR inside casting C run from there to the hydraulic cylinders G mounted in the front face of casting C.

Figure 4:
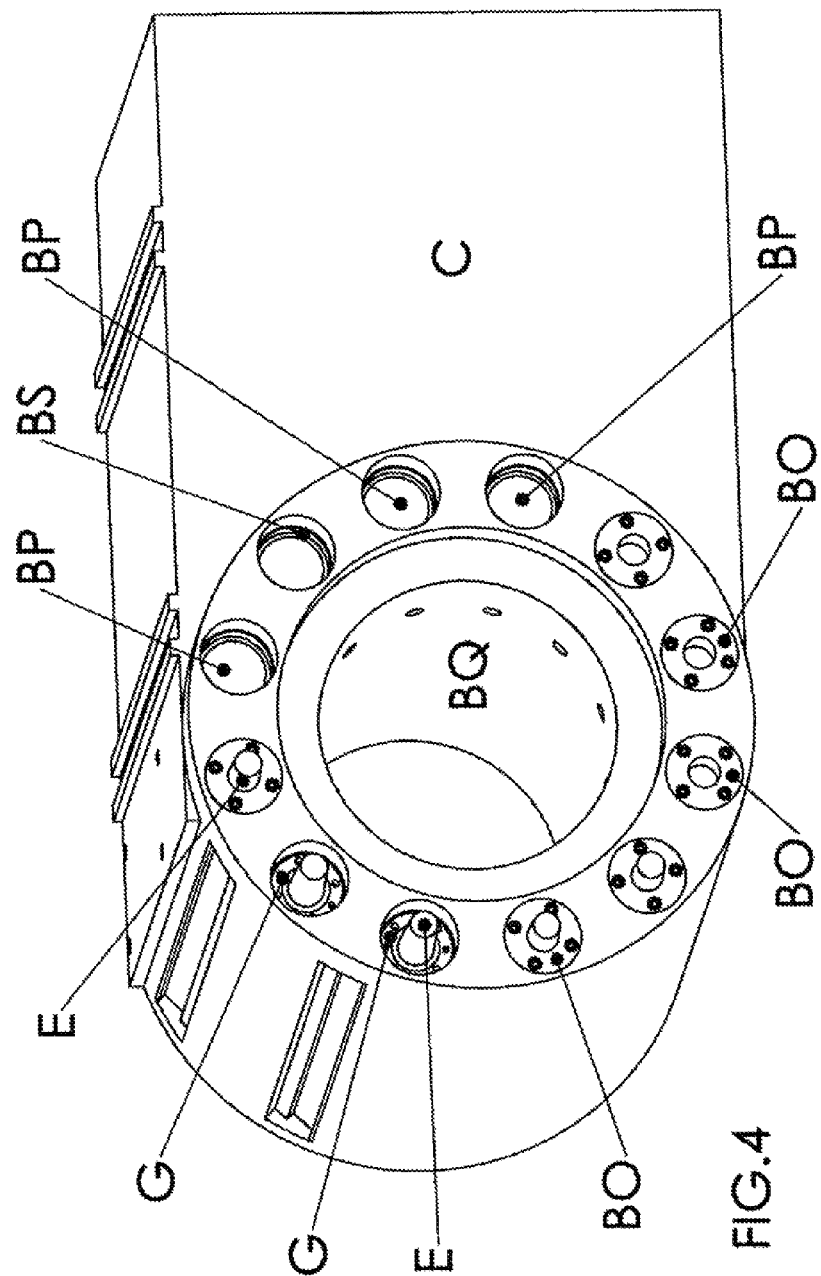
FIG. 4 Shows a front side view of the partially assembled universal tool mounting system for a machining centre shown in FIG. 1 and FIG. 2 showing casting C with some of the hydraulic cylinders G mounted inside it and the tapered bush BO mounted into the cavity in front of them.
Figure 5:
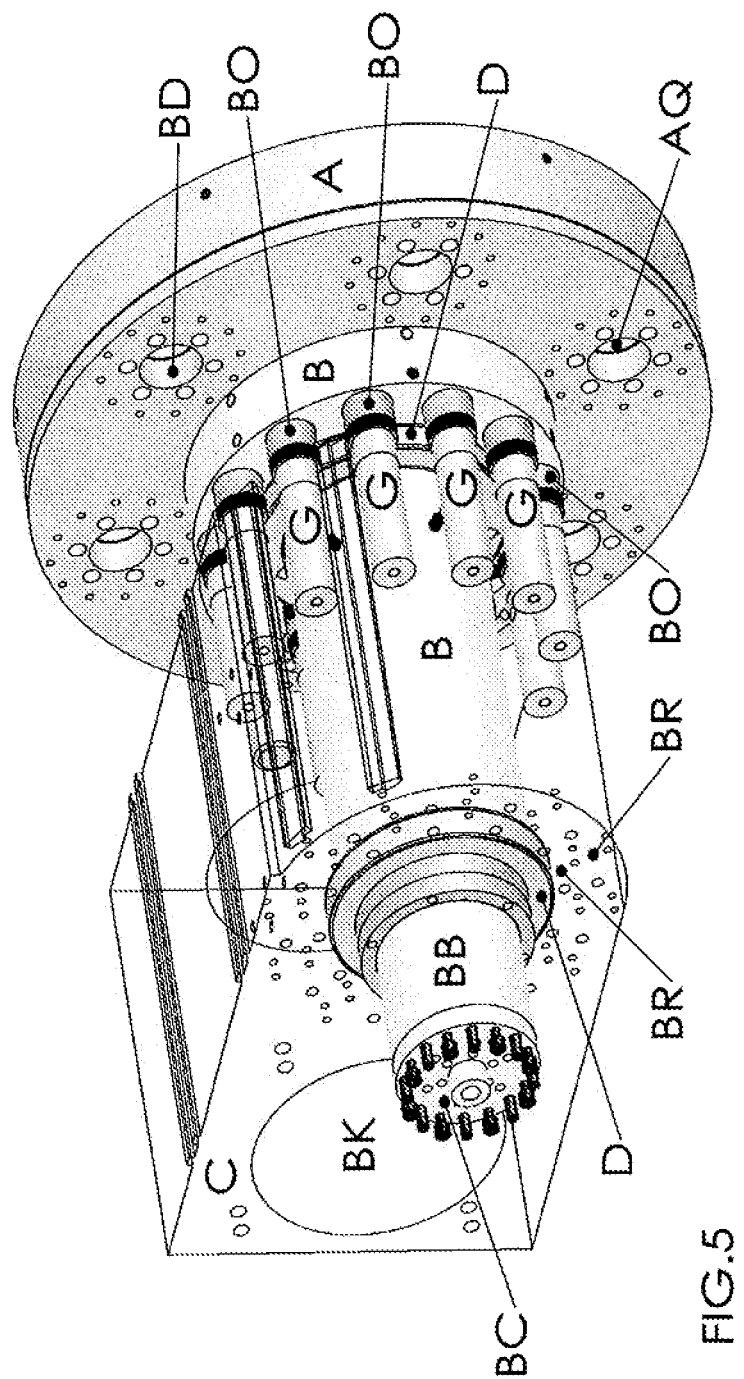
FIG. 5 Mainly shows a back side view of the partially assembled universal tool mounting system for a machining centre shown in FIG. 1 and FIG. 2 with casting C showing as transparent, hydraulic cylinder G mounted in casting C, tapered bush BO mounted in casting C in front of G, spindle B mounted in casting C, with drum A attached.
Figure 6:
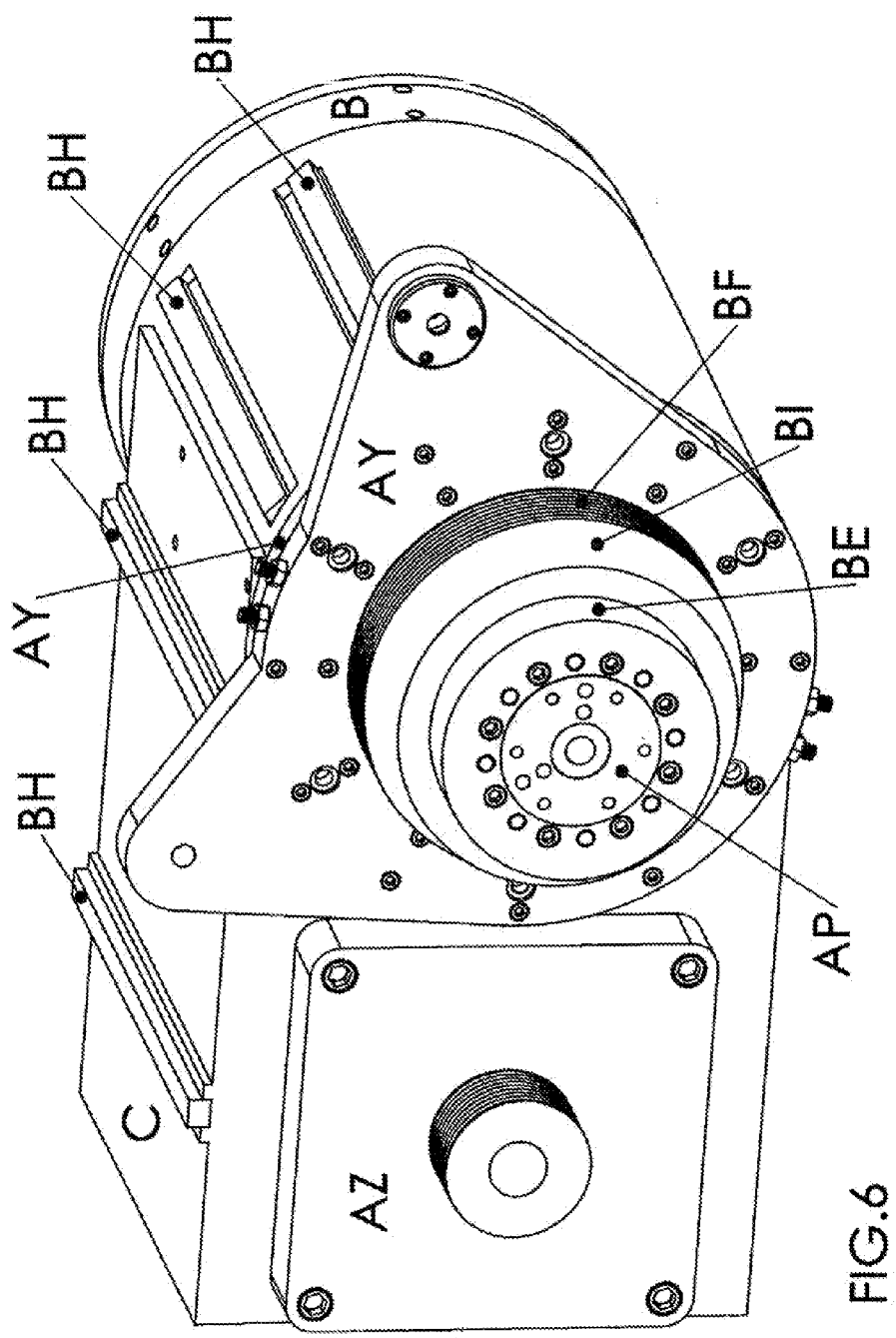
FIG. 6 Mainly shows a back side view of the partially assembled universal tool mounting system for a machining centre shown in FIG. 1 and FIG. 2 with spindle B mounted in casting C, the brake and pulley drum BE attached to the back of spindle B, the endplate AP, the hydraulic and distribution plates AY attached to the back of casting C, the servo gear drive motor Ak's driving shaft with attached pulley seen in front of the motor mounting plate AZ, the motor mounting plate AZ mounted into the back of casting C and the linear guideways BH.
Figure 7:
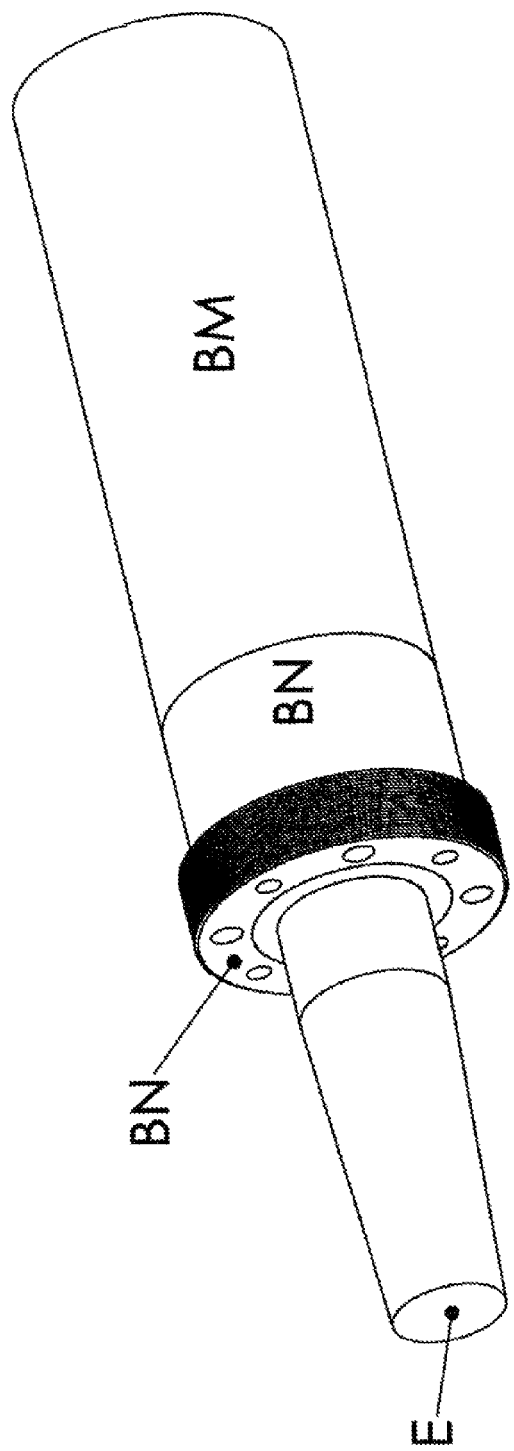
FIG. 7 Shows the hydraulic cylinder G.
Figure 8:
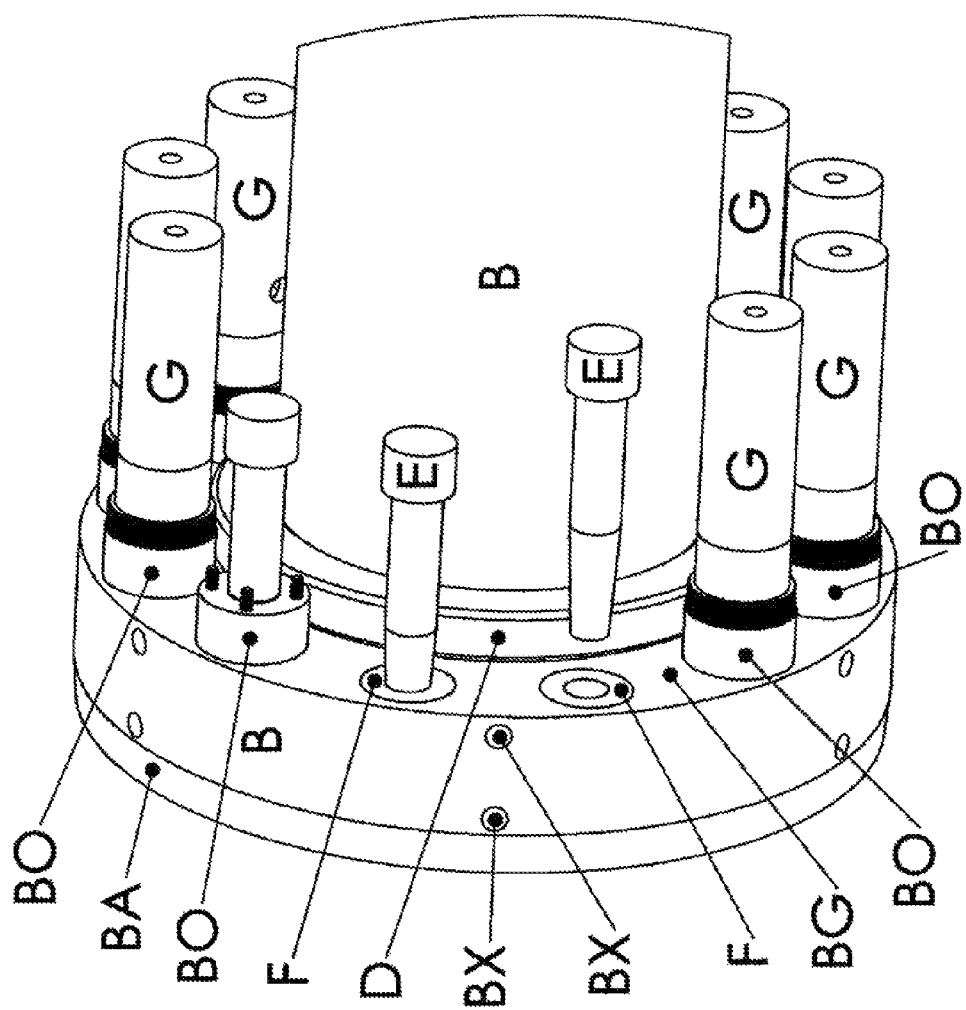
FIG. 8 Shows a back side view of the partially assembled universal tool mounting system for a machining centre shown in FIG. 1 and FIG. 2 showing spindle B with the taper bushes F mounted into it, bearing D, the tapered bush BO and hydraulic cylinder G with tapered index pin E inside it.

In the front face of casting C there are a plurality of the holes BP, these are located on a calculated diameter hole circle from the centre of the main hole BQ in casting C in a random position or evenly spaced pattern. The hydraulic cylinder G mounts into the holes BP. There is also the round cavity threaded hole BS in front of the hole(s) BP with a thread cut into the outside diameter of it and the hole in front of this for the taper bushes BO to mount into. On the top of casting C are the guideways for the linear guideways BH. Refer mainly to FIG. 4, FIG. 5 and FIG. 6. The hydraulic cylinder G is used in conjunction with the tapered index pin E inside it to rotationally lock up spindle B and the connected drum A. The hydraulic cylinder G consists of three main components namely, Hydraulic cylinder BM, Tapered index pin E and hydraulic endcap and screw BN to hold it all together. The piston is also known as the tapered index pin E and is tapered at the end where the piston comes out of the hydraulic cylinder G. One or more of the hydraulic cylinders G are mounted into the hole(s) BP in Casting C with the tapered bush BO mounted in the front of it. The tapered hole inside bush BO matches the taper on the back half of the tapered index pin E. The hydraulic cylinder G is fixed into the hole(s) BP by the thread on the end screw BN being adequately tightened to the thread in the threaded hole BS in casting C. The hydraulic cylinder G is operated by a hydraulic medium, this can include air and hydraulic fluid. The hydraulic cylinder(s) G are fed a hydraulic medium that flows through the series of holes BR that run from the back of casting C to the position of the fixed hydraulic cylinder G. Refer mainly to FIG. 4, FIG. 5 and FIG. 7. Spindle B mounts into the main hole BQ in casting C and runs in bearings D. Spindle B is made up from one piece of material and mainly consists of three different round boss diameter sizes. The front boss has the tapered bushes F and holes BX in it, with the front face and the taper BA being used for mounting drum A onto.

The middle boss sits in casting C with the back boss protruding out the back end of casting C at BB end. The back boss also has a thread on it to lock spindle B into casting C, with the end plate BC and brake and pulley drum BE mounting onto it. The centre of spindle B is hollow to remove unnecessary material inside it and to allow space for additional components to fit including the pipes AS. With the bearings D mounted into their cavities in casting C in the front and back face and with spindle B mounting in the bearings D it allows spindle B to rotate around in the bearings freely and it is locked into position in casting C by the bearing nuts at the back of spindle B locking onto their thread at BB end with the clearance taken out of the bearings when tightened adequately to stop all lateral and axial movement on spindle B to give a zero clearance assembly. Into face BG on spindle B are mounted a plurality of tapered bushes F into the holes provided for them. These holes are on the same hole circle diameter and in the same random position or evenly spaced pattern as all the holes BP in casting C with the tapered bushes BO mounting in front of the hole BP so that both tapers in the taper bushes F and BO line up so that the tapered index pin E can engage into them and rotationally lock up spindle B. The tapered hole inside tapered bush F matches the taper on the front half of the taper on the tapered index pin E. When Spindle B is in the correct rotational position relative to Casting C it is locked into position by the activation of Hydraulic cylinder G pushing the tapered index pin E into engagement into the tapered bush F. When the tapered index pin E moves into engagement it locks the front half of the taper on the tapered index pin E into the tapered bush F mounted in spindle B. Along with the back half of the taper on the tapered index pin E locking into the tapered bush BO mounted into casting C in front of the hydraulic cylinder G. This locks spindle B into rotational position with zero clearance, stopping rotational movement in all directions of spindle B. To avoid total lock up of the taper index pins E while they are engaged into the tapered bushes F and BO there is a end stop mounted into the bottom of the hole that the tapered bush F mounts into so that the end face of each of the tapered index pin E will hit the end stop. To disengage the tapered index pin E out of engagement in the tapered bush F the exact same thing occurs but in reverse so that the end of the tapered index pin E is clear from the end of the tapered bush F. This disengagement releases spindle B so it can freely rotate around again in a clockwise or anticlockwise direction. Refer mainly to FIG. 4, FIG. 5, FIG. 6, FIG. 8 and FIG. 9.

Mounting onto the front face of spindle B is drum A. Drum A is a precision indexing drum and is used to hold the tool holder unit station(s) H, hydraulic cylinder(s) L, coolant manifold blocks AR and the coolant distribution system in it and on it. The main purpose of drum A is to index the tool holder units attached and mounted to the tool holder unit stations H in drum A and any other tool mounted to drum A on any face of it and in any configuration to position VA when required. Drum A is constructed of a round disc of solid material and mainly consists of the features, the hole(s) AQ, hole(s) BT for taper pins J, coolant holes inside drum A, coolant outlet holes, the clearance hole(s) for the bush KB, tapered hole with taper BU on the back of drum A, coolant distribution disc hole, and several mounting holes for components and assemblies to attach to. Drum A mounts to spindle B by the tapered hole with taper BU on the back face of drum A mounting onto the front face of spindle B and taper BA, causing the two matched tapers and faces to engage together. Drum A is fixed to spindle B with screws and other additional methods to secure it correctly into the right position. As spindle B and drum A are connected together, when spindle B rotates around, drum A rotates with it. Bored into drum A are a plurality of multi-diameter holes AQ with the smallest diameter hole in the multi-diameter hole AQ going straight through drum A. Each hole AQ is located on a calculated hole circle diameter from the centre of drum A. Preferably the plurality of the holes AQ will all be positioned on the same hole circle diameter from the centre of drum A in a random position or evenly spaced pattern. From the back face of drum A is the recess hole BD cut into the back of the hole(s) AQ, which is used to help lock the tool holder unit stations H into drum A. Located on a calculated diameter hole circle from the centre of the hole AQ in a random position or evenly spaced pattern are the plurality of multi-diameter holes BT, with the smallest diameter hole in the multi-diameter hole BT going straight through drum A. The taper pins J go through and move in the holes BT. Refer mainly to FIG. 5, FIG. 8, FIG. 10 and FIG. 18.

Figure 12:
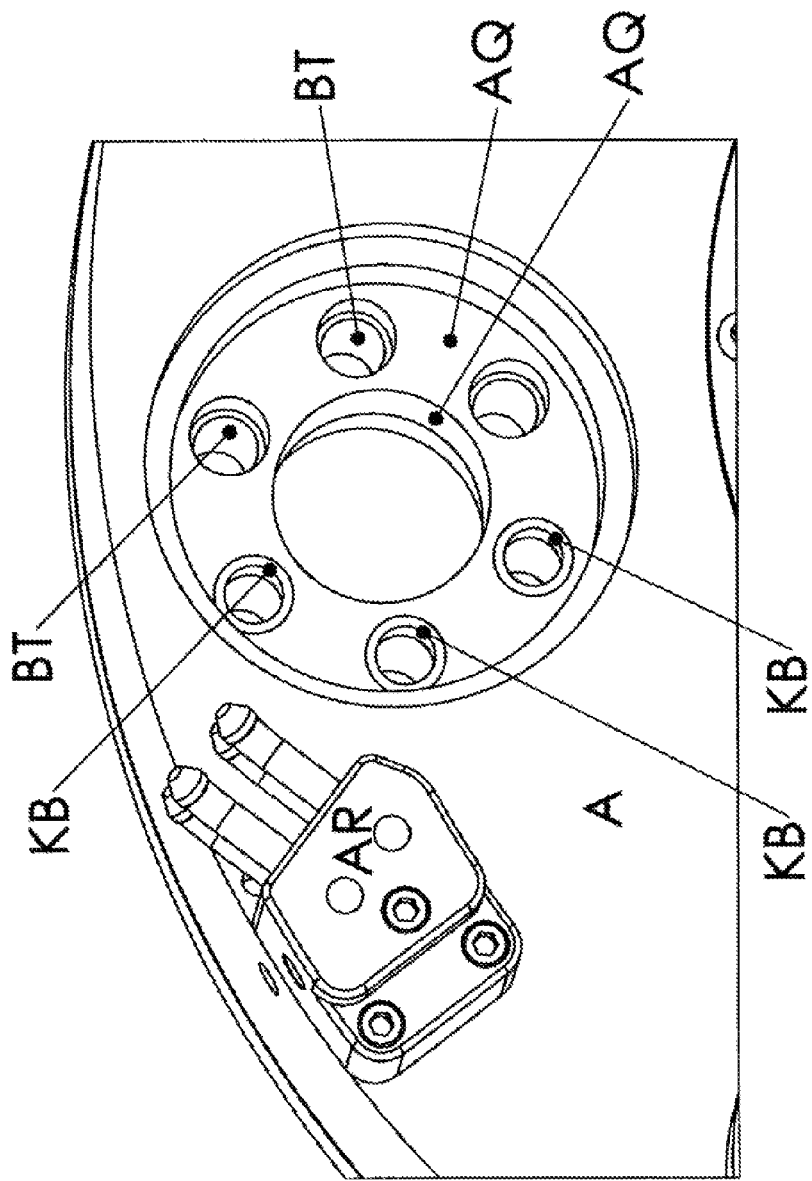
FIG. 12 Shows a close up front side view of the partially assembled universal tool mounting system for a machining centre shown in FIG. 1 and FIG. 2 showing drum A with the coolant manifold block AR attached to it and the tapered bushes KB mounted inside it.
Figure 31:
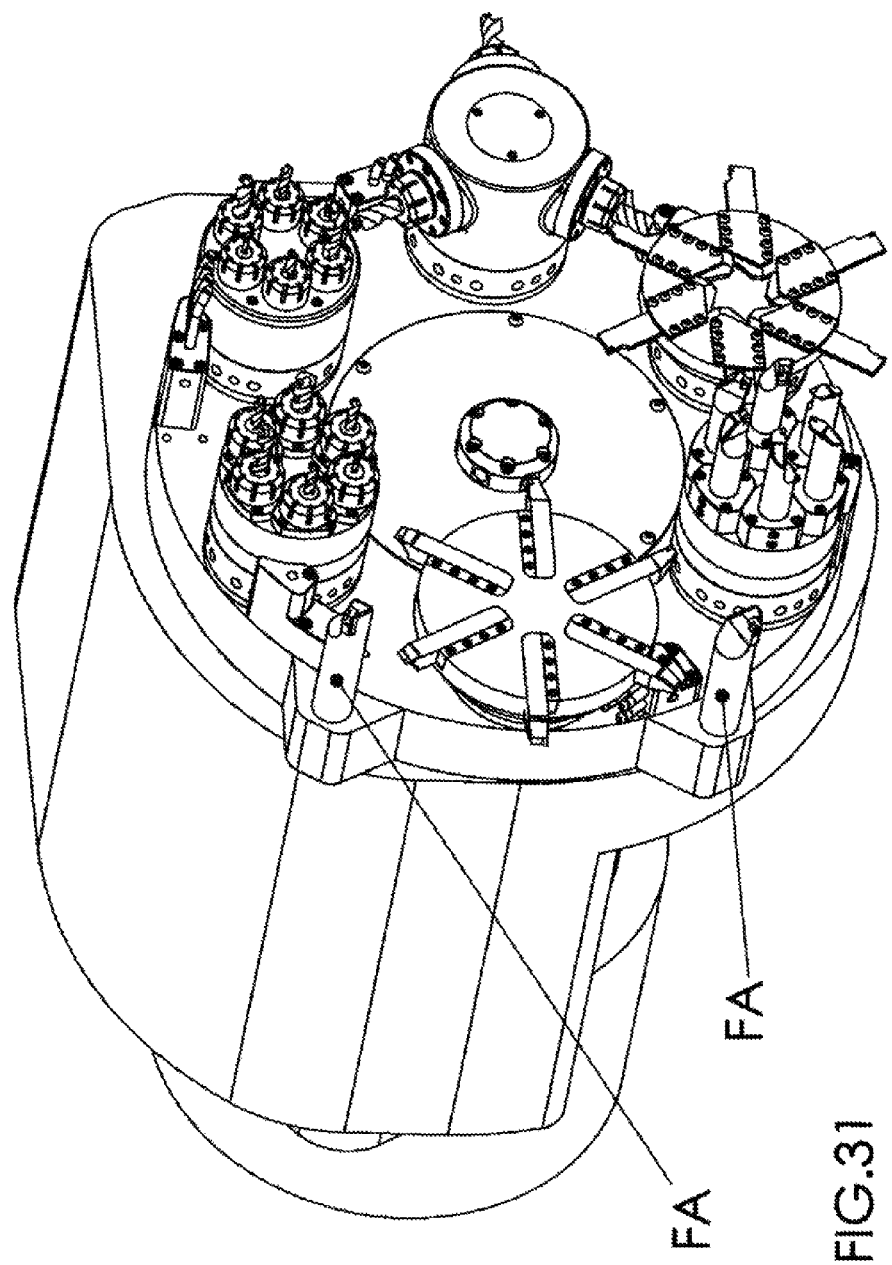
FIG. 31 Shows a front side view of the universal tool mounting system for a machining centre with the tools FA mounted in their tool holders, shown attached to the side of drum A.

Drum A can also hold any extra tool FA or tools FA by mounting it or them directly or indirectly, to it, in it and on any face of it in any configuration. Drum A also indexes to any extra mounted tool or tools used. The tools used can be chosen from a vast selection including drills, cutters, parting tools, turning tools, boring bars, form tools, special tools and any other cutting tool. Refer to FIG. 31. Inside drum A are several coolant holes which run from the centre of it to the outlet holes close to all the holes AQ. These are the holes in which the coolant flows through to the coolant manifold blocks AR. In FIG. 12 the clearance hole, one of the diameter holes of the multi diameter hole BT can be seen here, in which the tapered bush KB locates and mounts into. Also in the middle of drum A from the front face is the hole for the coolant distribution disc EA to mount into. Onto the back face of drum A mounts the hydraulic cylinder L which is secured to it by adequately tightening the screws inside it, the outside diameter of this lines up centrally with the hole(s) AQ. The hydraulic cylinder L is used to lock up the tool holder unit station H into rotational position while machining and unlock them to give rotational freedom for indexing operations. The hydraulic cylinder L can be operated by using different mediums which could include air and hydraulic fluid, this is supplied by the pipes AS which run up inside of spindle B and through the big diameter boss in which they exit from at hole BX. From there the medium is feed straight into the hydraulic cylinder L. Refer mainly to FIG. 5, FIG. 8, FIG. 9, FIG. 10, FIG. 11 and FIG. 12.

The hydraulic cylinder L consists of the main components namely, backplate, inner cylinder, outer cylinder, frontplate, piston, tapered pins J and springs. These components form the main part of the hydraulic cylinder L assembly with the hydraulic ram in the hydraulic cylinder L being the taper pins J, in which a plurality of these pins are mounted and secured adequately with screws on a calculated diameter hole circle in a random position or evenly spaced pattern from the centre of the piston, to the piston. The taper pins J are located on the same calculated diameter hole circle and in the same random position or evenly spaced pattern as all the multi diameter holes BT in drum A. When the piston inside the hydraulic cylinder L moves into engagement it locks the front half of the taper on the taper pin J into the tapered bush KA, mounted into the back of he tool holder unit station H. Along with the back half of the taper on the taper pin J locking into the tapered bush KB mounted in drum A. This locks the tool holder unit station into position in drum A, stopping rotational movement in all directions with zero rotational clearance of the tool holder unit station H. To avoid total lock up of the taper pins J while they are engaged into the tapered bushes KA and KB there is a end stop mounted into the bottom of the hole that the tapered bush KA mounts into so that the end face of each of the tapered pins J will hit the end stop. The springs push against the back of the piston and mounts into the hydraulic cylinders L backplate to aid in the engagement of taper pins J into the tapered bush KA and KB. The hydraulic cylinder L also has a clearance hole in the middle of it to allow the shaft of the main body AU of the tool holder unit station H to locate and rotate within it Refer mainly to FIG. 11, FIG. 12, FIG. 13 and FIG. 14.

Figure 13:
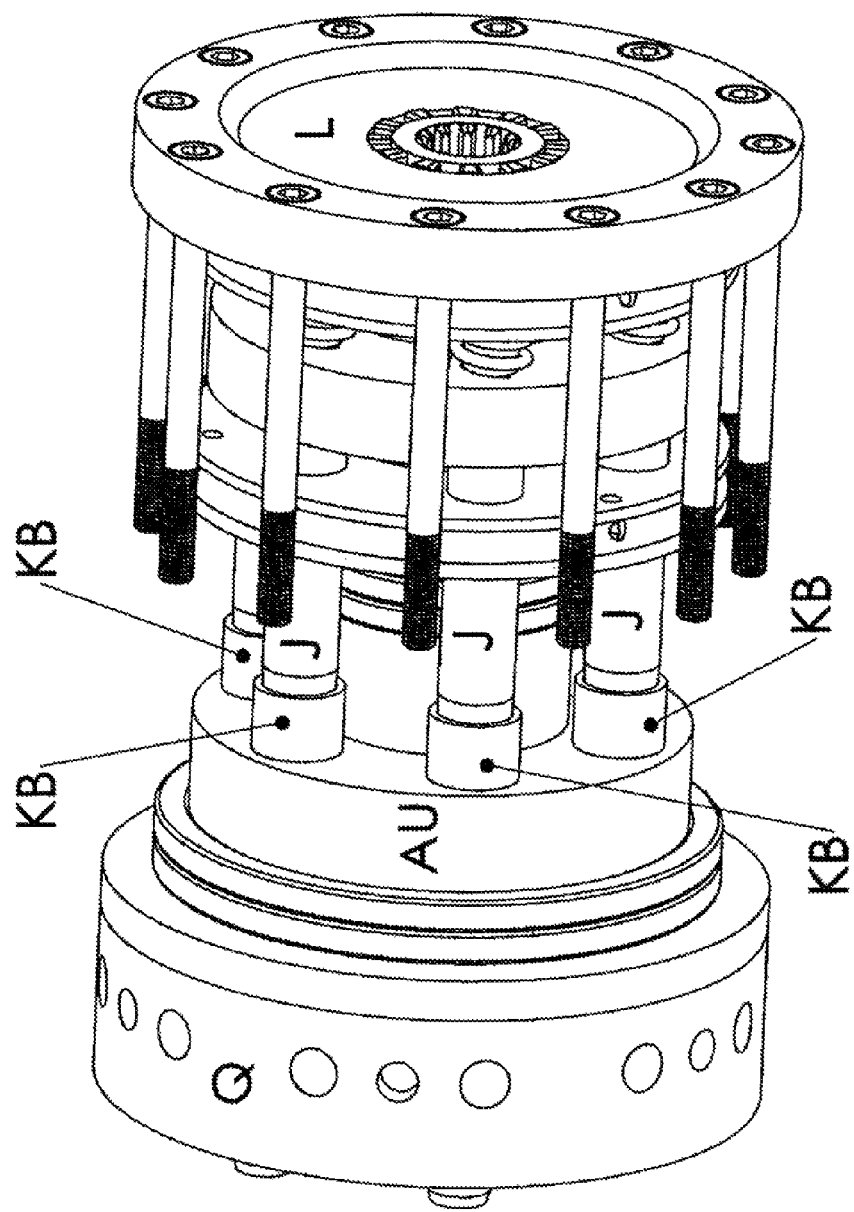
FIG. 13 Shows a back side view of the tool holder unit station H, tapered bushes KB and hydraulic cylinder L (partially assembled) in an assembled state as they would be assembled inside drum A, without showing drum A in the middle of them.
Figure 14:
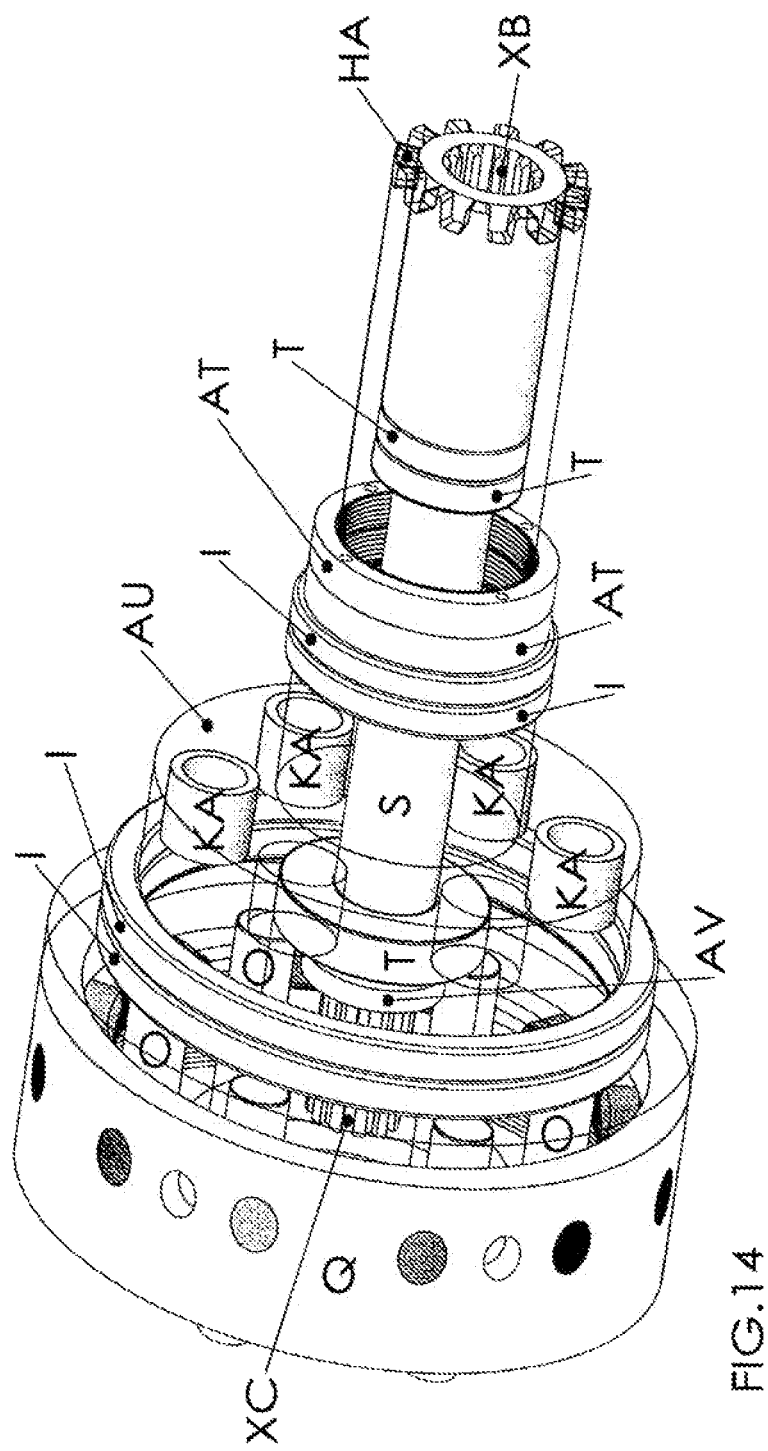
FIG. 14 Shows the tool holder unit station H with the main body AU showing as transparent.

Onto the front face of drum A in the hole(s) AQ mounts the tool holder unit station H. The tool holder unit station H is the platform used to attach and mount and interchange tool holder units on, via the male part of the location and connection configuration on the front of them. The tool holder unit station H is also used for indexing the attached and mounted tool holder units around using the gear teeth HA, with the transmission drive shaft S mounted in the middle of it to drive all the driven tools in a tool holder unit, i.e. a 'live tooling' tool holder unit. The tool holder unit station H consists of one or more of the main components namely, main body AU, tapered bush KA, bearings I, bearing nuts AT, thread lock ring Q, location pins O, bearings T, transmission drive shaft S and bearing nuts AV. The tool holder unit station is mounted and fixed into drum A and rotates in bearings I. The tool holder unit station is fixed to drum A by tightening the bearing nuts AT adequately on the back of the tool holder unit station H to their threads on the back of the main body AU of the tool holder unit station H, this causes the back bearings I on the tool holder unit station H to pull against the recess hole BD in the back face of drum A, this holds the tool holder unit station H in position inside drum A and takes the clearance out of the bearings to give a zero clearance assembly with no lateral and axial movement for the tool holder unit station H. When the tool holder unit station H is mounted in drum A it can rotate freely around in bearings I in a clockwise or anticlockwise direction but it can not move in and out of its mounting hole. Refer mainly to FIG. 3A, FIG. 5, FIG. 14 and FIG. 15. A plurality of taper bushes KA mount into the back of the main body AU of the tool holder unit station H these holes are on the same diameter hole circle and in the same random position or evenly spaced pattern as all the multi-diameter holes BT in drum A, with the tapered bushes KB mounting into the bigger diameter hole of hole BT in drum A so that both tapers in the taper bushes KA and KB line up. This allows the taper pins J to engage into them via hydraulic cylinder L and rotationally lock up the tool holder unit station H mounted in drum A. The tapered hole inside tapered bush KA matches the taper on the front half of the taper on the tapered pin J. Refer mainly to FIG. 12, FIG. 13 and FIG. 14. In the middle of the main body AU of the tool holder unit station H is the hole into which is mounted the transmission drive shaft S. This shaft runs in the bearings T and it is locked into the main body AU of the tool holder unit station H by the bearing nuts AV. Refer mainly to FIG. 3A and FIG. 14.

Figure 15:
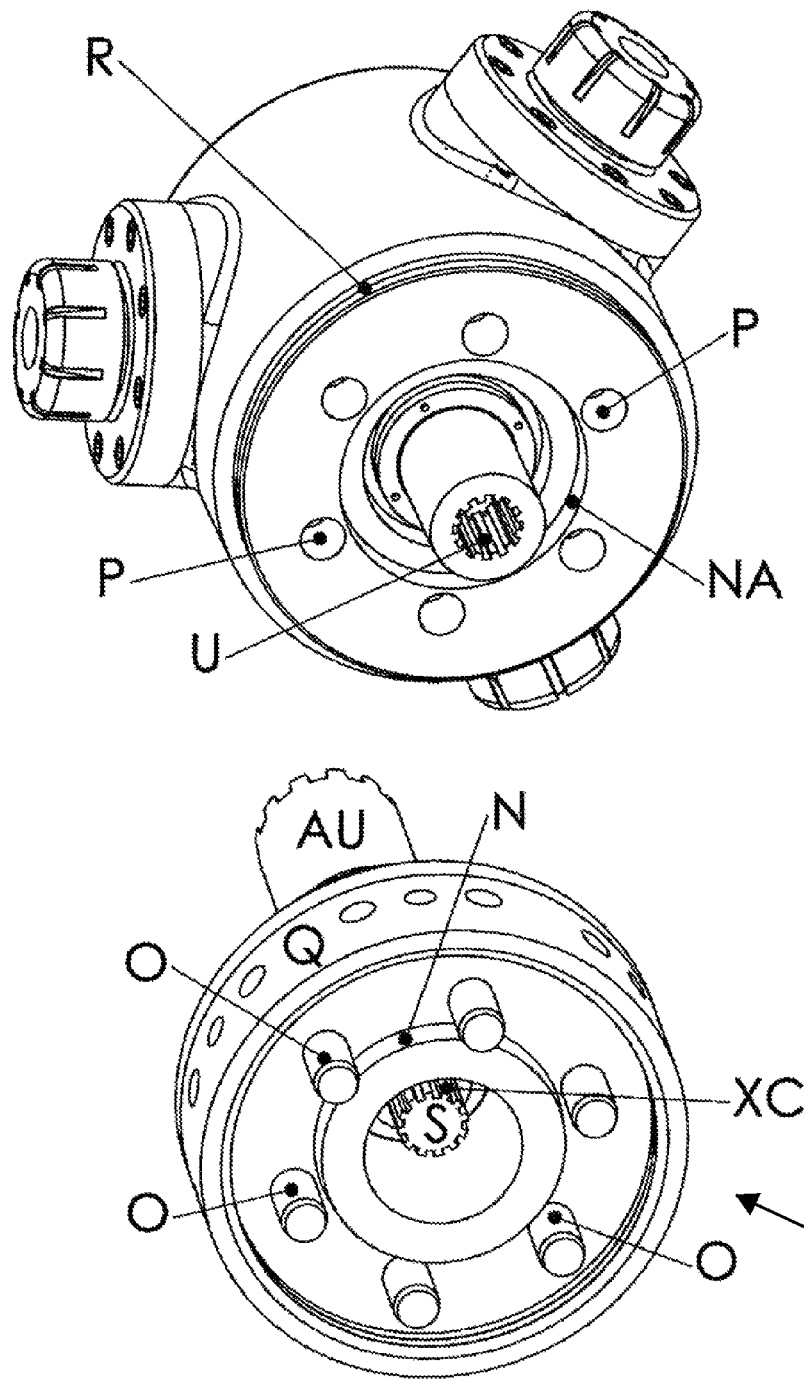
FIG. 15 Shows a back view of a live tooling milling tool holder unit and the front view of the tool holder unit station H, to show the location and connection configuration LC.
Figure 16:
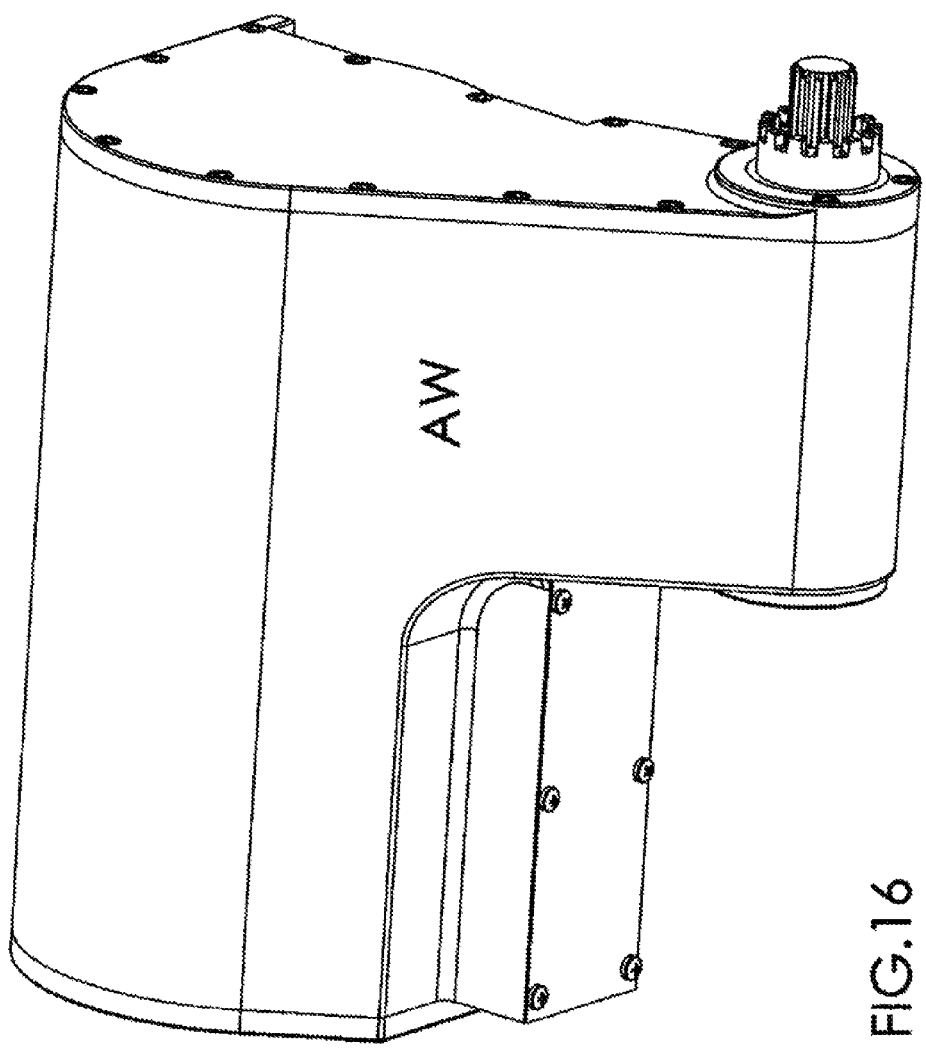
FIG. 16 Shows a front side of the spindle and index drive unit W.
Figure 17:
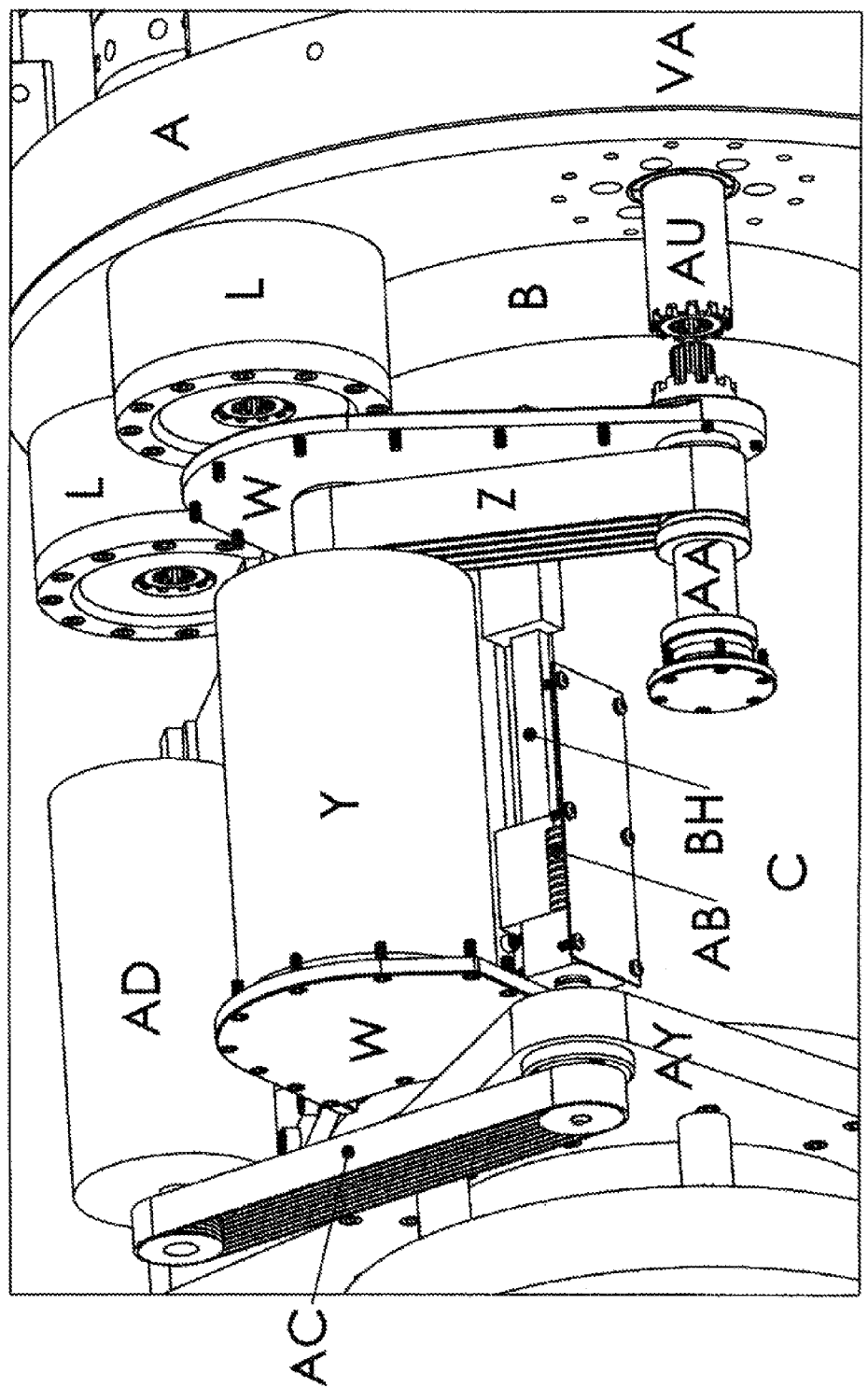
FIG. 17 Shows a back side view of the partially assembled universal tool mounting system for a machining centre shown in FIG. 1 and FIG. 2 mainly showing the spindle and index drive unit W mounted on linear guideways BH mounted in casting C with its main body AW removed. Servo motor AD, poly vee belt AC, hydraulic and distribution plates AY, spindle B, drum A, hydraulic cylinder L and position VA also can be seen here.
Figure 18:
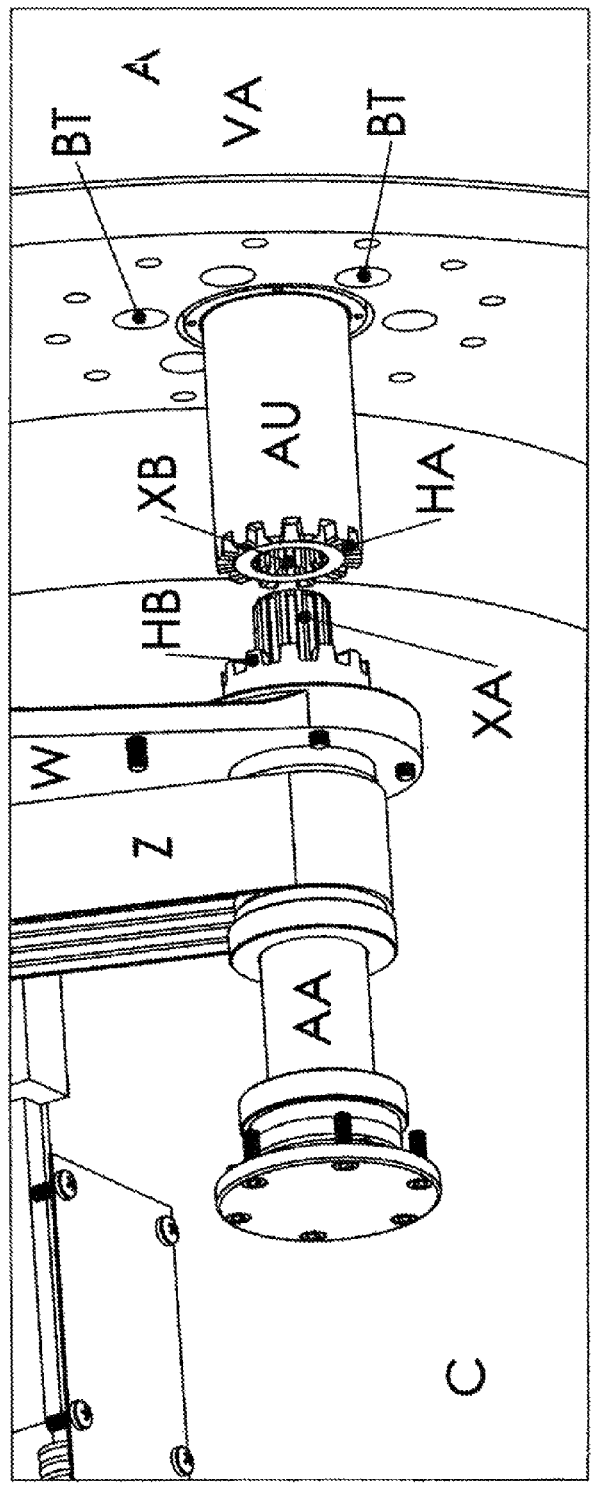
FIG. 18 Shows a close up view of FIG. 17 to show the bottom part of the spindle and index drive unit W and the back of the tool holder unit station H showing the main body AU mounted in drum A.
Figure 19:
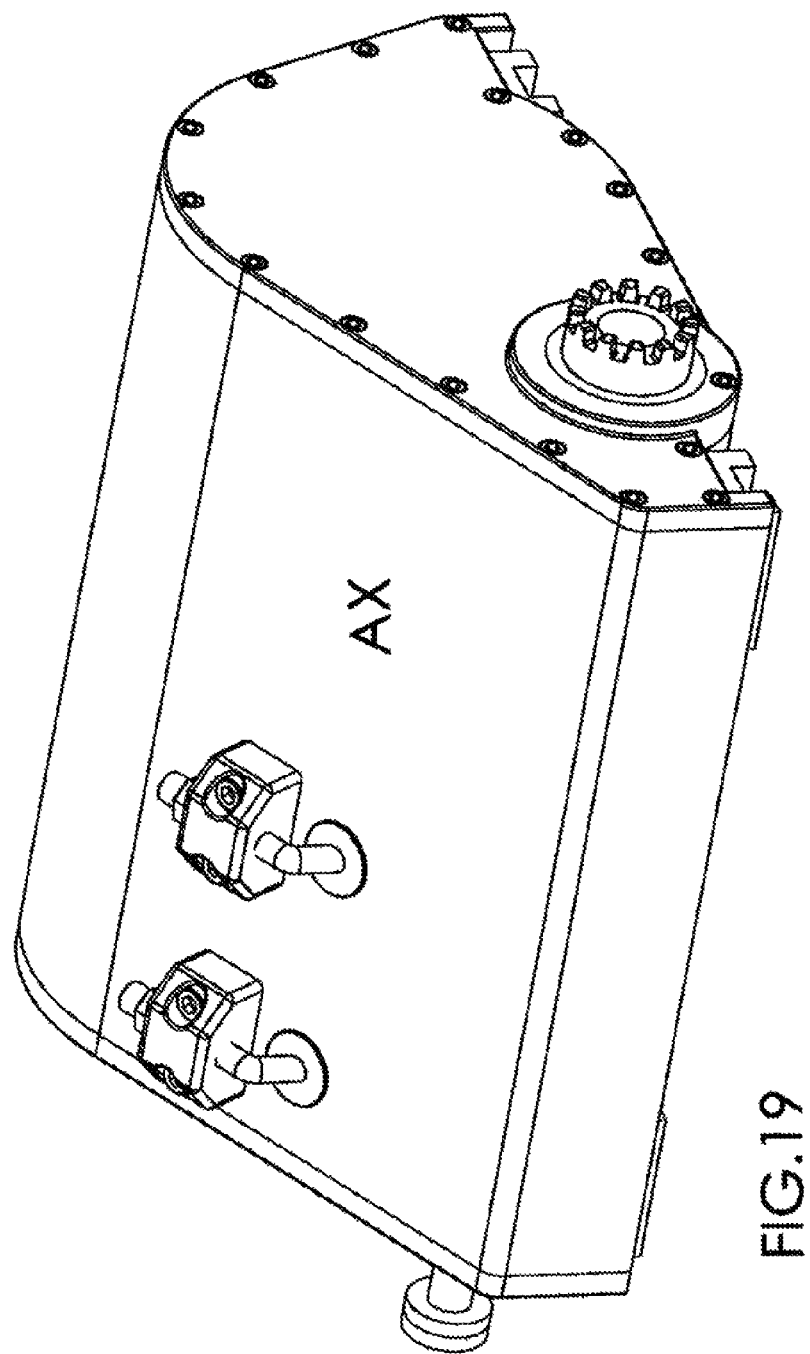
FIG. 19 Shows a front view of the index drive unit AE.

The bottom image on FIG. 15 shows the front view of the tool holder unit station H. The male part of the location and connection configuration can be seen here showing the location pins O mounted into the front face of the main body AU and the protruding boss with the outside taper N on it, along with the thread lock ring Q. The mounted thread lock ring Q in the front of the tool holder unit station is held in position so that it can rotate in a clockwise or anticlockwise direction but it cannot move towards or away from the assembly. On the inside of the thread lock ring Q is the thread that is used to lock and hold all tool holder units to the tool holder unit station H. The transmission drive shaft S is mounted into the tool holder unit station H and it has the spline XC at the front end. At the back end of the transmission drive shaft S is the internal spline XB. On the back of the main body AU of the tool holder unit station H is the gear teeth HA, this is used to index the tool holder unit station H around inside bearings I in a clockwise or anticlockwise direction. Refer mainly to FIG. 3A, FIG. 14 and FIG. 15.

With multiple tapered index pins E and tapered bushes F and BO a large surface area of zero clearance tapered lock up contact is achieved between spindle B and casting C to stop rotational movement between them. With multiple tapered pins J and tapered bushes KA and KB a large surface area of zero clearance tapered lock up contact is also achieved between drum A and the tool holder unit station H to stop rotational movement between them. The bearings D and I also have zero clearance by tightening the bearing nuts to remove all axial and lateral movement from them. These three main factors form a unified rigid assembly to counteract cutting vibration and machining forces to aid in the tool life of the tools and the surface finish and accuracy of machined components.

The spindle and index drive unit W is used for the indexing and spindle drive applications for any tool holder unit attached and mounted to the tool holder unit station(s) H mounted in drum A, in position VA. When a selection of tool holder units with a plurality of tools on them are attached and mounted to the tool holder unit stations on the universal tool mounting system for a machining centre a vast selection of tools can be utilized for machining components and workpieces. These tools are selectively brought into the machining position, firstly by the tool holder unit with the selected tool on it being indexed to position VA via drum A, then secondly the tool holder unit is indexed in position VA via the spindle and index drive unit W to rotationally position the selected tool to the machining position. The machining position is the position a tool is set to, to commence machining operations, here this tool the one closest to the headstock spindle and attached chuck will be parallel with a centreline that runs through the pivotable axis of the headstock spindle and the pivotable axis of the tool holder unit station H so that the edge or centre of the tool is on the centreline.

The spindle drive applications of the spindle and index drive unit W provide live tooling tool holder units in position VA the means to drive the tools in it at machining speeds, with the transmission drive shaft S in the tool holder unit stations H providing the connecting driving means between the live tooling tool holder unit and the spindle and index drive unit W. The indexing and spindle drive applications are achieved by the movement of the spindle and index drive unit W engaging into the tool holder unit station H, with the aid from the ball screw AB, pulleys, poly vee belt AC, linear guideways. BH and servo motor AD. The Spindle and indexing drive unit W is mounted onto linear Guideways BH underneath it and the linear Guideways BH are mounted to the side of casting C where they run perpendicular to the back face of drum A. The spindle and indexing drive unit W consists of the main body AW into and onto which mounts all if its components namely, frontplate and endplate, Servo motor Y, pulley, shaft AA, bearings, poly vee belt z, Ball screw AB, and the shaft with spline XA in it. The servo motor Y mounts into the hollow cavity at the back of the main body AW and attaches to the internal wall inside the main body AW, with the motors drive shaft going through this internal wall. The drive shaft of servo motor Y has a pulley mounted to it from the front cavity of the main body AW. In the lower portion of the main body AW is the hole for the shaft AA and its bearings to mount into. With the bearings and shaft AA mounted into this hole, shaft AA rotates in the bearings in either a clockwise or anticlockwise direction. At the front of the shaft AA is the gear teeth HB and in the middle of it is a hole into which mounts the shaft with spline XA in it, this is fixed and locked into position inside this hole. In the mid section of shaft AA there is a pulley incorporated into it.

Shaft AA is rotated around by the activation of the servo motor Y which is a CNC motor and is connected to the machines main controller unit, this rotates the pulley on the motor shaft and the pulley on shaft AA through their connection with poly vee belt Z.

The spindle and index drive unit W runs along its linear guideways BH by moving towards or away from drum A by the ball screw AB rotating in a clockwise or anticlockwise direction in its mounting block, in which the mounting block is fixed into the channel that is part of the outside shape of the main body AW in the spindle and indexing drive unit W. The ball screw AB is driven by the servo motor AD driving the pulley on its motor drive shaft, which drives the pulley on the end of the ball screw through poly Vee belt AC. The servo motor AD is a CNC motor and is connected to the machines main controller unit. Servo motor AD mounts on an adjustment flume which is mounted to the top of casting C with the adjustment frame tightening the tension of poly Vee belt AC. The ball screw AB is fixed to the hydraulic and distribution plate AY at the back of casting C, where it can rotate in its bearings freely in a clockwise or anticlockwise direction but it cannot move away from the hydraulic and distribution plate AY. When all the components are inside the spindle and indexing drive unit W the main body AW is sealed with the frontplate and endplate on either end of it, which are secured adequately with screws. Refer mainly to FIG. 3, FIG. 6, FIG. 16, FIG. 17 and FIG. 18.

The index drive unit AE is used as a preindexing station to preindex any tool holder unit attached and mounted to the tool holder unit station(s) H mounted in drum A, in position VB. Preindexing occurs at position VB so that the desired tool on the tool holder unit attached and mounted on the tool holder unit station in position. VB is indexed so that this tool, when drum A is indexed will be in the machining position when its tool holder unit station H reaches position VA. This allows the tool to immediately commence a machining operation on a workpiece or component. This is all achieved by the movement of the index drive unit AE engaging into the tool holder unit station H in position VB, with the aid from hydraulic cylinder AF and linear Guideways BH. The index drive unit AE is mounted onto linear Guideways BH underneath it and the linear Guideways BH are mounted to the top of casting C where they run perpendicular to the back face of drum A.

Figure 20:
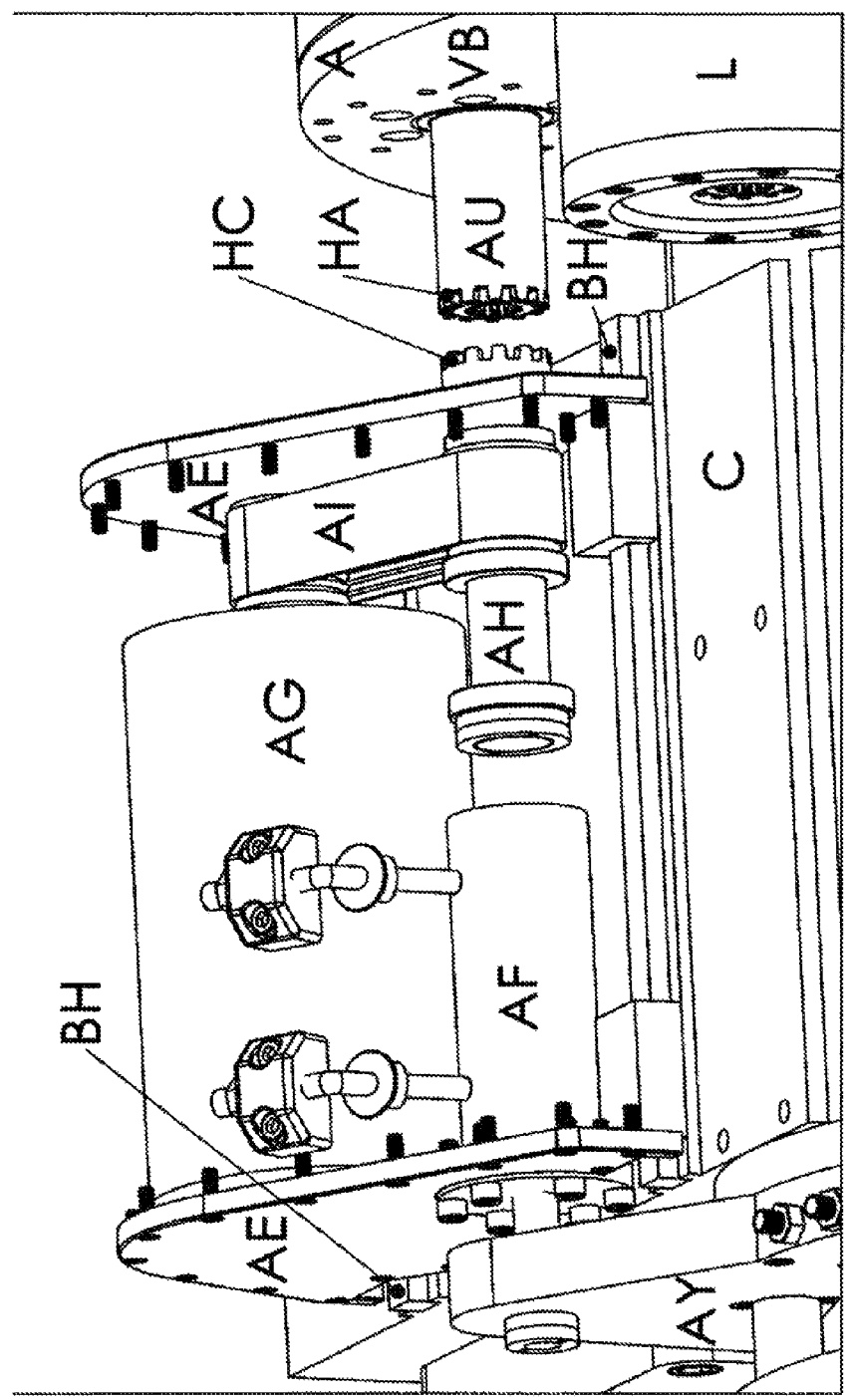
FIG. 20 Shows a back side view of the partially assembled universal tool mounting system for a machining centre shown in FIG. 1 and FIG. 2 mainly showing the index drive unit AE mounted on its linear guideways BH mounted on casting C with its main body AX removed. Hydraulic and distribution plates AY, hydraulic cylinder L, drum A, tool holder unit station H showing the main body AU and position VB also can be seen here.

By adaption and additional components the index drive unit AE can be turned into another spindle and index drive unit W. The index drive unit AE consists of the main body AX into which mounts all of its components namely, frontplate, endplate, servo motor AG, shaft AH, pulleys, Bearings, poly vee belt AI, hydraulic cylinder AF and the manifold blocks for the hydraulic inlet and outlet pipes. The servo motor AG mounts into the follow cavity at the back of the main body AX and attaches to the internal wall inside the main body AX, with the motors drive shaft going through this internal wall. The motors driving shaft has a pulley mounted onto the end of it from the front cavity of the main body AX. Mounted into the main body AX of the index drive unit AE as shown in FIG. 20 is the shaft AH, which has a pulley incorporated into it. The shaft rotates in bearings in either a clockwise or anticlockwise direction and at the front of shaft AH is the gear teeth HC. Shaft AH is rotated around by the activation of the servo motor AG which is a CNC motor and is connected to the machines main controller unit, this rotates the pulley on the motor shaft and the pulley on shaft AH through their connection with poly vee belt AI. The index drive unit AE runs along the linear Guideways BH by moving towards or away from drum A by the activation of hydraulic cylinder AF. The hydraulic cylinder AF is mounted into the main body AX from the back of it and it works using a variety of mediums, which could include air and hydraulic fluid. The chosen medium is fed in and out of the hydraulic cylinder AF by the inlet and outlet pipes which connect to the manifold block at the side of the main body AX of the assembly. The ram of hydraulic cylinder AF is connected securely to the hydraulic and distribution plate AY. When all the components are inside the index drive unit AE the main body AX of the assembly is sealed with the frontplate and endplate on either end which are secured adequately with screws. Refer mainly to FIG. 3, FIG. 6, FIG. 19 and FIG. 20.

It is also envisaged that the tool holder unit station(s) H are independently driven and indexed by other means including &controlled motor without using the spindle and index drive unit W or the index drive unit AE. Onto the back face of Casting C mounts two hydraulic and distribution plates AY. The plates are secured by screws and pins, these mount into these plates and the provided holes on the back of casting C. The plates consist of a series of holes and grooves to feed the hydraulic medium through to operate the hydraulic cylinder G. This medium is fed in and out of the hydraulic and distribution plates AY by the inlet and outlet connector plugs near the top of the plate closest to the magnetic brake drum assembly. The flow of hydraulic medium to supply the hydraulic cylinder(s) G is controlled by using a CNC pump, this feeds the hydraulic medium through pipes to the inlet and outlet connector on the hydraulic and distribution plates AY.

On the back of the hydraulic and distribution plates AY are a series of holes which match exactly to the holes BR in casting C, so that they line up when the hydraulic and distribution plates AY are attached to casting C. A CNC pump feeds hydraulic medium through pipes to the inlet and outlet connector on the hydraulic and distribution plates AY, then through the hydraulic and distribution plates AY and into the holes BR to reach the hydraulic cylinder(s) G. The middle of both hydraulic and distribution plates AY is hollow so that the back of spindle B at BB end can fit through the middle of them. The servo gear drive motor AK is a CNC motor and is connected to the machines main controller unit with it being fixed to the motor mounting plate AZ, which is then mounted and secured to the back of casting C into the provided hole BK. The spindle shaft of servo gear drive servo motor AK protrudes through the motor mounting plate AZ onto which a pulley is mounted. When spindle B is locked into position inside casting C in its bearings and the hydraulic and distribution plates AY are mounted to the back of casting C, the brake and pulley drum BE is mounted onto the back of spindle B at BB end with screws and dowels. The Brake and pulley drum BE Consists of poly Vee grooves at the biggest diameter end of it at BF, from the big diameter end BF it tapers down to a smaller diameter at the mid section. The tapered mid section is the tapered braking face BI of the brake and pulley drum BE and is the braking face for the brake drum AL. Connecting the pulley on the brake and pulley drum BE and the pulley on the servo gear drive motor AK is the poly Vee belt AJ. To index drum A around in a clockwise or anticlockwise direction the servo gear drive motor AK and connected pulley is activated which drives the pulley on the brake and pulley drum BE With poly Vee belt AJ.

Figure 21:
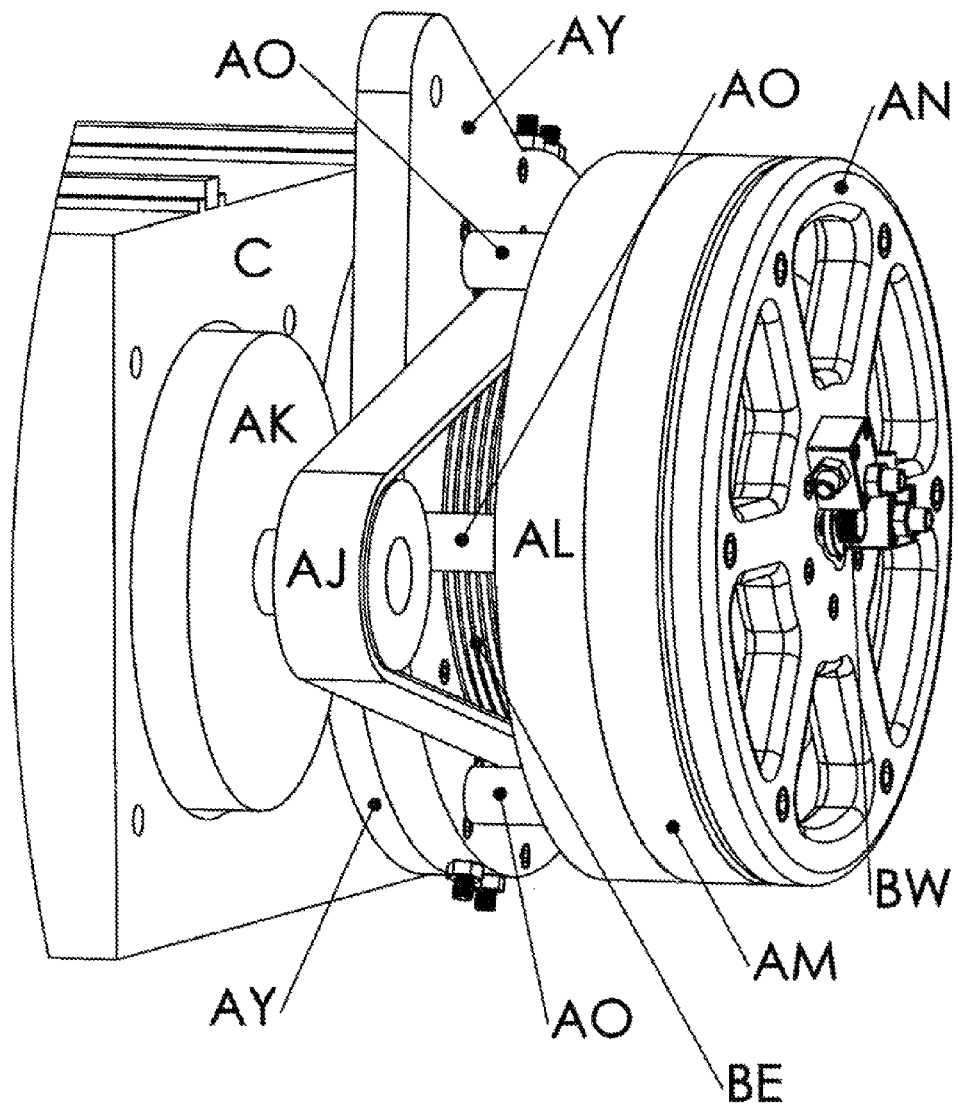
FIG. 21 Shows a back side view of the partially assembled universal tool mounting system for a machining centre shown in FIG. 1 and FIG. 2 mainly showing the magnetic brake drum assembly mounted on the pillars AO, the pillars AO mounted on the hydraulic and distribution plates AY, and the hydraulic and distribution plates AY mounted onto the back of casting C. The brake and pulley drum BE, poly vee belt AJ, servo gear drive motor AK and coolant pipe BW can also be seen in their assembled state.

Mounted and fixed to the back of the hydraulic and distribution plates AY are the round pillars AO which are randomly or evenly spaced at a calculated diameter hole circle from the centre holes in the plates, these are secured into position with screws which are adequately tightened. Mounting onto the pillars AO is the magnetic brake drum assembly with the main components namely, brake drum AL, magnetic braking disc AM and the endplate AN. The brake drum AL is the brake for the brake and pulley drum BE and mounts onto the pillars AO in front of the poly Vee belt AJ, the brakedrum AL consists of a hole in the middle of it, this hole is tapered and the same size as the tapered braking face BI on the brake and pulley drum BE, so that they match together to give the braking surface. The next component mounted on the pillars AO is the magnetic braking disc AM, which is a CNC unit. Inside the magnetic braking disc AM are the magnets which activate to brake the brake and pulley drum BE and deactivate to release brake and pulley drum BE, with these two processes being controlled using the machines main controller unit. The magnetic braking disc AM is fixed at a position close to brake drum AL on the pillars AO so that the magnets inside it can function correctly against brake drum AL to brake it and hold it in position. The endplate AN mounts directly to the end of the pillars AO and is secured by screws which are adequately tightened, this plate holds the magnetic brake drum assembly together along with the pillars AO in the assembly. Refer mainly to FIG. 5, FIG. 6 and FIG. 21.

Figure 9:
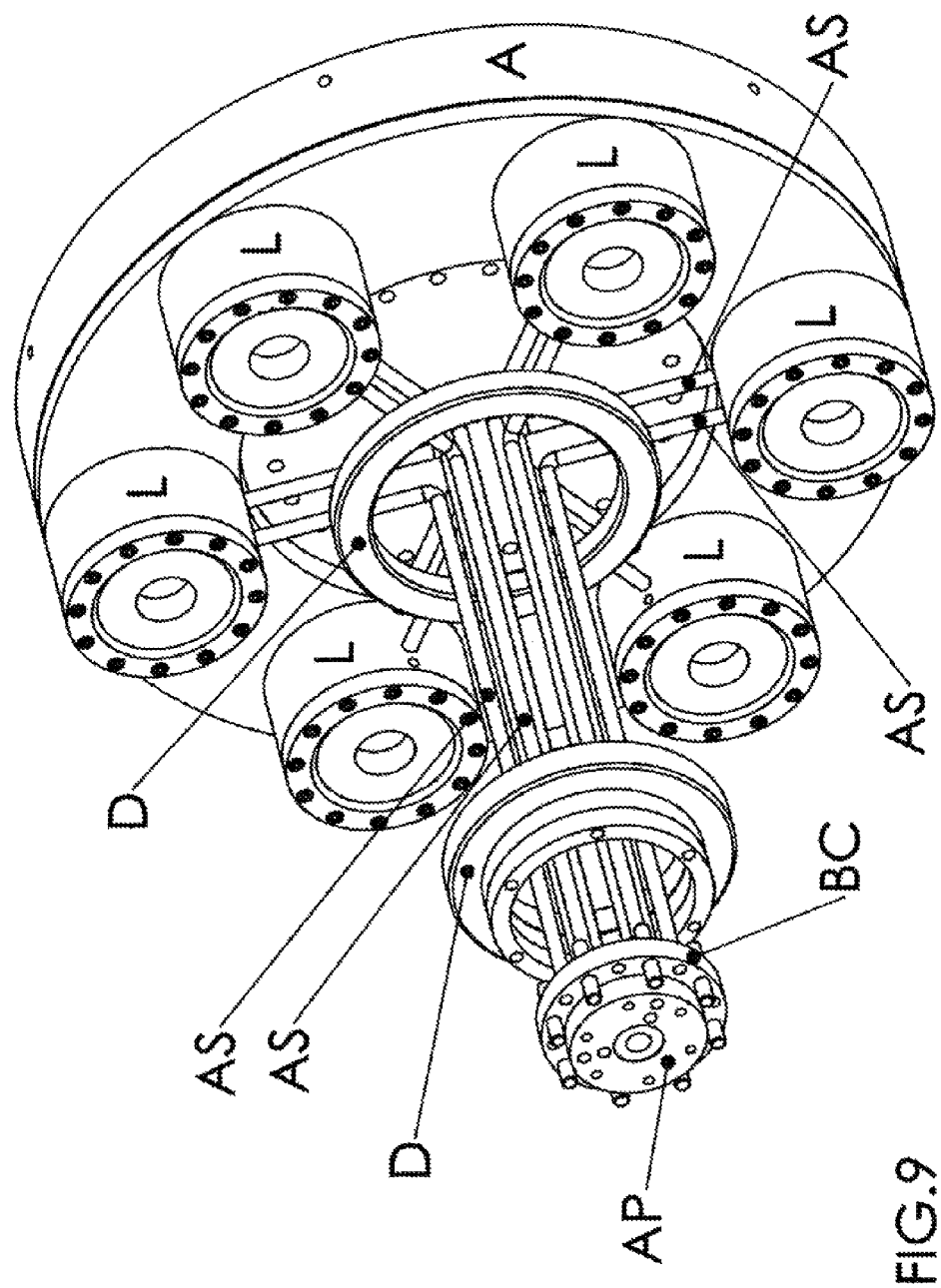
FIG. 9 Shows a back side view of the partially assembled universal tool mounting system for a machining centre shown in FIG. 1 and FIG. 2 showing Drum A with the hydraulic cylinders L attached to the back of it, the pipes AS, bearings D, endplate BC and endplate AP.
Figure 10:
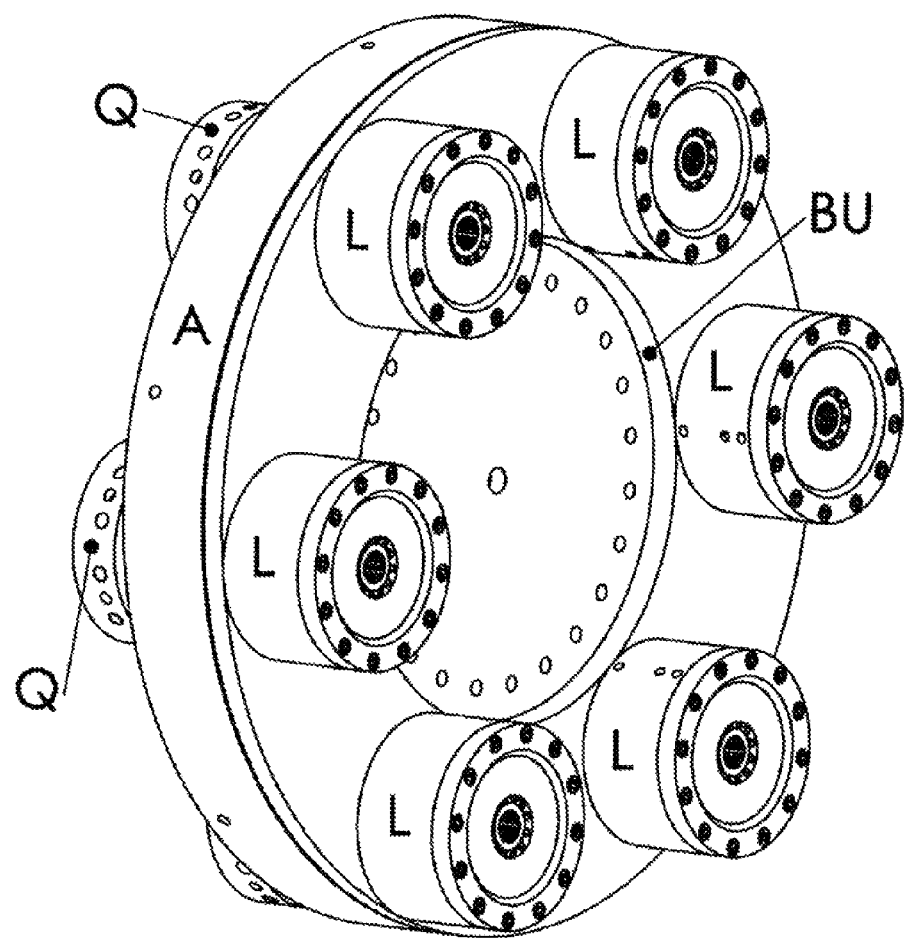
FIG. 10 Shows a back side view of the partially assembled universal tool mounting system for a machining centre shown in FIG. 1 and FIG. 2 showing Drum A with the hydraulic cylinders L attached to the back of it and the tool holder unit station H showing thread lock ring Q mounted into the front of it.
Figure 11:
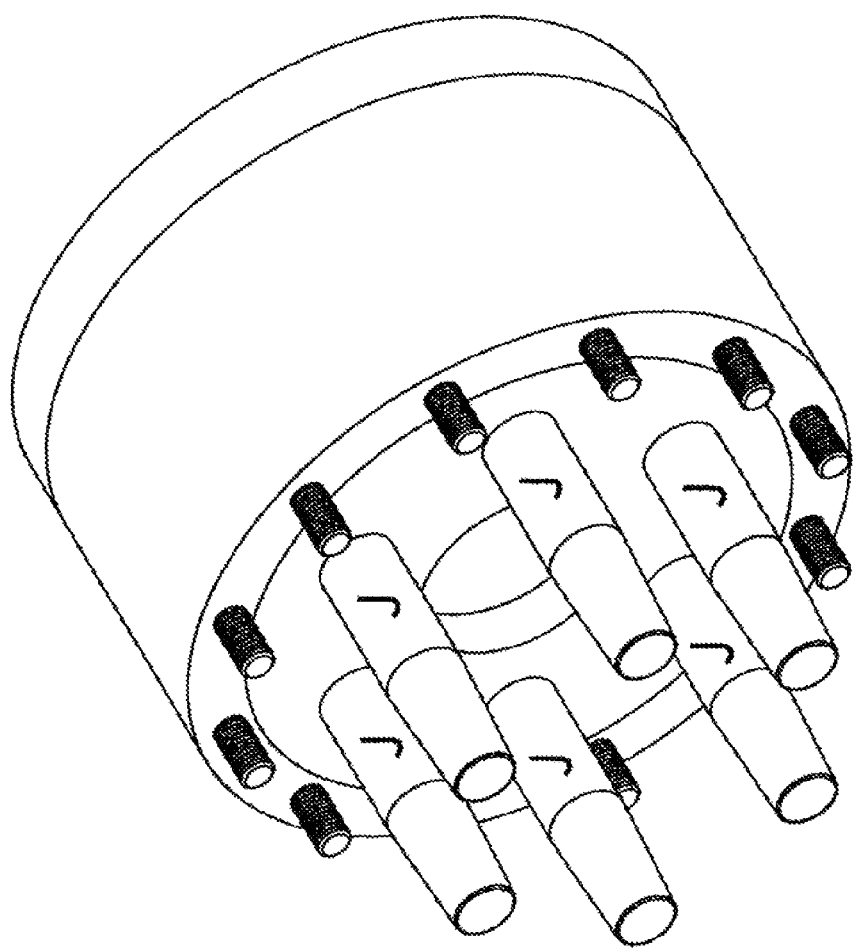
FIG. 11 Shows a front side view of the hydraulic cylinder L.

To the back face of spindle B at BB end mounts the endplate BC this consists of a series of holes which go right through the plate so that all these holes match the position the pipes AS are in. The pipes AS inside of spindle B then connect into this plate. These are the same pipes that feed the hydraulic medium to the hydraulic cylinders L. The end plate BC is secured to spindle B with screws and dowels. Refer mainly to FIG. 5 and FIG. 9. Secured to the inside of the endplate AN and connected to the end plate BC is the end plate AP, this feeds the hydraulic medium to the hydraulic cylinder(s) L mounted to the back of drum A to position VA and VB. This process works as the endplate AP is fixed to the endplate AN and stays stationary all the time, while The endplate BC is fixed and secured to spindle B and rotates with it, making endplate AP and endplate BC have rotational contact together. The end plate AP Consists of four holes in it which line up and also go through the endplate AN. Two of the holes feed the hydraulic medium to a hydraulic cylinder L at VA position and the other two holes feed the hydraulic medium to a hydraulic cylinder L at VB position.

As spindle B rotates around to the next indexed position the holes for the pipes going to position VA and position VB line up and feed the hydraulic cylinder L with hydraulic medium. Position VA and VB always stays the same when drum A indexes around the only thing that changes are the hydraulic cylinders L position because they rotate around with drum A and it therefore changes which of the hydraulic cylinders L are supplied with hydraulic medium. The two sets of two holes in the endplate AN connect to the two manifold blocks mounted onto the back of it and the hydraulic mediums are feed into these through the flexible pipes connecting to them which supply hydraulic cylinder(s) L. The supply of hydraulic medium through the flexible pipes is controlled by a CNC pump connected to the main controller unit. Each manifold block can be supplied separately from the other one, giving independent hydraulic medium flows to each of the hydraulic cylinders L at position VA and VB. Refer mainly to FIG. 5, FIG. 6, FIG. 9, FIG. 17, FIG. 20 and FIG. 21. The tool holder units M1 to M10 on the following pages are shown to represent a designed and manufactured range which can be attached, mounted and interchanged on the tool holder unit stations H in the universal tool mounting system for a machining centre. These tool holder units can be customized and redesigned as necessary. Custom designed and built tool holder units can also be attached and mounted onto the tool holder unit stations H.

The cutting tool unit M1 has been designed to hold any type of cutting tool that is required while machining components, in a stationary position inside their holder(s), with any other tool mounting in any other way directly or indirectly to the base of the unit in any configuration. The cutting tool unit doesn't have live tool functions in it where the tools are driven around at machining speeds but it instead indexes around to the next tool or any tool in the unit ready for commencing machining operations, using the spindle and index drive unit W to index them when in position VA. The index drive unit AE can also index the unit in position VB when it is there. The tool(s) used in the unit are left to the discretion of the person setting it up. Some of the tools used could include boring bars, grooving tools, threading tools, form tools and special tools. The cutting tool unit M1 connects to the tool holder unit station H on the universal tool mounting system for a machining centre shown in FIG. 1, FIG. 2, FIG. 3 and FIG. 3A by using the location and connection configuration LC. The cutting tool unit M1 consists of the main base onto which mounts all other main components including, the tool holder, and the cutting tools.

The main base consists of one or more holes in the top of it into which its one or more tool holders. At the bottom of each of the tool holder holes is a coolant outlet hole in the middle that supplies coolant to the tools, with these being supplied with coolant through a series of connecting holes that run to the side of the main base where a coolant manifold block supplies them with coolant. At the back of the main base is the female part of the location and connection configuration LC, which is used for mounting the cutting tool unit M1 onto the tool holder unit station H. Mounting into the tool holder holes at the top of the main base are the tool holders. These holders are secured to the base with screws by tightening them adequately to it and consists of a hole that goes straight through the center of the holder to hold the tools. All tools when mounted into the tool holder in the unit are tightened adequately by screws, these run down the side at the top part of the tool holders.

Figure 23:
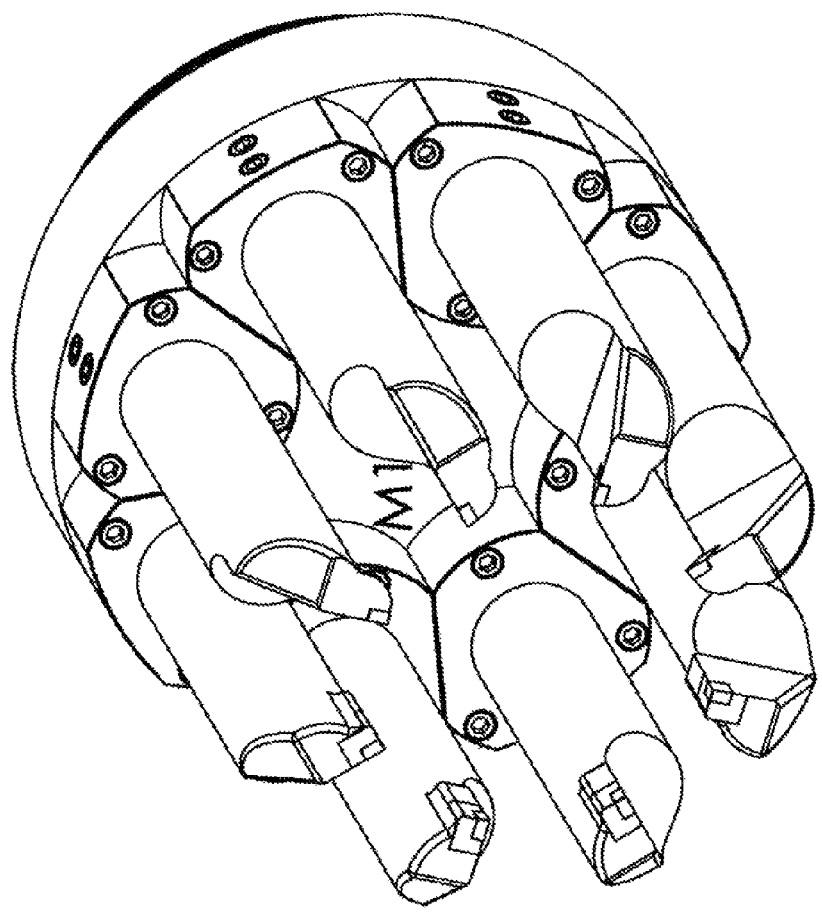
FIG. 23 Shows the cutting tool unit M1.

The tools used in this unit should have through coolant capabilities in them as they are fed coolant through the holes at the bottom of the tool holder holes, although tools without through coolant in them can also be used. All tools are purchased from various companies around the world, with different type tip inserts having their own holders for them. The tools purchased come in multiple diameters and lengths and it is up to the person setting up this unit to choose which tools to use when machining components. If a tool has a smaller diameter than the hole it mounts into, a sleeve is placed around the tool and they are then both mounted into the tool holders hole. Refer mainly to FIG. 23 and FIG. 15.

The parting blade unit M2 has been designed to hold parting blades of various types in the holder to achieve the machining functions these tools are capable of, with any other tool mounting in any other way directly or indirectly to the base of the unit in any configuration. The parting blade unit doesn't have live tooling functions in it where the tools are driven around at machining speeds but it instead indexes around to the next parting blade or any other parting blade in the unit ready for commencing machining operations, using the spindle and index drive unit W when in position VA. The index drive unit AE can also index the unit in position VB when it is there. The parting blades used in the unit and any other tools are left to the discretion of the person setting it up. The parting blade unit M2 connects to the tool holder unit station H on the universal tool mounting system for a machining centre shown in FIG. 1, FIG. 2, FIG. 3, and FIG. 3A by using the location and connection configuration LC.

Figure 24:
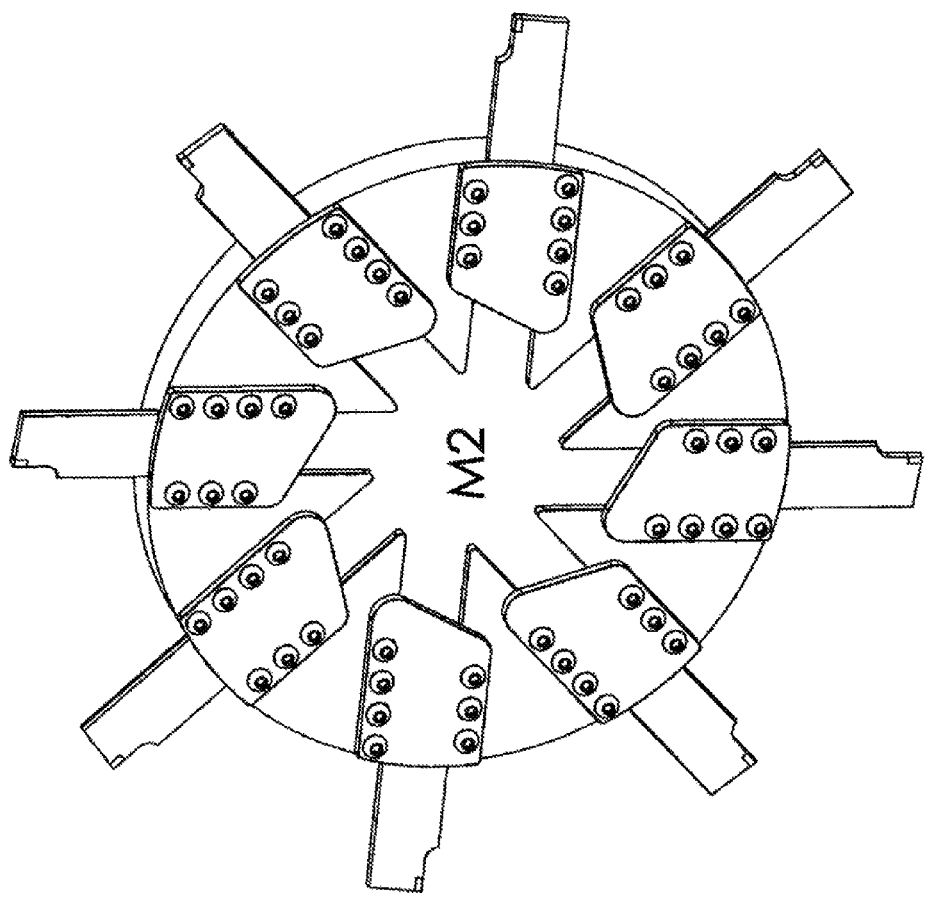
FIG. 24 Shows the parting blade unit M2.

The parting blade unit M2 consists of the main base into and onto which mounts all of its main components, namely the parting blade, and clamp plate. The main base consists of one or more slots in the top of it, into which slides the parting blades and screw holes for holding down the clamp plate. At the back of the main body is the female part of the location and connection configuration LC, which is used for mounting the parting blade unit M2 onto the tool holder unit station H. The parting blades mount into the slots at the top of the main body of the parting blade unit and are clamped down to it using the clamp plate(s) that are tightened with screws adequately. The parting blades used in the unit are set into the slots in the base by the person using it for machining components. Therefore the radius from the center of the main base which the parting blades are set to will vary. The types of parting blades used in the unit vary depending on the tip inserts used and the size in which they are purchased at from various companies around the world. Refer mainly to FIG. 24 and FIG. 15.

The ninety-degree milling unit M3 has been designed to hold drills and cutters of various types in the unit to achieve all the machining functions these tools are capable of, with any other tool mounting in any other way directly or indirectly to the base of the unit in any configuration. The ninety degree milling unit has live tooling functions in it where the tools are driven around at machining speeds using the transmission drive shaft S and the spindle and index drive unit W. When the active cutting tool is blunt the ninety degree milling unit M3 indexes around to the next tool or any other tool in the unit ready for recommencing machining operations, also using the spindle and index unit W when in position VA. The index drive unit AE can also index the unit in position VB when it is there. The Tool(s) used in the unit are left to the discretion of the person setting it up. The ninety-degree milling unit M3 connects to the tool holder unit station H on the universal tool mounting system for a machining centre shown in FIG. 1, FIG. 2, FIG. 3 and FIG. 3A by using the location and connection configuration LC.

The ninety-degree milling unit M3 consists of the main body onto and into which mounts the main components namely, the driving gear, driven gears, bearings, collet, collet nut, front plate, drills, cutters, retainer disc and tools. The main base consists of a hole in the center that runs straight through it and one or more holes which are set near the front face at ninety degrees from the hole through the center of the base. At the back of the milling unit body is the female part of the location and connection configuration LC that is used for mounting the ninety-degree milling unit M3 onto the tool holder unit station H. Mounted in the central hole of the main base is the driving gear shaft which runs in bearings. The driving gear shaft has a gear at the front and the shaft on the back of it. The shaft on the driving gear shaft protrudes out the back of the ninety degree milling units main body ready for the spline U in the back face of the shaft to engage onto spline XC on the transmission drive shaft S. Mounting into the one or more holes ninety degrees from the hole straight through the center of the main base are the driven gear shafts that run in bearings. The driven gear shaft(s) have a gear at the back and the shaft at the front of it into the front of the same shaft is the tapered collet hole and the thread for the collet nut. The gear on the driven gear shaft(s) connects to the driving gear on the driving gear shaft that drives one or more of the driven gear shafts around at the required machining speeds, with the other end of it with the collet hole in it protruding out of the side of the main body of the unit which runs in bearings. Mounting onto the front face of the ninety-degree holes on the outside diameter of the main body is the retainer disc, this holds the driven gear shaft in position inside the main body. Mounting into the tapered collet hole on the end of the shaft of the driven gear shaft is the collet.

Figure 25:
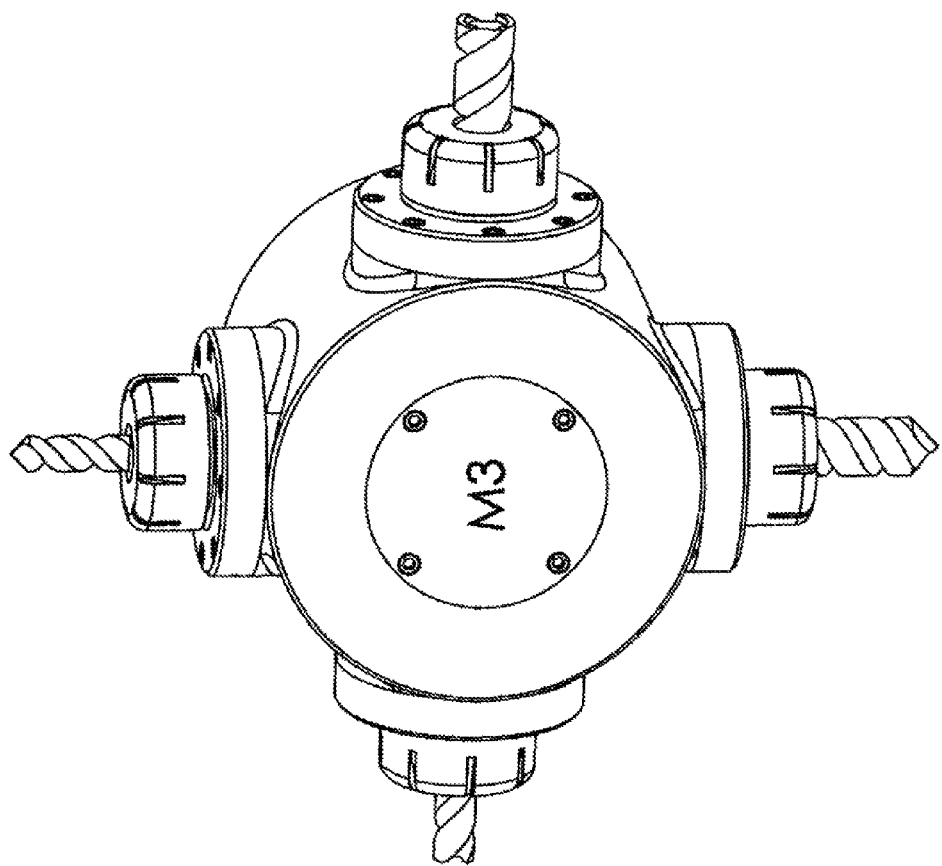
FIG. 25 Shows the ninety degree milling unit M3.

The collet(s) used are manufactured by companies all around the world and come in varying sizes with a vast selection of different hole sizes for them. Into the collets central hole mounts drills and cutters varying in size, type and length. The tools and collets used in this unit are chosen by the person setting up the ninety degree milling unit M3 so that they can machine the required components. Locking the drills and cutters into the collets and to the milling units are the collet nuts that are adequately tightened to the collet thread at the front of the driven gear shaft. The front plate mounts into the front cavity in the front face of the milling units main body and acts as a seal and cover. The ninety-degree milling unit M3 has a lubricating substance inside it and is used for lubricating all moving components within it, while the unit is active in machining components. The ninety-degree milling unit M3 is a sealed unit, designed so that all outside contaminants can't penetrate into it and damage the unit. Another reason the unit is sealed is to keep the lubrication substance inside the unit. Refer mainly to FIG. 25 and FIG. 15.

The cutting tool unit M4 has been designed to hold any type of cutting tool that is required while machining components, in a stationary position inside their holder, with any other tool mounting in any other way directly or indirectly to the base of the unit in any configuration. The cutting tool unit M4 doesn't have live tool functions in it where the tools are driven around at machining speeds but it instead indexes around to the next tool or any other tool in the unit ready for commencing machining operations, using the spindle and index drive unit W to index them in position VA. The index drive unit AE can also index the unit in position VB when it is there. The tool(s) used in the unit are left to the discretion of the person setting it up with the collets being changed so suit the tools diameter. Some of the tools used in the unit could include drills, cutters, form tools and special tools. The cutting tool unit M4 connects to the tool holder unit station H on the universal tool mounting system for a machining centre shown in FIG. 1, FIG. 2, FIG. 3 and FIG. 3A by using the location and connection configuration LC. The cutting tool unit M4 consists of the main base onto and into which mounts all other main components namely, the collet holder, collet, collet nut, and tools.

Figure 26:
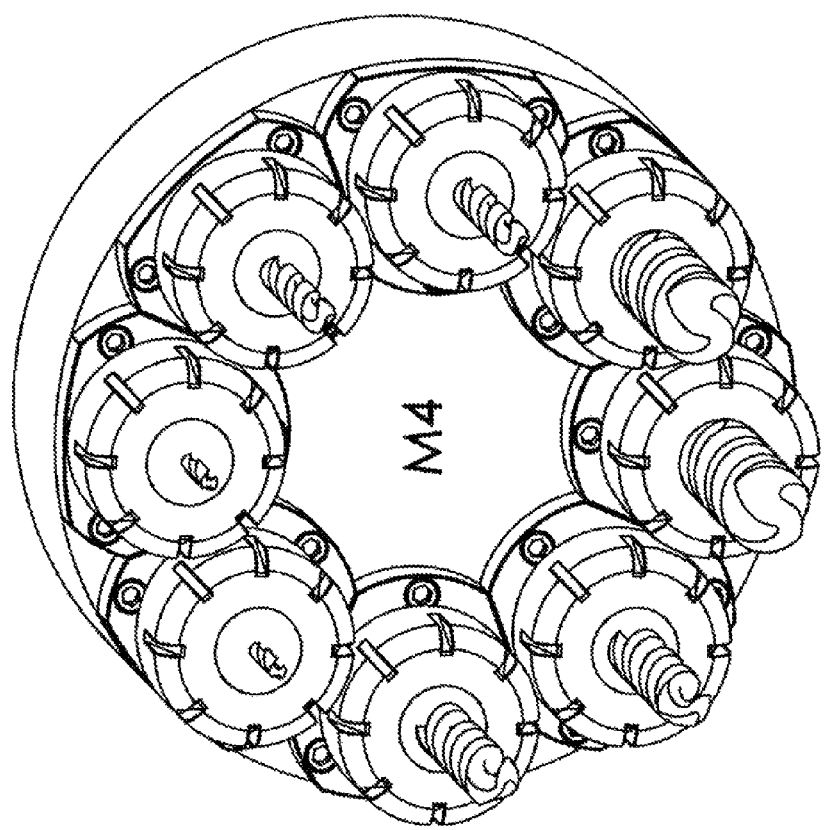
FIG. 26 Shows the cutting tool unit M4.

The main base consists of one or more holes in the top of it into which fits one or more collet holders. At the bottom of each of the collet holder holes is a coolant outlet hole in the middle which supplies coolant to the tools, with these being supplied with coolant through a series of connecting holes which run to the side of the main base where a coolant manifold block supplies them with coolant. At the back of the cutting tool unit M4 is the female part of the location and connection configuration LC, which is used for mounting the cutting tool unit M4 onto the tool holder unit station H. Mounting into the collet holder holes at the top of the main base are the collet holders. These holders are secured to the base with screws by tightening them adequately to it and consist of a hole that goes straight through the center of the holder to hold the tools. Mounting into the tapered hole of the collet holder is the collet. Mounting into the collets holes are the tools these vary in size, length and type used. The tools are set into the holder(s) by the person setting up the unit depending on the component being machined. Locking the tools into the collets and to the collet holder are the collet nuts that are adequately tightened to the thread at the front of the collet holder. The tools used in this unit should have through coolant capabilities in them but tools without this feature can also be used. The tools used in this unit are fixed into their collets and don't rotate around but stay in a stationary position inside their holders. Refer mainly to FIG. 26 and FIG. 15.

The milling unit M5 and M7 has been designed to hold drills, cutters and other tools of various types in their tool holders to achieve all the machining functions these tools are capable of, with any other tool mounting in any other way directly or indirectly to the base of the unit in any configuration. The milling unit M5 and M7 have a duel design function. The first function is to use one tool to perform the required machining operation, the second function is to use multiple tools simultaneously to machine a component to perform multiple drilling and tapping operations. The milling units have live tooling functions in them where the tools are driven around at machining speeds using the transmission drive shaft S and the spindle and index drive unit W. In the first design function when the active cutting tool is blunt the unit indexes around to the next tool or any other tool in the unit ready for recommencing live tooling machining operations, by using the spindle and index drive unit W when in position VA. The index drive unit AE can also index the unit in position VB when it is there. The Tool(s) used in the unit are left to the discretion of the person setting it up. The milling unit M5 and M7 connects to the tool holder unit station H on the universal tool mounting system for a machining centre shown in FIG. 1, FIG. 2, FIG. 3 and FIG. 3A by using the location and connection configuration LC.

The milling unit M5 and M7 consists of the main body onto and into which mounts the main components namely, driving gear shaft, driven gear shaft, bearings, collet, collet nut, front plate, gears, drills, cutters and tools. The main bodies consist of a hole in the center that runs straight through it and one or more holes that are set into the front face of the bodies at a calculated diameter hole circle from the center of the bodies. At the back of each of the main bodies is the female part of the location and connection configuration LC that is used for mounting the milling unit M5 and M7 onto the tool holder unit station H. Mounted in the central hole of the main bodies is the driving gear shaft which runs in bearings, this has a gear mounted in the middle of the shaft with the spline U in the back face of the shaft. The shaft on the driving gear shaft protrudes out the back end of the milling units ready for the spline U in the back face of the shaft to engage onto spline XC on the transmission drive shaft S. Mounting into the one or more holes at the calculated diameter hole circle on the front face from the center of the main bodies are the driven gear shaft(s) which run in bearings. The driven gear shaft(s) have a gear mounted in the middle of the shaft(s) and the shaft itself has a thread for the collet nut and a tapered hole for the collet at the front end of it which protrudes from the front face and body of the unit, with a thread for the bearing nut at the back end which mounts into the bottom of the driven gear shaft hole. The gear on the driving gear shaft connects to the gear on the one or more driven gear shafts and drives them around at the required machining speeds. The front plate mounts to the front face of the main body and acts as a seal and cover for it. Mounting into the tapered collet hole on the driven gear shaft is the collet, these are manufactured by companies around the world and come in varying sizes with a vast selection of different hole sizes for them.

Figure 27:
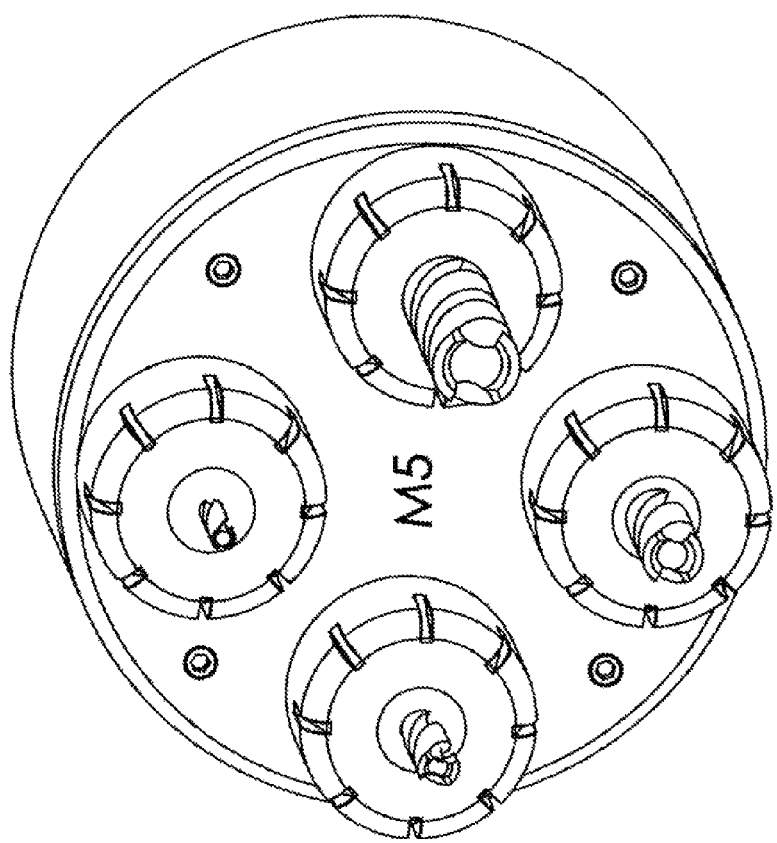
FIG. 27 Shows the milling unit M5.
Figure 29:
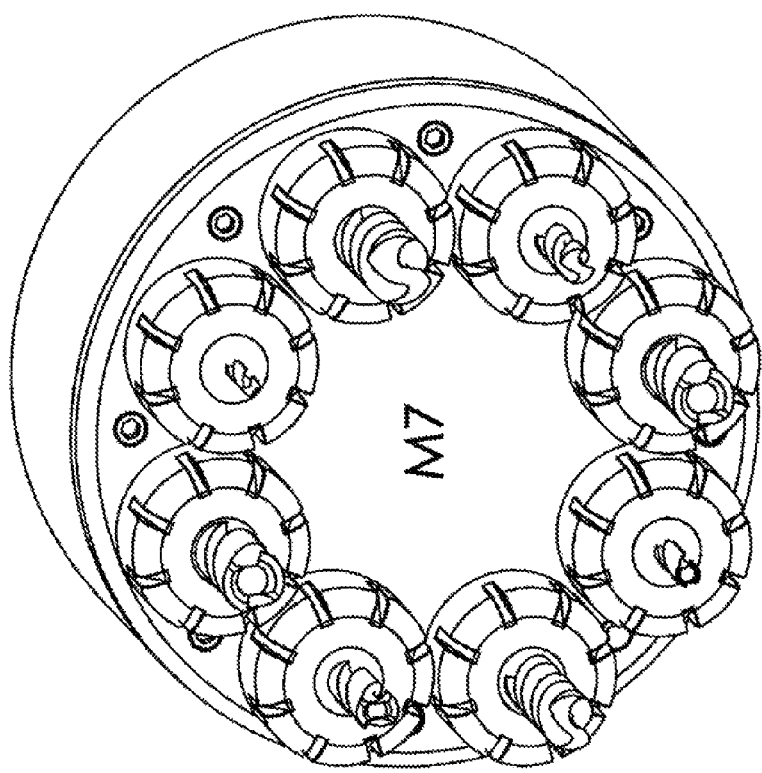
FIG. 29 Shows the milling unit M7.

Into the collets central hole mounts tools, which vary in diameter size, length, and types used. These tools and collets are selected by the person setting up either of these milling units to machine components with. Locking the tools into the collets and to the milling units are the collet nuts that are adequately tightened to the thread at the front of the driven gear shaft. The milling unit M5 and M7 has a lubricating substance inside it and is used for lubricating all moving components within it, while the unit is active in machining components. The milling unit M5 and M7 is a sealed unit, designed so that all outside contaminants can't penetrate into it and damage the unit. Another reason the unit is sealed is to keep the lubrication substance inside the unit. Refer mainly to FIG. 27, FIG. 29 and FIG. 15. The turning unit M6 has been designed to hold turning tools of various types in the holder to achieve the machining functions these tools are capable of, with any other tool mounting in any other way directly or indirectly to the base of the unit in any configuration. The turning unit doesn't have live tooling functions in it where the tools are driven around at machining speeds but it instead indexes around to the next tool or any other tool in the unit ready for commencing machining operations using the spindle and index drive unit W when in position VA. The index drive unit AE can also index the unit around in position VB when it is there. The Tool(s) used in the unit are left to the discretion of the person setting it up.

The turning unit M6 connects to the tool holder unit station H on the universal tool mounting system for a machining centre shown in FIG. 1, FIG. 2, FIG. 3 and FIG. 3A by using the location and connection configuration LC. The turning unit M6 consists of the main base into and onto which mounts all of its main components namely, turning tools, clamping block and tools. The main base consists of one or more pockets in the top face of it, into which mounts the turning tools. Along one edge of a pocket is a taper which is used with the clamping block to lock the turning tools into the base. At the back of the main body is the female part of the location and connection configuration LC, which is used for mounting the turning unit M6 onto the tool holder unit station H.

Figure 28:
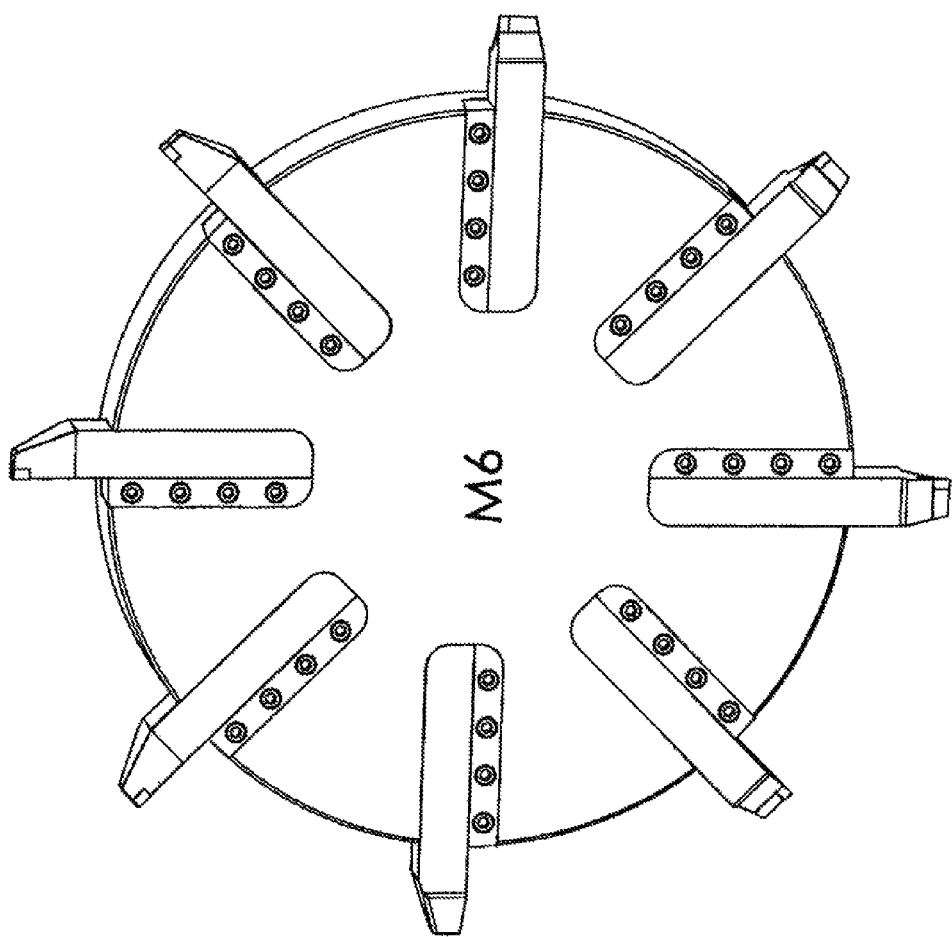
FIG. 28 Shows the turning unit M6.

The clamping block is mounted into the pocket cavity in the top of the main base beside the turning tools and has a tapered edge along one side of it. The turning tools mount into the main base of the turning unit M6 and are locked down in position by tightening the screws in the clamp block adequately to the base, this pushes together the tapered edges in the base and on the clamping block which act as a wedge causing the clamp block to lock against the side of the turning tools. The turning tools used for the unit are chosen and set in the pockets by the person using it for machining components. The radius at which the turning tools are set into the main base will vary depending on the tools used and how they are set. The turning tools used consist of a tool holder and tip insert. The tool holder can be specially made or existing ones can be purchased from companies around the world to fit into this unit, along with the tip inserts. For each different type of tip insert shape used there are usually individual tool holders for them. Refer mainly to FIG. 28 and FIG. 15.

The Multiple tool type tool holder unit M8 has been designed to hold different types of tools by mounting them into the tool holder unit. This allows components to be completely or partially machined by this tool holder unit without the requirement of drum A having to index to the next used tool holder unit mounted to it. The tools used can be chosen from a vast selection including drills, cutters, parting tools, turning tools, boring bars, form tools, special tools and any other cutting tool. The Multiple tool type tool holder unit can have a combination of live tool functions where the tool are driven around at machining speeds and fixed tool functions depending on what tools are required to completely or partially machine a component.

The Multiple tool type tool holder unit is indexed around and if required live tooling tools are activated using the spindle and index drive unit W when in position VA. The index drive unit AE can also index the unit in position VB when it is there. The tool(s) used in this unit are left to the discretion of the person setting it up. The Multiple tool type tool holder unit connects to the tool holder unit station H on the universal tool mounting system for a machining centre shown in FIG. 1, FIG. 2, FIG. 3 and FIG. 3A by using the location and connection configuration LC. Located on the back of the Multiple tool type tool holder unit is the female part of the location and connection configuration LC, which is used for mounting it onto the tool holder unit station H.

Figure 30:
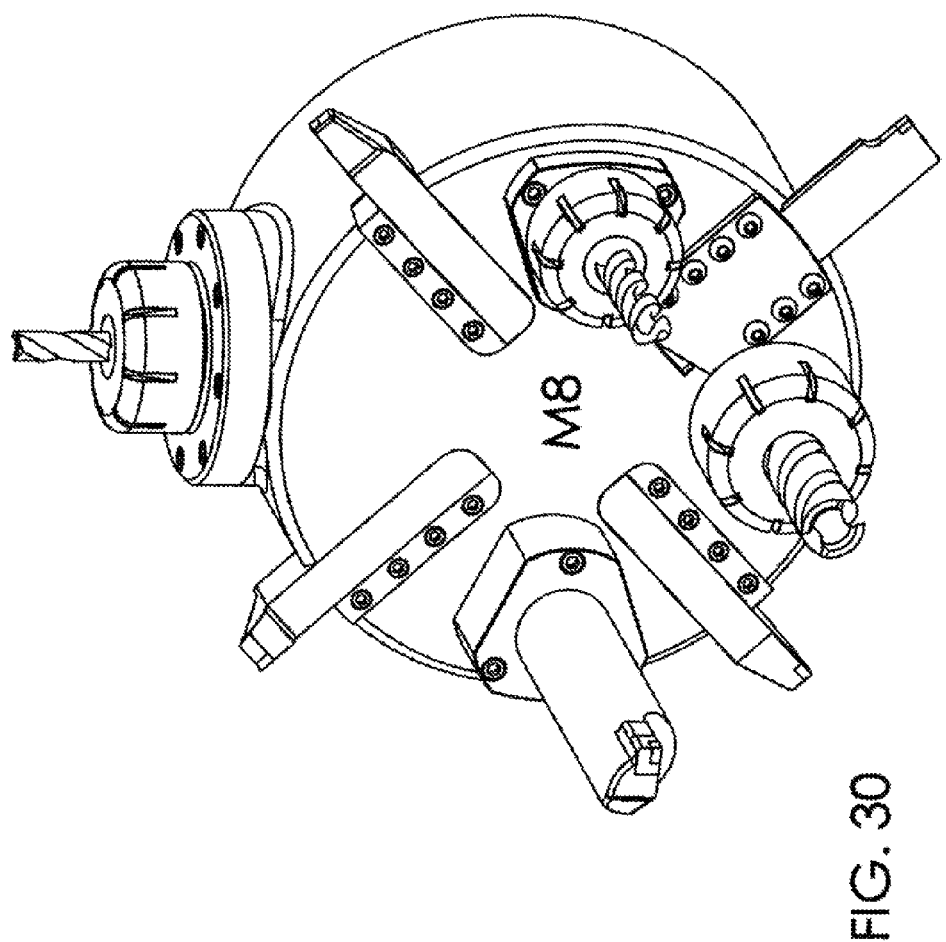
FIG. 30 Shows the Multiple tool type tool holder unit M8.

The base of the tool holder unit has pockets, cavities, slots and holes machined into it so that tools can mount into the base along with the tool holders, where the tool holders also have tools mounted into them. With several multiple tool type tool holder units mounted to drum A the universal tool mounting system for a machining centre can machine several different components at once. For example when drum A has ten multiple tool type tool holder units mounted onto it, then ten different components can be machined completely or partially in any sequence depending on how the machine is programmed. Refer to FIG. 15 and FIG. 30.

The multicut turning unit doesn't have live tooling functions in it where the tools are driven around at machining speeds. The multicut turning unit mounts on the universal tool mounting system for a machining centre via the tool holder unit station H mounted in drum A. The multicut turning unit can index around independently of drum A using the tool holder unit station or it can stay in a stationary position. The multicut turning unit can also be mounted on CNC machines or conventional machine tools to perform the same functions it was designed for. The unit has a tool holder as part of the design where tip inserts are inserted into them and left to the discretion of the person setting it up to choose the correct ones to use when machining a component. The multicut turning unit M9 also facilitates the addition of extra cutting tools being mounted in any other way directly or indirectly to the base of the unit in any configuration. When the multicut turning unit M9 is mounted on the universal tool mounting system for a machining centre it connects to the tool holder unit station H shown in FIG. 1, FIG. 2, FIG. 3 and FIG. 3A by using the location and connection configuration LC shown in FIG. 15.

The description of the multicut turning unit M9 is aided by making reference to FIG. 33 to FIG. 39 to fully understand the design of the unit. In the assembly shown in FIG. 33, FIG. 34, FIG. 36 and FIG. 37 there are sixteen main parts, namely Base CA, Tee Block CC, Adjustment screw CI, Column CE, Tool sliding block CF, Tip insert CG, Columns vertical adjustment screw CQ, grub screw CR, Screw CJ, Coolant nozzle CK, Inlet connector CN, Guideway blocks CO, Retainer ring CS, Screw CT, Screw CU and Strengthening column CV. These are made of a suitable metal or material to achieve their full design functions. The assembly may consist of more than one of the above components if required. The multicut turning unit mounts onto the universal tool mounting system for a machining centre using base CA. The multicut turning unit can also mount onto other CNC machines or conventional machine tools by adapting base CA or leaving it as it is. Base CA has a round shaped surface on its outer diameter with semi round projections protruding out from this round surface. Located in base CA is one or more Tee Slot(s) CB these spread out from the center of the base and run through the center of the semi round projections to the outside of them. The semi round projections protruding out of the outside diameter of base CA are used to extend the tee slot CB to increase the adjustment the column CE has along the tee slot. In the middle of the Tee Slot CB is the cut threaded hole CM which is used for adjustment purposes. Mounted into the front face of base CA is one or more coolant nozzle(s) CK, this adjusts by the ball shape on the bottom of the nozzle moving inside the spherical recess inside the base. This directs the high pressure coolant to the cutting tip insert CG depending on where it is positioned relative to the base. At the back of the main base CA is the location and connection configuration LC that is used for mounting the unit onto the tool holder unit station H.

The high pressure coolant is fed into the base through the inlet connector CN. From there the coolant is directed to the coolant nozzle(s) CK through a series of holes inside base CA. The Tee block CC has a cavity in the bottom of it big enough to fit the adjustment screw CI and two clearance holes for an Allen key. At the top of the Tee Block CC is a blind threaded hole for the screw CJ to thread into. The Tee Block CC slides within the Tee Slot CB in base CA and is adjusted by turning the adjustment screw CI which is connected to cut threaded hole CM in a clockwise or anticlockwise direction. This moves the Tee Block along the axis of the Tee Slot or Tee Slots. Column CE consists of a round column surface on the outside diameter with a screw cavity through the center for the screw CJ, the thread CW which is in the top of the screw cavity for the screw CJ, the pocket in the top of it for the adjuster plate assembly, the bottom round boss, the parallel boss cut into the bottom of the bottom round boss and three flat surfaces on the columns round surface. The round column surface is also used so that all swarf hitting this surface will slide and fall away giving an excellent swarf removal feature for the multicut turning unit.

The column CE connects and is fixed onto base CA by the parallel boss cut into the bottom of the bottom round boss connecting into the top of the tee slot it mounts into with the screw CJ mounted inside the column CE threading into the blind threaded hole in the tee block CC to hold it to base CA. To move the column CE the screw CJ is loosened then the adjustment screw CI at the bottom of the tee block is rotated in a clockwise or anticlockwise direction, this moves the column along the axis of the tee slot to the required radial cut from the center of base CA. When the column CE is set at the required radial cut the screw CJ is adequately tightened into tee block CC so the column is fixed securely in position to base CA. Mounted on the top of the column CE is the adjustment plate assembly. The top of the columns vertical adjustment screw CQ is attached to this and is part of the assembly where it can rotate around inside, but not move out of position. Rotation of the columns vertical adjustment screw CQ in both directions is achieved by using an Allen key in the Allen key hole at the top of the thread. The tool sliding block CF is used to facilitate the holding of tip inserts CG. These tip inserts machine down materials into parts and components. The tool sliding block CF can be adapted to hold one or more tip inserts.

The tool sliding block CF consists of a hole through the center, one or more pocket holes cut into the center hole for the guideway blocks CO to mount into, grub screw holes, a threaded hole to screw the columns vertical adjustment screw CQ into and a recess pocket for the tip insert CG to mount into. Each of the grub screw holes in the tool sliding block go from the outside surface and connect into the guideway blocks CO pockets. The guideway blocks mount into the tool sliding block CF. The guideway blocks CO are held into position in the tool sliding block CF with the column CR and the grub screws CR. The tool sliding block CF and the guideway blocks both mount on the column CE. The height of the tip inserts CG mounted in the tool sliding block CF from base CA is adjusted using the columns vertical adjustment screw CQ, which is mounted into the threaded hole in the tool sliding block CF opposite to where the tip insert is mounted. The tool sliding block can be set to any position along the column, once it is positioned to the desired height relative to the base the grub screws CR are tightened adequately so the guideway blocks lock onto the flat on the column to give a rigid connection between them. Many different types of tip inserts are made by various companies around the world, because of this different types of tip inserts are purchased from these companies to suit the material being machined, the cutting conditions and the speeds and feeds of machine tools. As a result the tool sliding block CF will have to be constructed to suit different types of tip inserts or altered in a way so each type of tip insert can be easily attached.

The column and all the other attached components on it can be turned around one hundred and eighty degrees on base CA if required so that the tip insert CG is facing away from the center of base CA.

Figure 36:
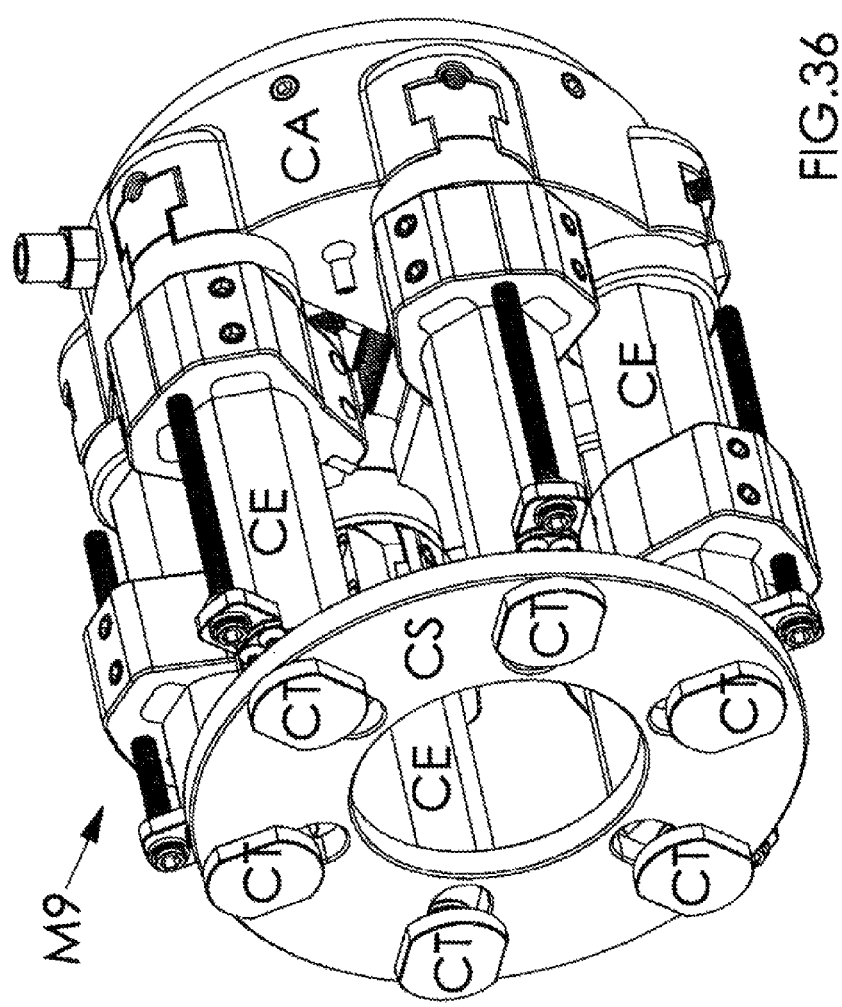
FIG. 36 Shows a side front view of the multicut turning unit M9 with the retainer ring CS and the screws CT mounted onto the unit.
Figure 37:
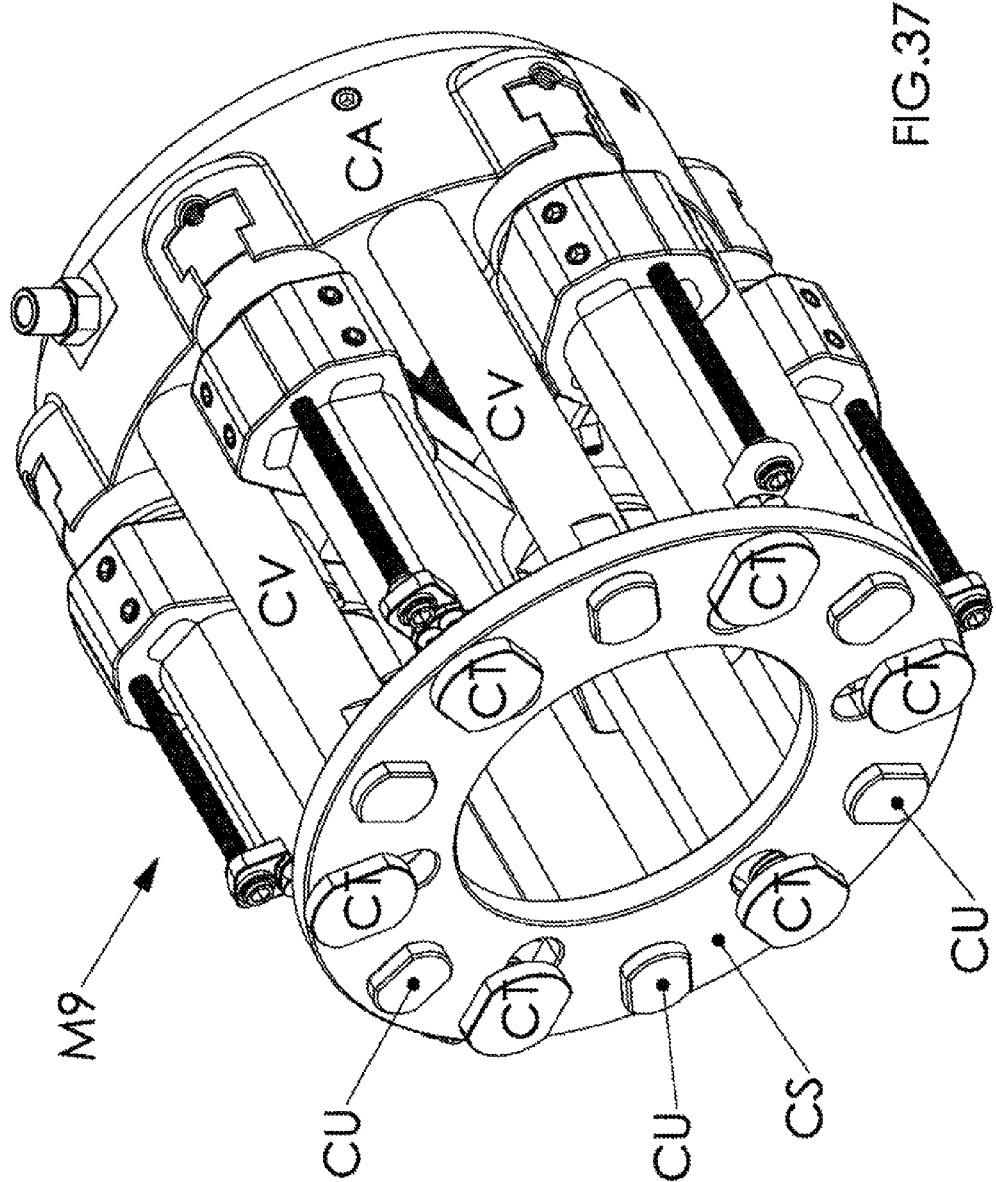
FIG. 37 Shows a side front view of the multicut turning unit M9 with the retainer ring CS, the strengthening column CV, the screws CT and screws CU mounted onto the unit.
Figure 38:
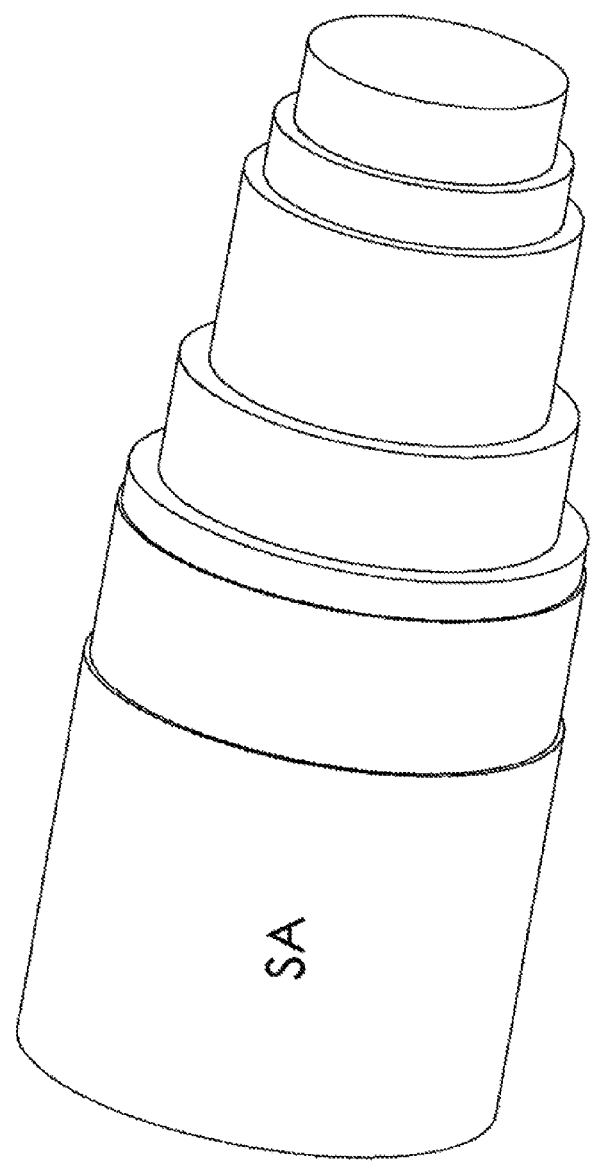
FIG. 38 Shows the result of turning multiple diameters on a component or workpiece SA in which a stepped profile of different reduced diameters is produced longitudinally in one passing cut of the Multicut Turning Unit M9.

In FIG. 36 mounted into the tort of column(s) CE is the retainer ring CS. The retainer ring CS has slots in it that are used for the adjustment of column(s) CE. The retainer ring CS is used to securely hold the top of the column(s) CE once they have been adjusted into position. To securely hold the retainer ring into position on the top of the column(s) CE the screws CT are used. The screws CT push through the slots in the retainer ring CS and thread into the thread CW and tighten to hold the retainer ring CS onto the column(s) CE. In FIG. 37 the retainer ring CS is similar to the retainer ring in FIG. 36 with the exception of extra holes in it for the screws CU to fit through. The strengthening column CV is also added to the assembly. The bottom of the strengthening column CV is mounted into base CA and secured. At the top of the strengthening column CV is a threaded hole in which the screw CU screws into. The screws CU go through the retainer ring CS and mount into the threaded hole at the top of the strengthening column CV. When the screws CU are tightened it holds the retainer ring CS securely to the strengthening column CV.

The purpose of the retainer ring CS is to dramatically reduce the movement of the top of column CE, when there is a load imposed on it from cutting forces as the multicut turning unit is in use. This reduces the vibration throughout the unit and increases its performance by producing better cutting conditions to the tip inserts CG. The strengthening column CV also adds a more rigid structure to the multicut turning unit, to further reduce vibration imposed on the tip inserts CG while turning a component. The shape and size of the retainer ring CS doesn't have to be the same shape and size as shown in FIG. 36 and FIG. 37 because it is dependent on the final adjusted settings of the Multicut turning unit to determine it.

Another embodiment, M9', of the Multicut Turning Unit M9 is aided by making reference to FIG. 40 to FIG. 43. This embodiment of the Multicut Turning Unit also has two axes of adjustment for each tool and performs the same functions as the Multicut Turning Unit shown in FIG. 33 to FIG. 37 and mounts to CNC machine tools and conventional machine tools used in the engineering industry. In the embodiment shown in FIG. 40 to FIG. 43 housing GA replaces the components shown in FIG. 33 to FIG. 37 namely, Base CA, column CE, strengthening column CV, Retainer ring CS, screw CT and screw CU.

Housing GA is constructed of suitable material and can be made by many methods, one such method can be to cast it and then machine it. The housing GA has a round shaped surface on the outside diameter, a blind hole in the middle of it, one or more tapered slots GB through the side of it which go through into the blind hole in the middle and one or more recess pockets GC in the side of it between the tapered slots GB. The tapered slots GB in housing GA have two outer tapers and two inner tapers. Mounting into the housing GA in each tapered slot GB are two tool holder blocks, GD and GE. Each tool holder block mainly has two tapered sides, a hole through the centre to mount a tool GI into and holes with grub screws GL in them, which are used to lock the tools GI into the tool holder blocks GD and GE. The two tapered sides on each tool holder block GD and GE match the two inner tapers and the two outer tapers on the sides of the tapered slots GB in housing GA.

Mounting into the recess pockets GC, between the tapered slots GB are one or more adjustment screws GF with an attached measurement dial on top. The adjustment screw GF and attached dial can only be moved rotationally in a clockwise or anticlockwise direction within the hole it is mounted into in housing GA. Attached to these adjustment screws GF are one or more adjustable arm brackets GG.

The adjustable arm brackets GG are attached with screws GH to the tool holder blocks GD and GE, in which the screws GH have clearance holes which go right through tool holder block GD and then thread into tool holder block GE. To position the tool GI along the axis of the tapered slot GB the adjustment screw GF is adjusted in a clockwise or anticlockwise direction. This is achieved because the tool GI is mounted in the tool holder blocks GD and GE, the adjustable arm bracket GG is mounted to the tool holder block GD and GE with screws GH and the adjustable arm bracket GG is attached to the adjustment screw GF via the threaded hole in it.

Mounted into the adjustable arm bracket GG is the adjustment screw GJ with attached measurement dial on top. The adjustment screw GJ and attached dial can only be moved rotationally in a clockwise or anticlockwise direction within the hole it is mounted into in the adjustment arm bracket GG. The adjustment screw al threads into the threaded hole in the back of the tool GI. Therefore the radial cut of the tool GI is adjusted when the adjustment screw GJ is rotated in a clockwise or anticlockwise direction.

After each tool GI has been positioned in its two axis's of adjustment it is locked into position in both axis's to ensure it is held securely and rigidly within housing GA. The first axis of adjustment positions the tools GI along the tapered slots GB. After the tool is adjusted in this axis it is locked into position by tightening the screws GH. This causes the two tapers on tool holder block GE to engage on the two inner tapers in the tapered slots GB in housing GA, the two tapers on tool holder block GD to engage on the two outer tapers in housing GA and the adjustable arm bracket GG to be securely held onto tool holder block GD. The second axis of adjustment alters the radial cut of the tools GI. After the tool is adjusted in this axis it is locked into position by tightening the grub screws GL in tool holder block GD and tool holder block GE.

Figure 43:
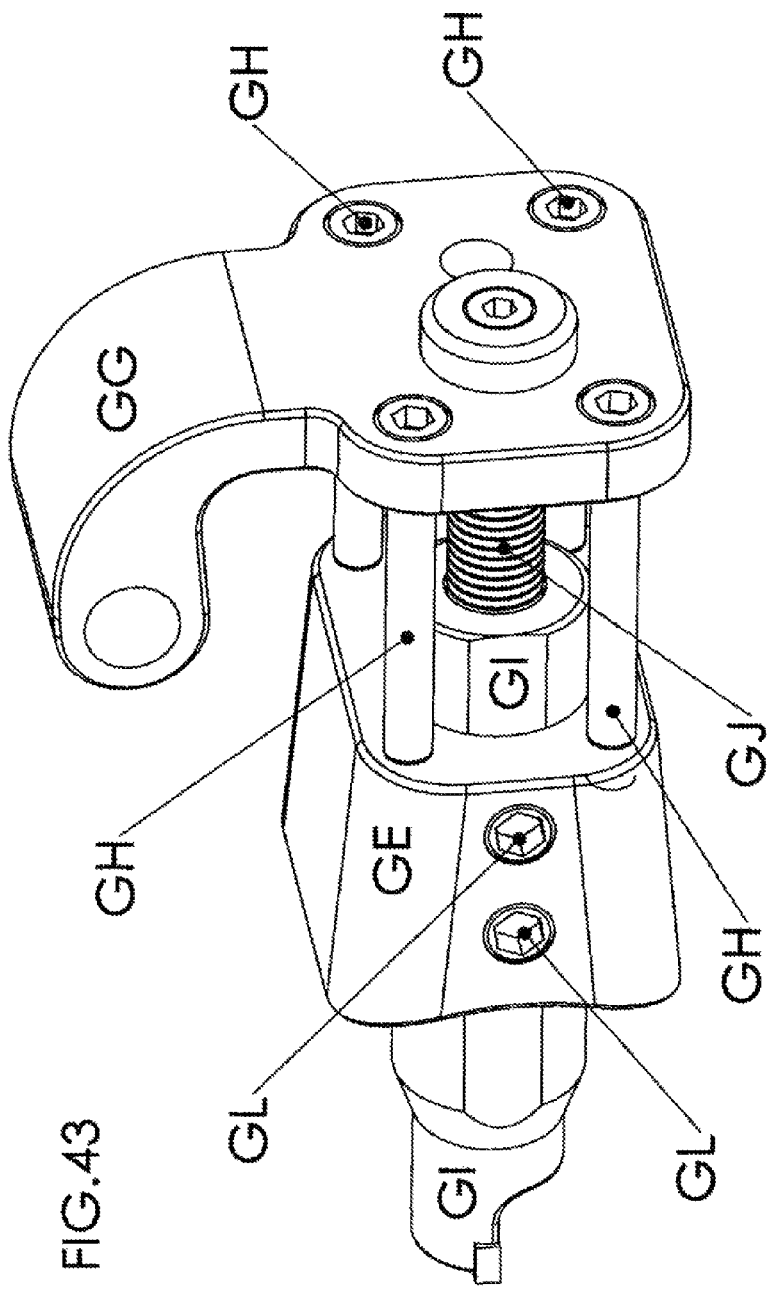
FIG. 43 Shows the assembly, for use with the alternative Multicut Turning Unit M9', of all the components needed to add another tool GI into the tapered slot GB and also shows the components used to adjust the radial cut of the tool GI.
Figure 44:
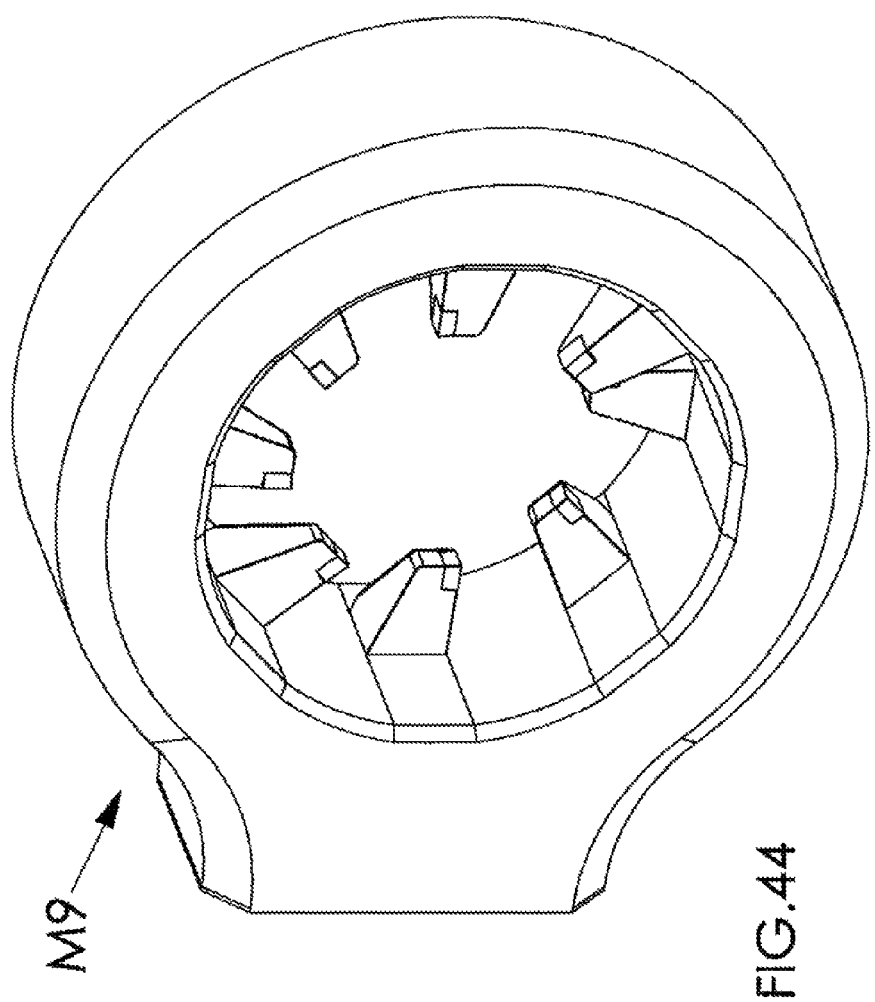
FIG. 44 Shows a front side view of a further alternative embodiment of Multicut
Turning Unit M9, shown as M9".
Figure 45:
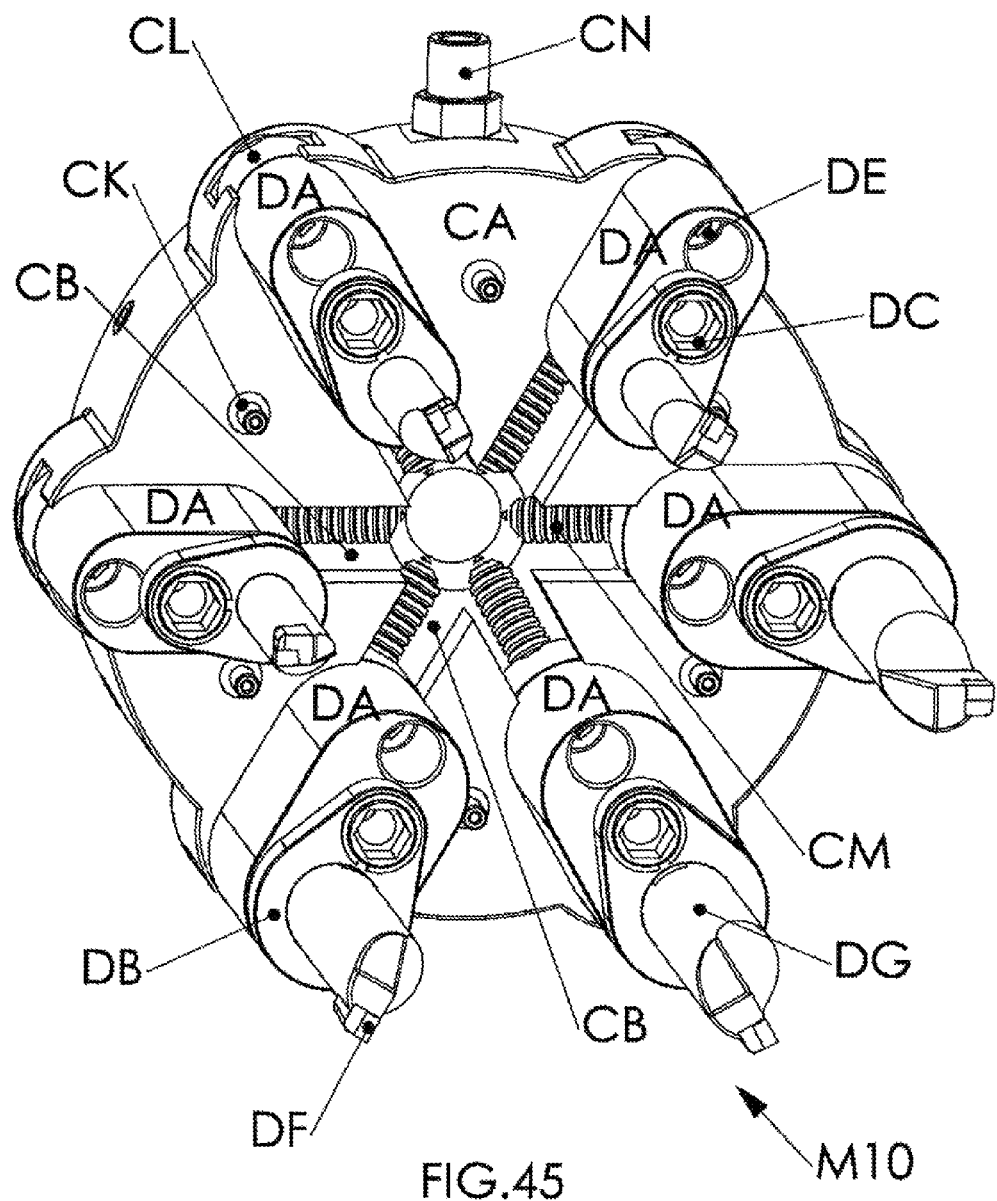
FIG. 45 Shows the front side view of the multicut boring bar unit M10.
Figure 46:
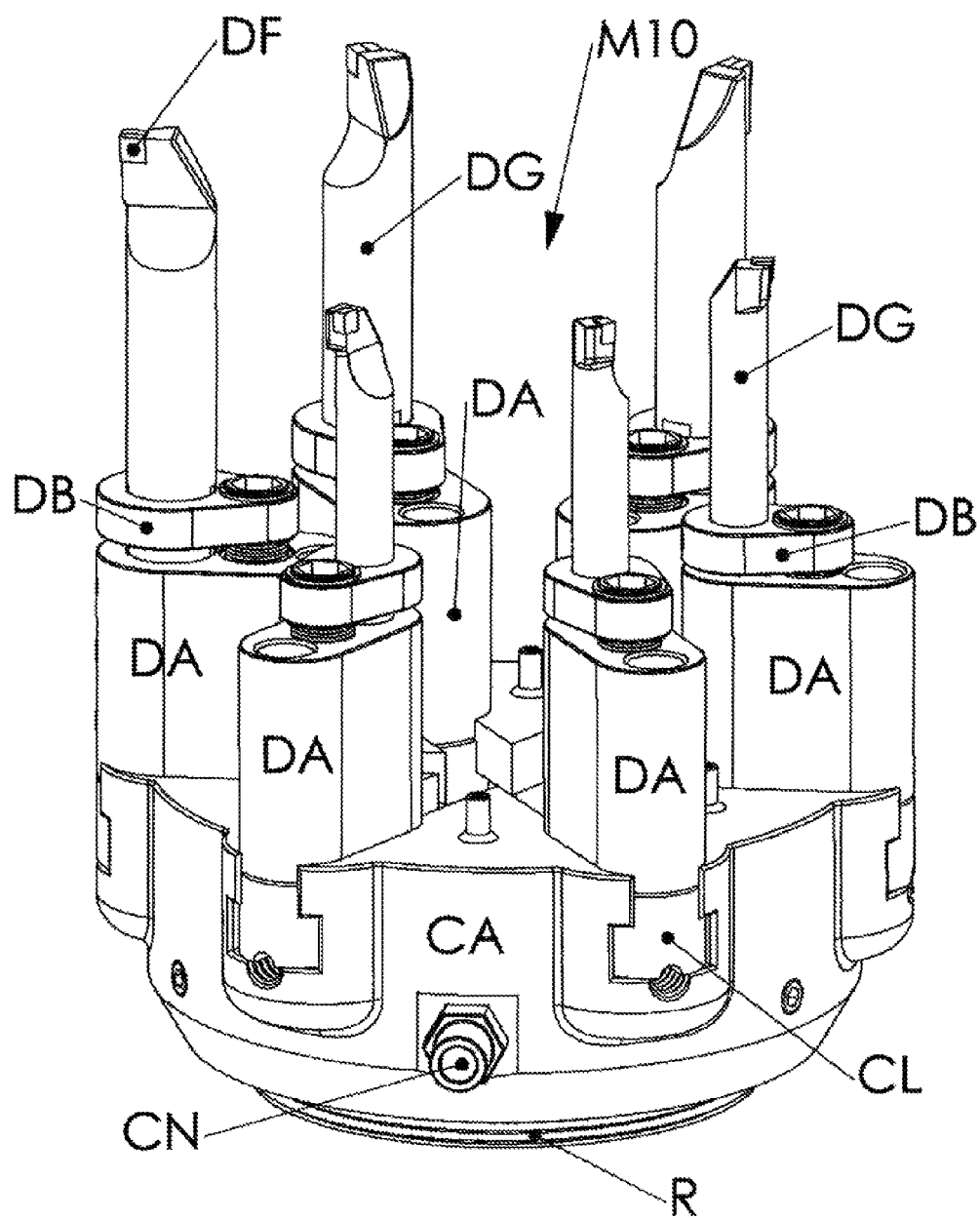
FIG. 46 Shows the side front view of the multicut boring bar unit M10.

The Multicut Turning Unit M9' can also have more than one tool GI mounted into the tapered slot GB by adding the necessary components as seen in FIG. 43, including tool holder block GE and GD and the adjustable arm bracket GG. Mounting to the front face of housing GA are one of more tools GK that can be used to turn a finishing cut on the component or workpiece or to perform general turning operations. When one or more tools GK are mounted into the front face of the housing GA the multicut turning unit indexes around to the extra tool GK to commence turning operations with it. Another embodiment of the Multicut Turning Unit M9" is aided by making reference to FIG. 44. This embodiment of the Multicut Turning Unit has been designed to perform one of the three functions as the Multicut Turning Unit shown in FIG. 33 to FIG. 37 and mounts to CNC machine tools and conventional machine tools used in the engineering industry.

Here the tools are mounted into a housing with each tool being permanently set into position to perform one of the three functions it has been designed for. The housing is constructed of suitable material and can be made by many methods, one such method can be to cast it and then machine it. The Multicut Boring Bar Unit M10 doesn't have live tooling functions in it where tools are driven around at machining speeds. The Multicut Boring Bar Unit mounts on the universal tool mounting system for a machining centre via the tool holder unit stations H mounted in drum A. The Multicut Boring Bar Unit can also be indexed around via the tool holder unit station it is connected and mounted to in drum A.

The Multicut Boring Bar Unit can also be mounted onto CNC machines and conventional machine tools to perform the same function it was designed for. The unit has boring bar holders in it as part of the design, where the boring bars are set into these holders and left to the discretion of the person setting it up to choose the correct ones to use when machining components. The multicut boring bar unit M10 also facilitates the addition of extra cutting tools being mounted in any other way directly or indirectly to the base of the unit in any configuration. The multicut boring bar unit can also hold any other tool in its boring bar holder along with custom tools to machine components. When the multicut boring bar unit M10 is mounted on the universal tool mounting system for a machining centre it connects to the tool holder unit station H shown in FIG. 1, FIG. 2, FIG. 3 and FIG. 3A by using the location and connection configuration LC shown in FIG. 15. The description of the Multicut Boring Bar Unit M10 is aided by making reference to FIG. 45 to FIG. 51 to fully understand the design of the unit. In the assembly shown in FIG. 45 to FIG. 47 there are fifteen main components namely, Base CA, Tee block CL, Adjustment screw CD, Boring bar holder DA, Vertical adjustment plate DB, Vertical adjustment screw DC, Boring bars DG, Grub screw DD, Screws DE, Coolant nozzle CK, Tip insert DF, inlet connector CN, Boring bar bracket DI, Retainer ring DH and Screws DJ. These are made of a suitable metal or material to achieve their full design functions. The assembly may consist of more than one of the above components if required. The multicut boring bar unit is mounted onto the universal tool mounting system for a machining centre using base CA. The multicut Boring bar unit can also mount onto other CNC machines or conventional machine tools by adapting base CA or leaving it as it is. Base CA has a round shaped surface on its outer diameter with semi round projections protruding out from this round surface. Located in base CA is one or more Tee Slot(s) CB these spread out from the center of the base and run through the center of the semi round projections to the outside of them. The semi round projections protruding out of the outside diameter of base CA are used to extend the tee slot CB to increase the adjustment the boring bar holders have along the tee slot. In the middle of the Tee Slot CB is the cut threaded hole CM which is used for adjustment purposes. Mounted into the front face of base CA is one or more coolant nozzle(s) CK, this adjusts by the ball shape on the bottom of the nozzle moving inside the spherical recess inside the base. This directs the high pressure coolant to the cutting tip insert DF depending on where it is positioned relative to the base.

At the back of the main base is the location and connection configuration LC Which is used for mounting the unit onto the tool holder unit station H. The high pressure coolant is fed into the base through the inlet connector CN. From there the coolant is directed to the coolant nozzle(s) CK through a series of holes inside base CA. The Tee block CL has a cavity in the bottom of it big enough to fit the adjustment screw CD and two clearance holes for an Allen key. At the top of the Tee Block CL are two blind threaded holes for the screws DE to thread into. The Tee Block CL slides within the Tee Slot CB in base CA and is adjusted by turning the adjustment screw CD which is connected to cut threaded hole CM. This moves the Tee Block CL along the axis of the Tee Slot or Tee Slots. The boring bar holder DA is attached to the tee block CL and consists of three holes in the top of it, grub screw holes down the side connecting into the boring bars mounting hole CP and the cut parallel boss on the bottom. The hole CP in the top is the boring bars mounting hole, with the other two holes being used to mount the DE screws into, which are used to secure the boring bar holder DA to the tee block CL in base CA. The middle DE screw hole also has the thread CH cut into the top of it. The grub screw holes down the side of the boring bar holder have the grub screws DD in them which are adequately tightened against the boring bars DG mounted into their holes to hold them securely in position.

The boring bar holder DA connects onto the base CA by the cut parallel boss in the bottom of it connecting into the top of the tee slot CB it mounts into, with the screws DE in there holes screwing into the two-blind threaded holes in the tee block CL to hold it to base CA. To move the boring bar holder DA the screws DE are loosened then the adjustment screw CD at the bottom of the tee block CL is rotated, this moves the boring bar holder along the axis of the tee slot to the required radial cut from the center of base CA. When the boring bar holder DA is set to the required radial cut the screws DE are adequately tightened so the boring bar holder DA is fixed securely in position to base CA. The vertical adjustment plate DB consists of a boring bar hole, the hole for the vertical adjustment screw DC and the threaded grub screw hole down the side that goes through the outside wall of the plate. Mounted into the vertical adjustment plate DB is the vertical adjustment screw DC, this is fixed into its hole so that it can be rotated in a clockwise or anticlockwise direction but it can not be moved up and down in the direction of the hole it is mounted into. This combined component assembly attaches to the boring bar holder DA, by the vertical adjustment screw DC threading into the thread CH.

The correct rotational position occurs when the boring bar hole in the vertical adjustment plate DB lines up with the boring bars hole, hole CP in the boring bar holder DA. The vertical adjustment screw DC consists of a threaded portion running up the outside of the screw, a hole through the center to allow an Allen key to fit through it, to tighten or unscrew the DE screw in their holes at the bottom of the boring bar holder DA and an Allen key cavity at the top which is used to adjust the vertical adjustment plate towards or away from the boring bar holder using an Allen key. The boring bars that are used in this unit come in varying sizes and shapes which have different tip inserts in them depending on the cutting conditions and environment they are used in. Both the boring bars DG and the tip inserts DF used are manufactured by multiple companies around the world, in which most of these can be used in the multicut boring bar unit M10. The boring bar holders DA can be turned around one hundred and eighty degrees if required when boring out components the multicut boring bar unit can also hold custom tools and special tools in the boring bar holder DA or by using a custom designed holder to fit onto the base.

Figure 47:
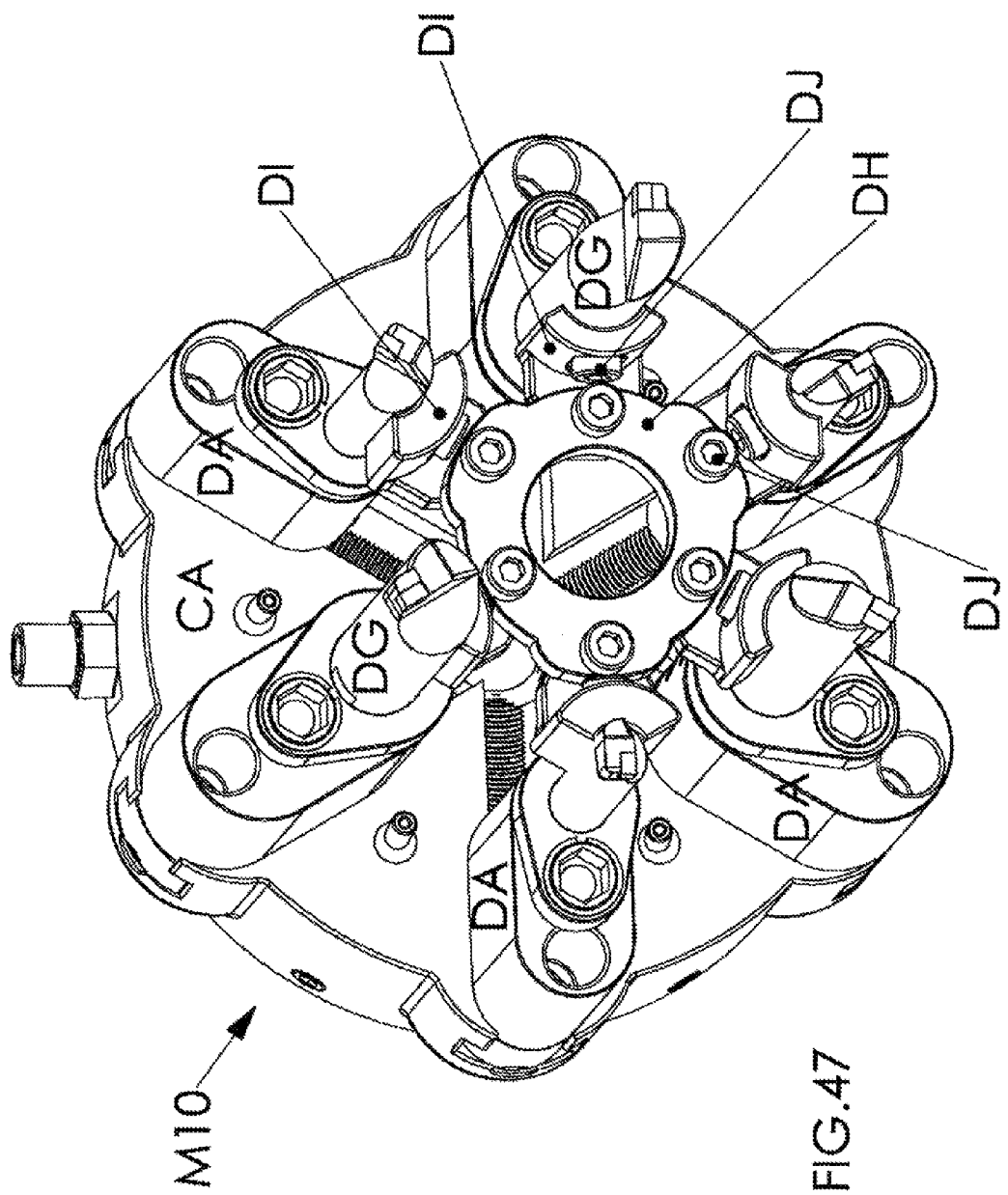
FIG. 47 Shows the front side view of the multicut boring bar unit M10 with the retainer ring assembly containing the retainer ring DH, the boring bar brackets DI and the screws to hold it all together mounted to the boring bars.
Figure 48:
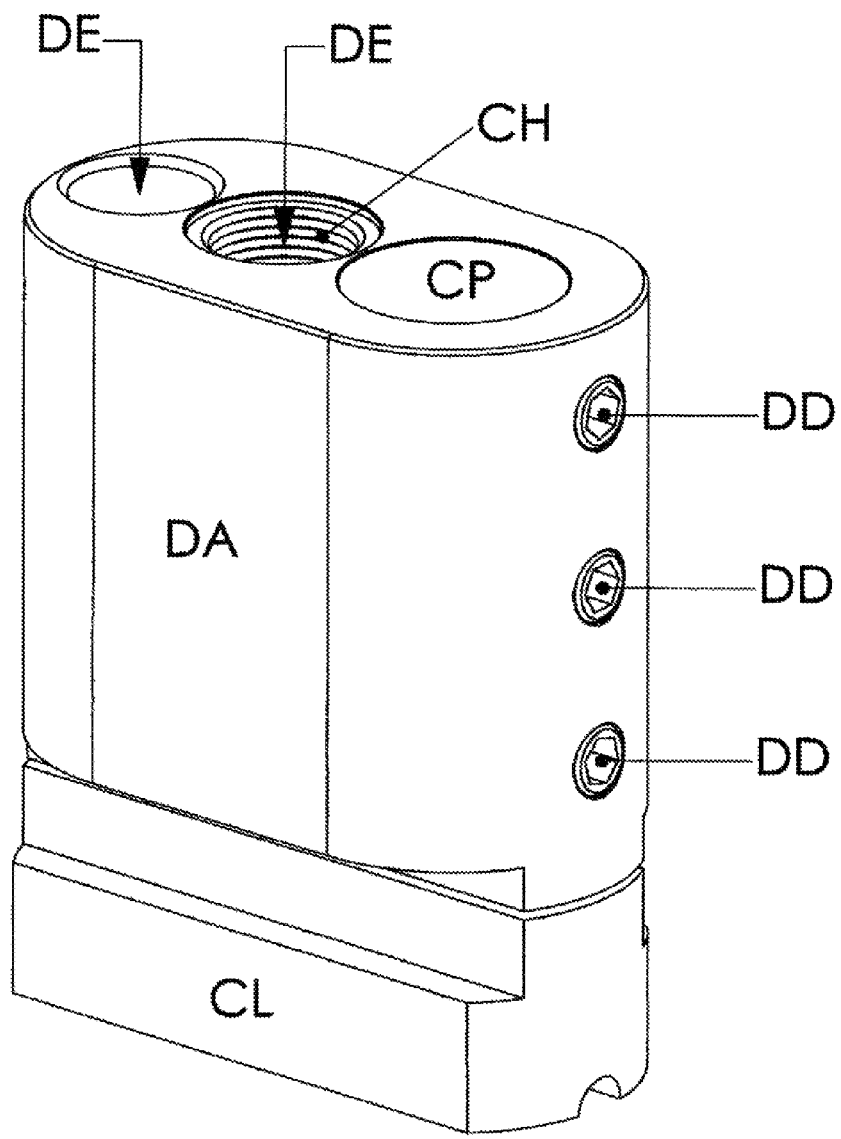
FIG. 48 Shows the side front view of the partially assembled multicut unit M10 in FIG. 45 and FIG. 46 showing the tee block CL, boring bar holder DA and grub screws DD.
Figure 49:
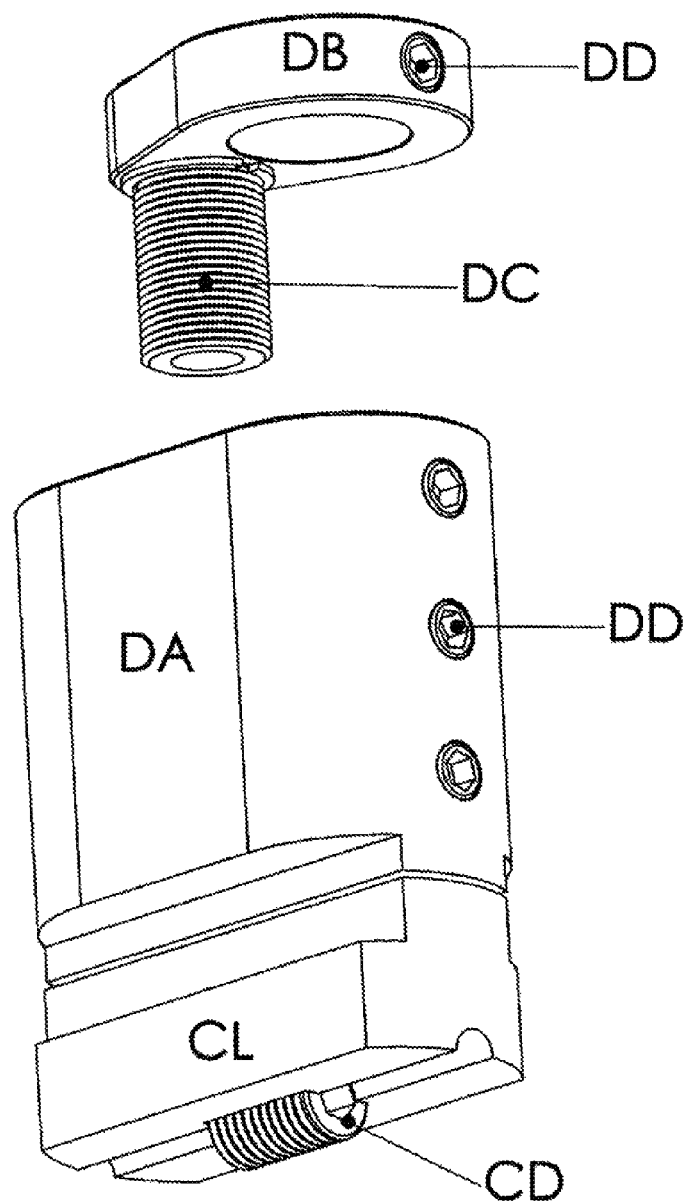
FIG. 49 Shows the bottom side view of the partially assembled multicut unit M10 in FIG. 45 and FIG. 46 showing the tee block CL, the adjustment screw CD, boring bar holder DA, grub screws DD, vertical adjustment plate DB and the vertical adjustment screw DC.

In FIG. 47 the retainer ring assembly is attached to the multicut boring bar unit. The retainer ring assembly consists of the boring bar brackets DI mounting to the boring bars DG. The retainer ring DH mounting to the boring bar brackets DI and the screws DJ to securely hold it all together in position. The retainer ring assembly doesn't have to be made from separate components, but instead can be made from one component. The shape of the retainer ring assembly doesn't have to be the same shape as shown in FIG. 47 as long as it achieves the desired function.

The purpose of the retainer ring assembly is to dramatically reduce the vibration caused on the boring bars while boring a component. The distance the retainer ring assembly is set to along the baring bars is dependent on the boring bars used and their height they stick out from the boring bar holder DA. Once this is known the retainer ring assembly can be attached at the required distance along the boring bars so that if reduces the movement of the boring bars set in their holders by holding them in position together.

The location and connection configuration LC consists of the male location and connection configuration and the female location and connection configuration, these two configurations are used to attach and mount and interchange the tool holder units to the tool holder unit stations H. The male location and connection configuration is located on the front of the tool holder unit station H as seen on the bottom image in FIG. 15 and consists of the main components and features namely, main body AU, location pins O, thread lock ring Q and central boss with taper N on it on the main body AU. The female location and connection configuration is located on the bad(end of the main body of a tool holder unit and is also seen in FIG. 15 on the top image, these features consist of namely, the location pin holes P, thread R and the central tapered hole with the taper NA in it.

The male and female location and connection configurations engage together by the location pins O locating into their location pin holes P by correctly aligning them together, along with the central boss with taper N on it on the main body AU and the central tapered hole with taper NA on it connecting together pushing taper NA onto taper N. As the male and female location and connection configuration connects together the thread R and the thread on the inside of the thread lock ring Q are screwed together, until they are adequately tightened holding the tool holder unit onto the tool holder unit stations mounted in drum A. Refer mainly to FIG. 15. All the hydraulic cylinder running assemblies and drive systems including the spindle and index drive unit W and the index drive unit AE throughout the universal tool mounting system for a machining centre could also be driven or run by the equivalent replacement devices if they will achieve the same features that they provide with their operational movements. If this is done certain design features within the tool system for a machining centre could change or become obsolete to accommodate the equivalent replacements or electrical devices. The coolant manifold blocks AR have been individually designed to suit each designed and manufactured tool holder unit and mount on drum A on the front face beside their tool holder unit they are to supply coolant to. The coolant flow from the coolant manifold blocks AR supplies coolant to the tool in the machining position.

The coolant supply is delivered to the coolant manifold blocks AR by the coolant pipe BW which is fixed and secured to the endplate AN so that it can't rotate around in either a clockwise or anticlockwise direction. This pipe runs from the endplate AN and right through the centre of spindle B to the back of drum A, where it connects into the coolant distribution disc EA mounted in drum A. The coolant distribution disc EA is constructed of a round turned piece of suitable material and consists of one blind hole EB in the centre of it from the back, into which the coolant pipe BW connects to. The coolant distribution disc EB also has two holes down the side of it which connect into the central hole, hole EB. The two holes down the side of the coolant distribution disc EA are situated in the middle and top of it, where the middle hole EC feeds the coolant hole lined up with position VA from the several coolant holes inside drum A and the top hole ED feeds the coolant manifold disc BV mounted to the front of drum A. These two side holes are rotationally positioned so that they face position VA to feed coolant to the active cutting tool on the tool holder unit used. The coolant manifold disc BV is constructed of a suitable material and consists of a blind hole in the bottom in the centre of it, into which fits the top of the coolant distribution disc EA and several holes on the outside diameter which connect into the central hole, where each hole is directed towards a tool holder unit station H and the attached tool holder unit(s) on drum A.

Figure 2:
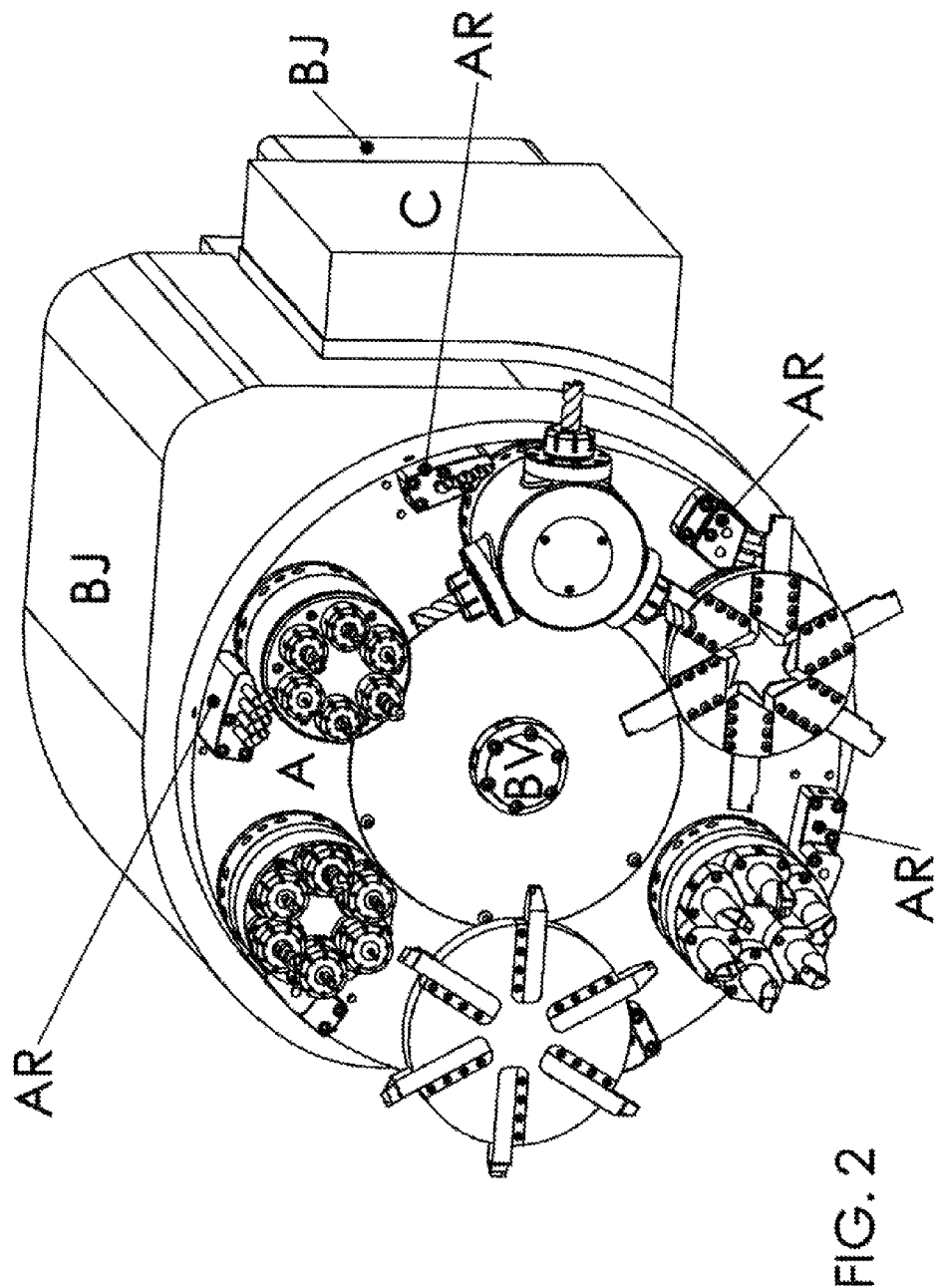
FIG. 2 Shows a front side view of the universal tool mounting system for a machining centre with tool holder units and coolant manifold blocks attached and mounted onto it.
Figure 3:
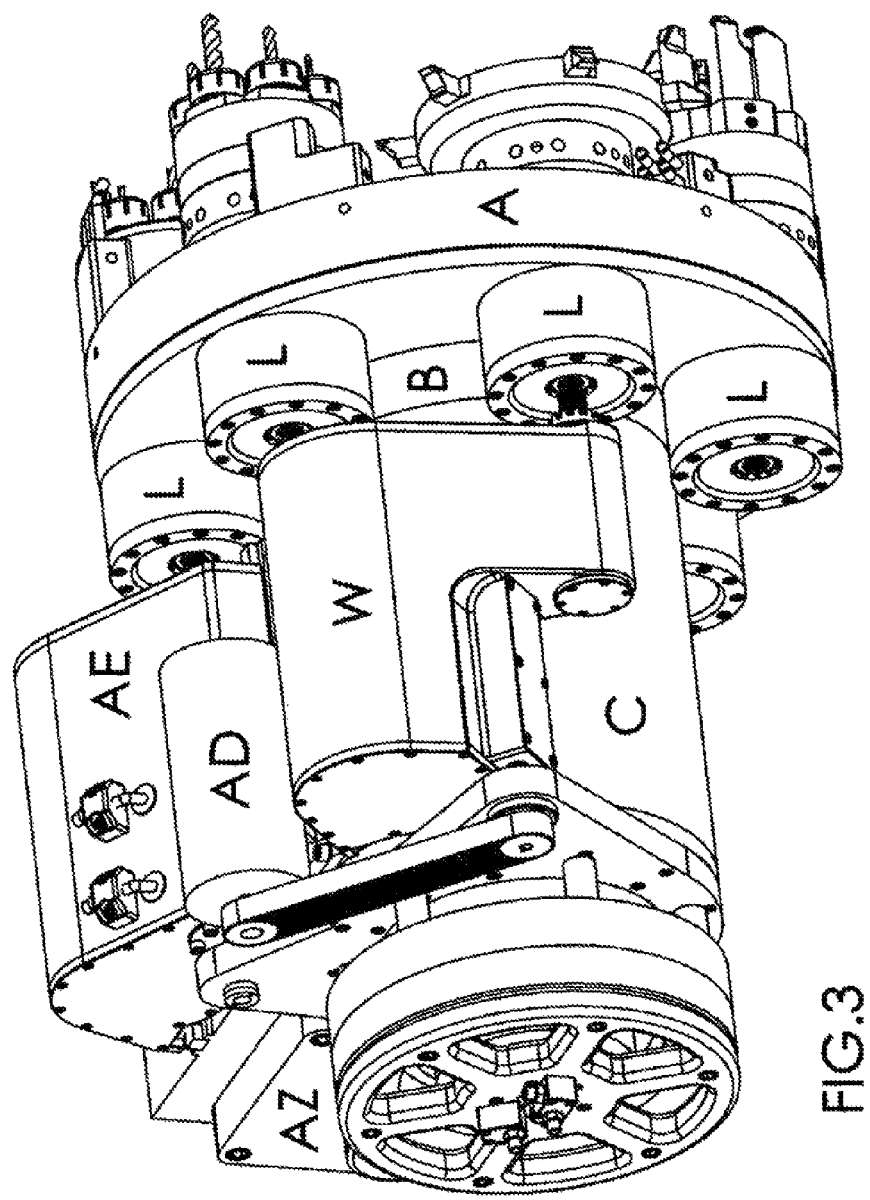
FIG. 3 Shows a back side view of the universal tool mounting system for a machining centre with tool holder units and coolant manifold blocks attached and mounted onto it and the sheet metal covers removed.
Figure 22:
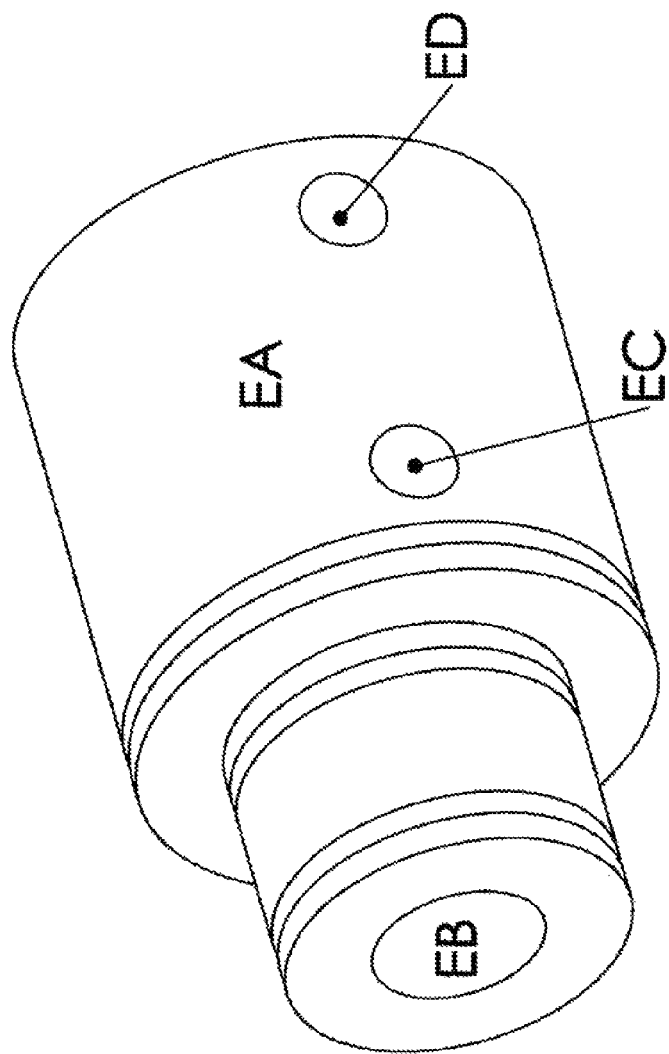
FIG. 22 Shows a back side view of the coolant distribution disc EA.

When drum A has indexed to the next set position one of the coolant holes from the several coolant holes inside drum A line up with the middle hole EC in the coolant distribution disc EA facing position VA so that it can feed the coolant to this position. One of the holes in the coolant manifold disc BV also lines up with the top hole ED in the coolant distribution disc EA facing position VA so that any extra or required coolant is fed out from them to the tool holder unit or into the tool holder unit in position VA. From the coolant hole lined up with position VA from the several coolant holes inside drum A flows coolant, here it flows from these holes and out through the outlet hole close to the hole(s) AQ underneath the coolant manifold blocks AR and then into the coolant manifold blocks AR. Each coolant manifold block directs high pressure coolant to the tool in use at the time on the tool holder unit to flush away all swarf from the component being machined. The coolant pipe running through spindle B has a flexible pipe connecting to the end of it at the magnetic brake assembly end of the machine, this flexible pipe is connected to a CNC pump in the coolant reservoir tank. Refer mainly to FIG. 2, FIG. 21 and FIG. 22.

Figure 52:
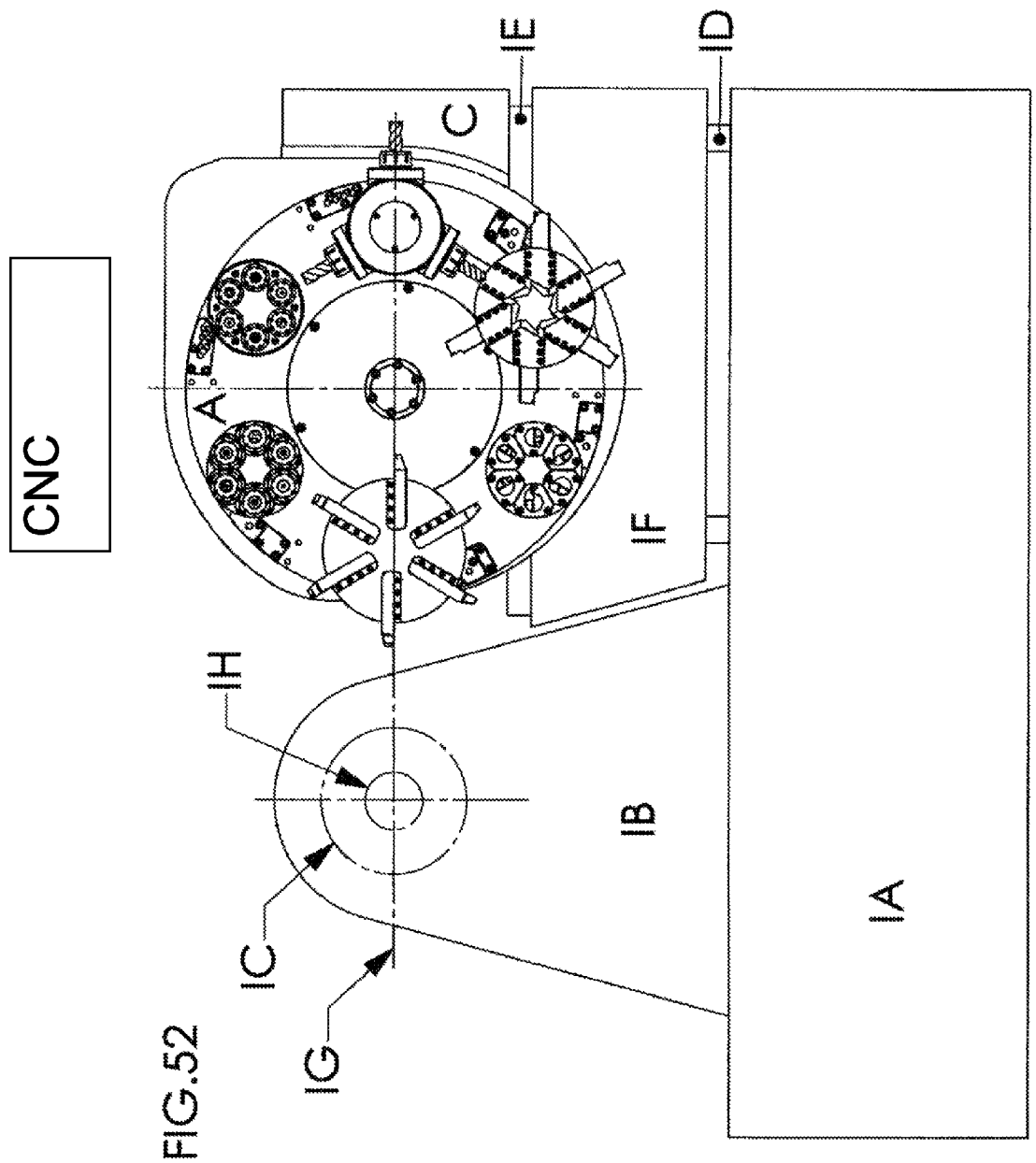
FIG. 52 Shows an end view of the universal tool mounting system for a machining centre with tool holder units attached onto it, mounted on an example CNC lathe configuration. Here the universal tool mounting system for a machining centre is positioned on the linear guideways IE away from the headstock and attached workpiece chuck.

The CNC controlled components and assemblies in the machine are controlled by a CNC controller's computer using a program. A CNC controller labeled "CNC" is schematically shown in FIG. 52. The program is made by a CNC programmer usually with the aid of computer programming software or by the person setting up the machine, this program is made to machine a component with and commands the machine to move in all the directions required to achieve the machining operations. The sheet metal covers BJ have been designed to fit onto the outside diameter of drum A towards the back face of it and onto casting C to cover all the assemblies and components behind drum A. This is required because the sheet metal covers BJ seal and stop the swarf, coolant, unwanted dust and rubbish from getting underneath them, as any of these substances could seriously damage the components and assemblies in the universal tool mounting system for a machining centre. Refer mainly to FIG. 1, FIG. 2 and FIG. 3A.

When the universal tool mounting system for a machining centre is mounted on an example lathe configuration as seen in FIG. 52 to FIG. 57 the following features and principles apply to the position and operational procedures preformed. The main feature in FIG. 52 to FIG. 57 is the common centreline IG, here the pivotable axis of the spindle in the headstock and the pivotable axis of the workpiece chuck mounted onto the front of it, the pivotable axis of the spindle in the subspindle tailstock (not shown) and the pivotable axis of the workpiece chuck mounted onto the front of it (not shown), the pivotable axis of drum A, the pivotable axis of the tool holder unit station H in position VA are all located on centreline IG in different positions along it. Position VA is also on centreline IG.

The variable design of a tool holder unit makes the placement of the tools on it also variable. When a tool holder unit is attached and mounted to a tool holder unit station H in position VA, in most occasions one of the tools on it, the one closest to the headstock spindle and attached workpiece chuck will be parallel with centreline IG so that the edge or centre of the tool is on centreline IG. A tool in this position is in the machining position ready to commence machining operations. The tools are arranged and positioned on a tool holder unit so that as a tool holder—unit via the tool holder unit station indexes, the next used tool on it is rotationally positioned to the machining position.

The rotational indexing of drum A provides the means to rotationally index a selected tool holder unit attached and mounted to the tool holder unit station H in drum A or tool (i.e. the centre or edge of the tool) mounted in drum A to position VA, where it can commence machining operations. The example CNC lathe configuration with the universal tool mounting system for a machining centre mounted onto it is basically the same in FIG. 52 to FIG. 57 with the lathe comprising of a bed IA, the headstock IB with headstock spindle IH in it mounted on the bed IA, the workpiece chuck IC mounted to the headstock spindle IH. The linear guideways ID are mounted onto the lathe bed and connect to the carriage IF, where carriage IF travels along the linear guideways ID.

The linear guideways IE are mounted on the top of carriage IF and connect to casting C of the universal tool mounting system for a machining centre.

The universal tool mounting system for a machining centre is directionally positioned to machine components in the axial direction via linear guideways ID and the radial direction via linear guideways IE with both sets of linear guideways ID and IE being moved and controlled by additional means and a CNC controller via programming.

The following differences exist between FIG. 52 to FIG. 57. In FIG. 52 the universal tool mounting system for a machining centre with attached and mounted tool holder units is positioned on linear guideways IE away from the headstock and attached workpiece chuck.

Figure 53:
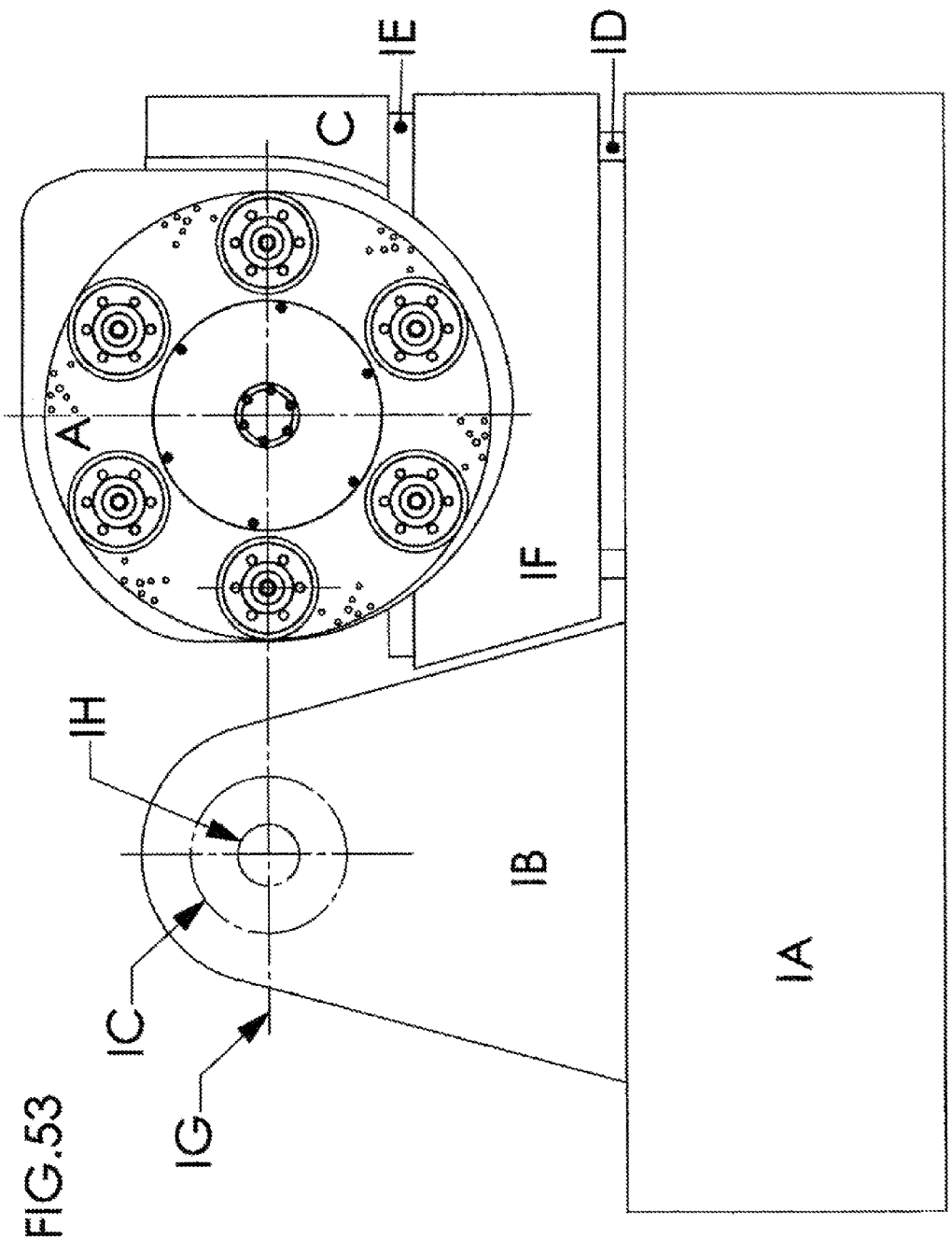
FIG. 53 is the same as FIG. 52 except the universal tool mounting system for a machining centre has no tool holder units attached and mounted onto it.

FIG. 53 is the same as FIG. 52 except the universal tool mounting system for a machining centre has no tool holder units attached and mounted onto it. The tool holder unit stations H can be clearly seen in FIG. 53 with the tool holder unit station in position VA being pivotable in its position on centreline IG.

Figure 54:
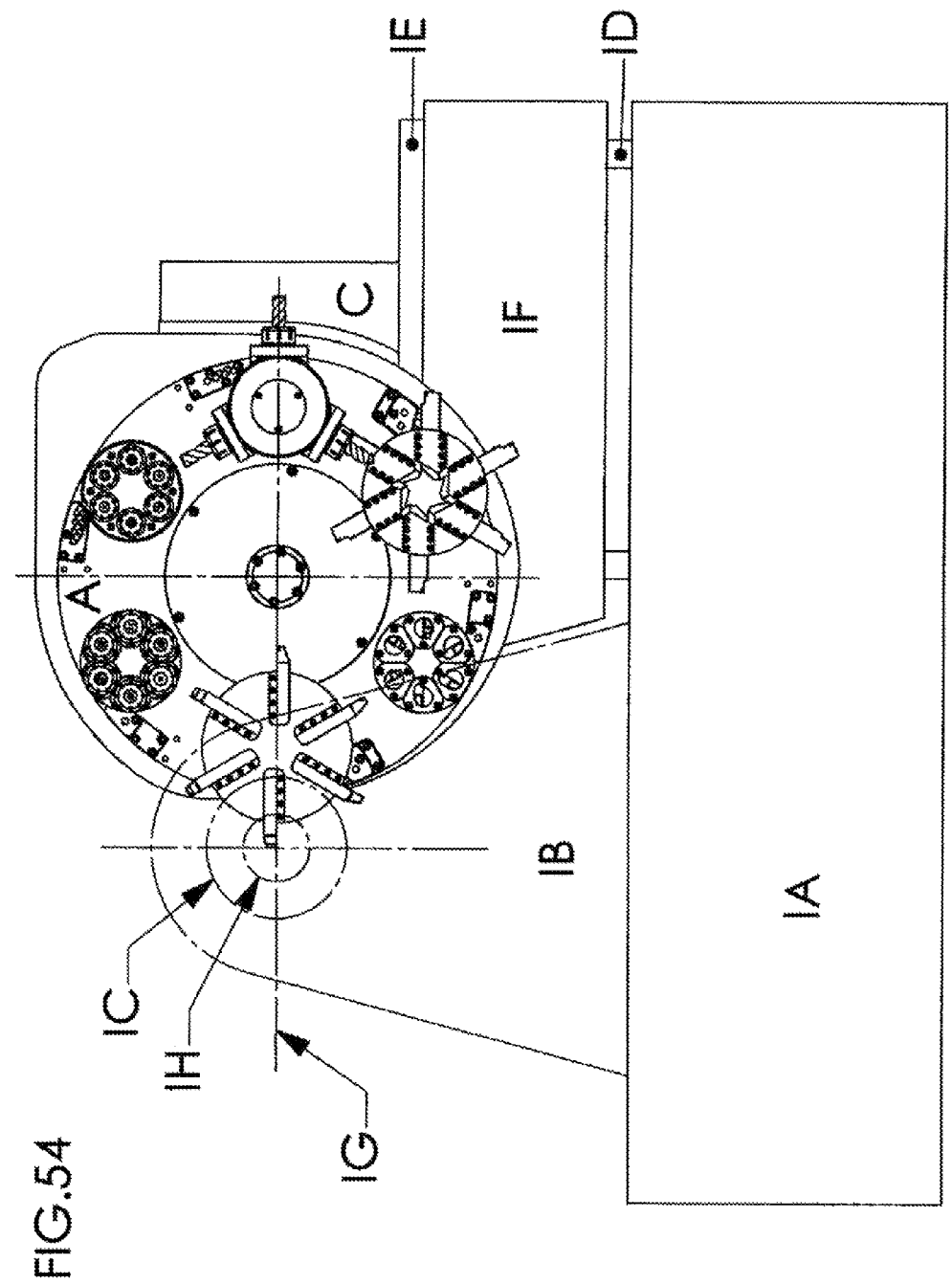
FIG. 54 Shows an end view of the universal tool mounting system for a machining centre with tool holder units attached and mounted on it in a CNC lathe configuration. Here the universal tool mounting system for a machining centre is positioned on the linear guideways IE so that the end edge of the tool on the tool holder unit in position VA (the tool holder unit closest to the workpiece chuck and headstock spindle) is on the pivotable axis of the workpiece chuck and the headstock spindle.

In FIG. 54 the universal tool mounting system for a machining centre with attached and mounted tool holder units is positioned on linear guideways IE so that the edge of the tool on the tool holder unit in position VA (the tool on the tool holder unit closest to the workpiece chuck IC and headstock spindle IH) is on the pivotable axis of the workpiece chuck and headstock spindle.

Figure 55:
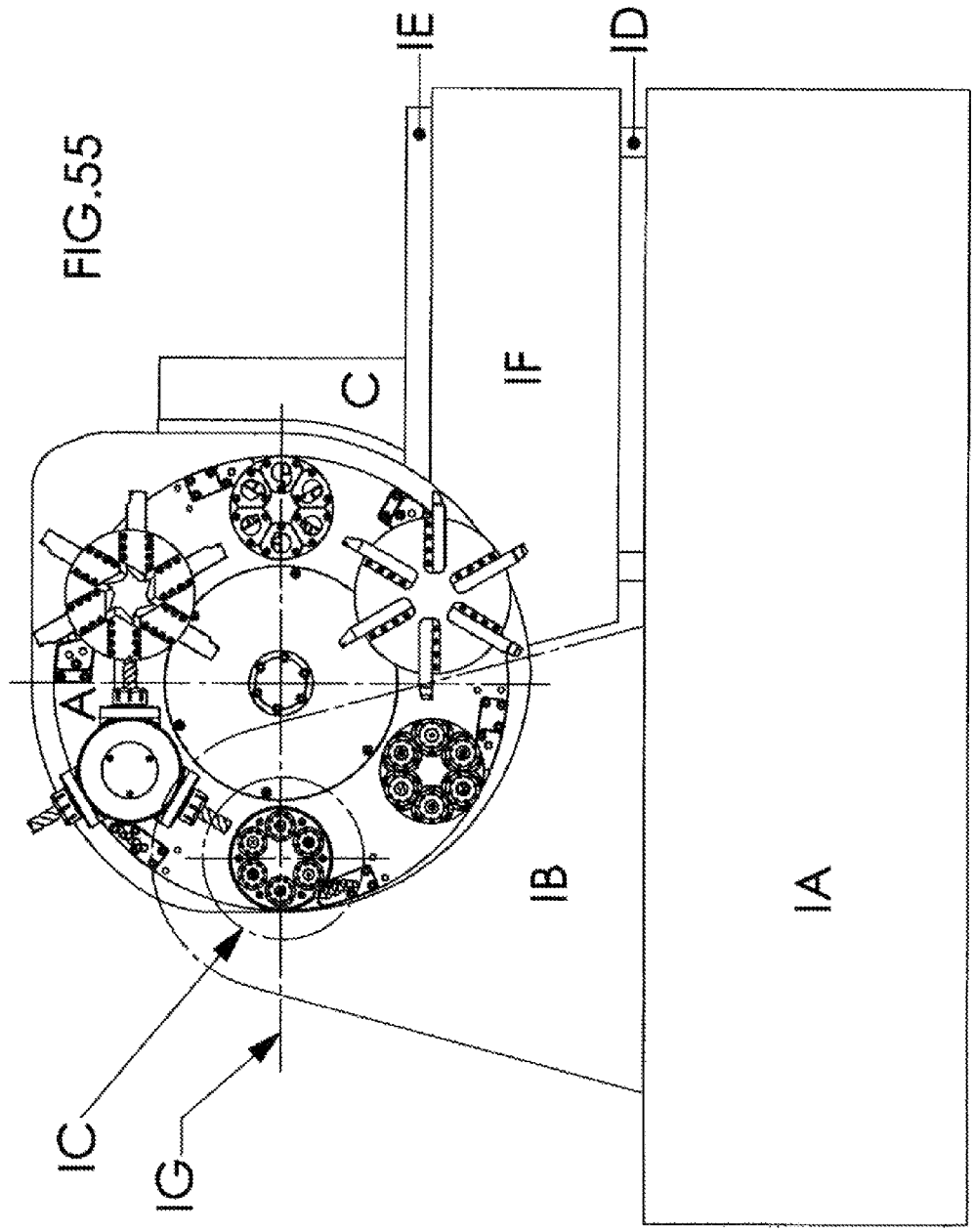
FIG. 55 Shows an end view of the universal tool mounting system for a machining centre with tool holder units attached and mounted on it in a CNC lathe configuration. Here the universal tool mounting system for a machining centre is positioned on the linear guideways so that the pivotable axis of a tool holder unit in position VA is on the pivotable axis of the workpiece chuck and the headstock spindle.

In FIG. 55 drum A has been indexed so that the multiple milling, drilling and tapping tool holder unit is in position VA. Here the universal tool mounting system for a machining centre is positioned on linear guideways IE so that the pivotable axis of this tool holder unit is on the pivotable axis of the workpiece chuck which is mounted into the headstock spindle.

Figure 56:
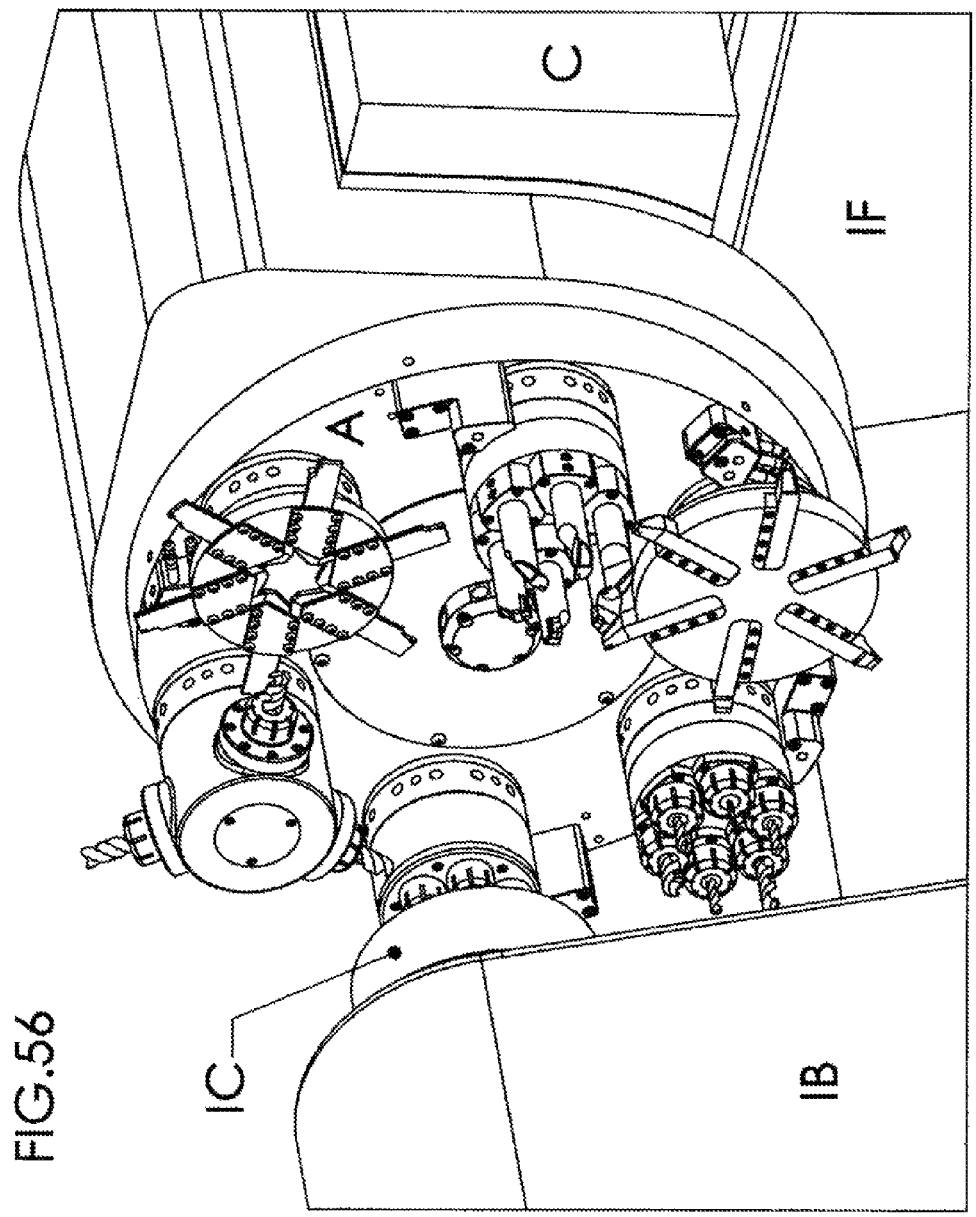
FIG. 56 Shows an end front view of FIG. 55.

FIG. 56 shows a side front view of FIG. 55.

In FIG. 57 drum A shows one of the extra tools FA mounted on it in the machining position.

The embodiment of the universal tool mounting system for a machining centre mounted in a CNC lathe configuration as shown in FIG. 52 to FIG. 57 and as described, with a tool holder unit in position VA and a tool on it being in the machining position provides the maximum clearance between, the other tools on the tool holder unit in position VA, drum A and the headstock spindle, drum A and the headstock spindles workpiece chuck, drum A and the subspindle tailstock spindle (not shown), drum A and the subspindle tailstock workpiece chuck (not shown), drum A and the headstock, drum A and the tailstock (not shown), the two tool holder units on either side of the tool holder unit in position VA mounted in drum A to stop them interfering and clashing with any of the headstock and tailstock assembly or any other lathe components. Refer mainly to. FIG. 52 to FIG. 57 and FIG. 17 and FIG. 18.

Figure 32:
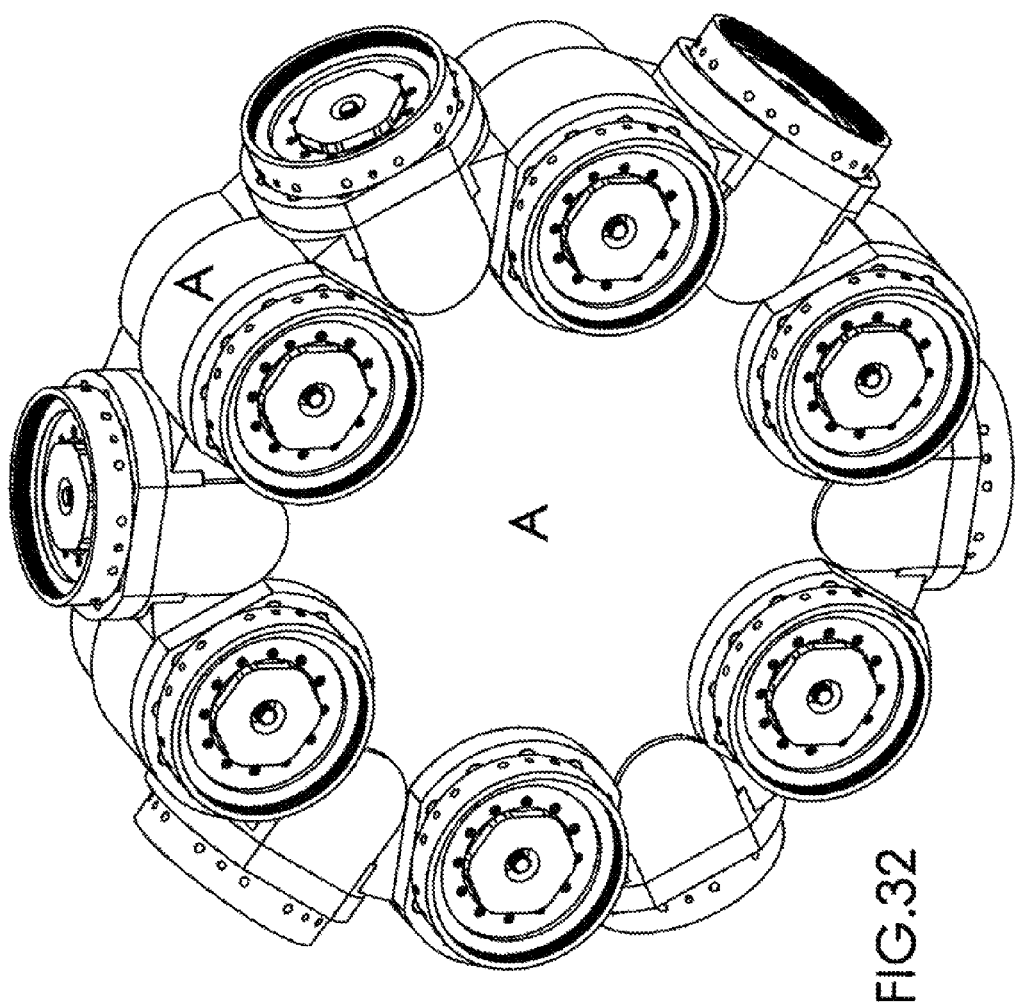
FIG. 32 Shows a front side view of an adapted version of drum A with tool holder unit stations mounted into the front face of drum A and on the periphery of drum A.
Figure 33:
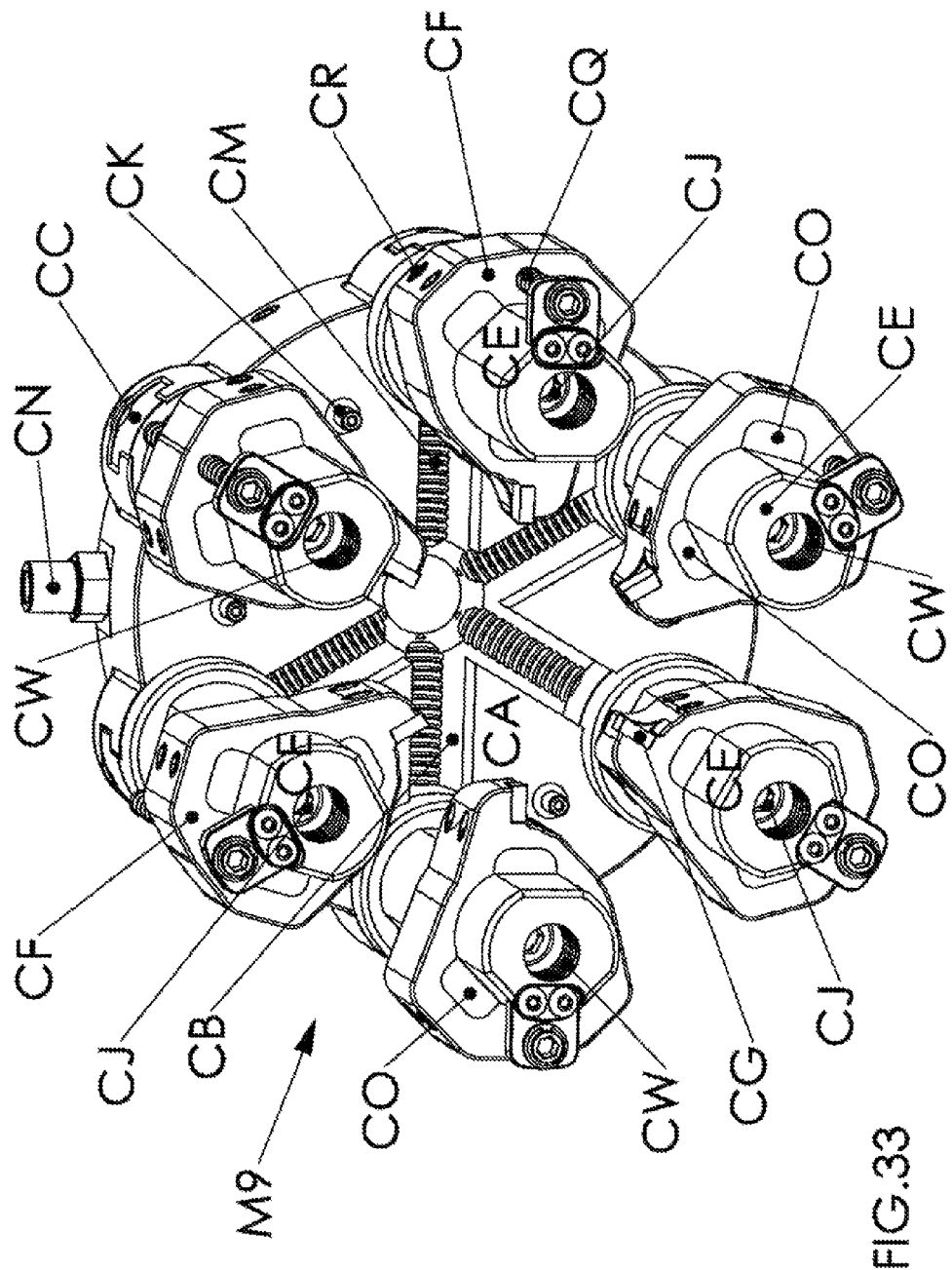
FIG. 33 Shows the front side view of the multicut turning unit M9.
Figure 34:
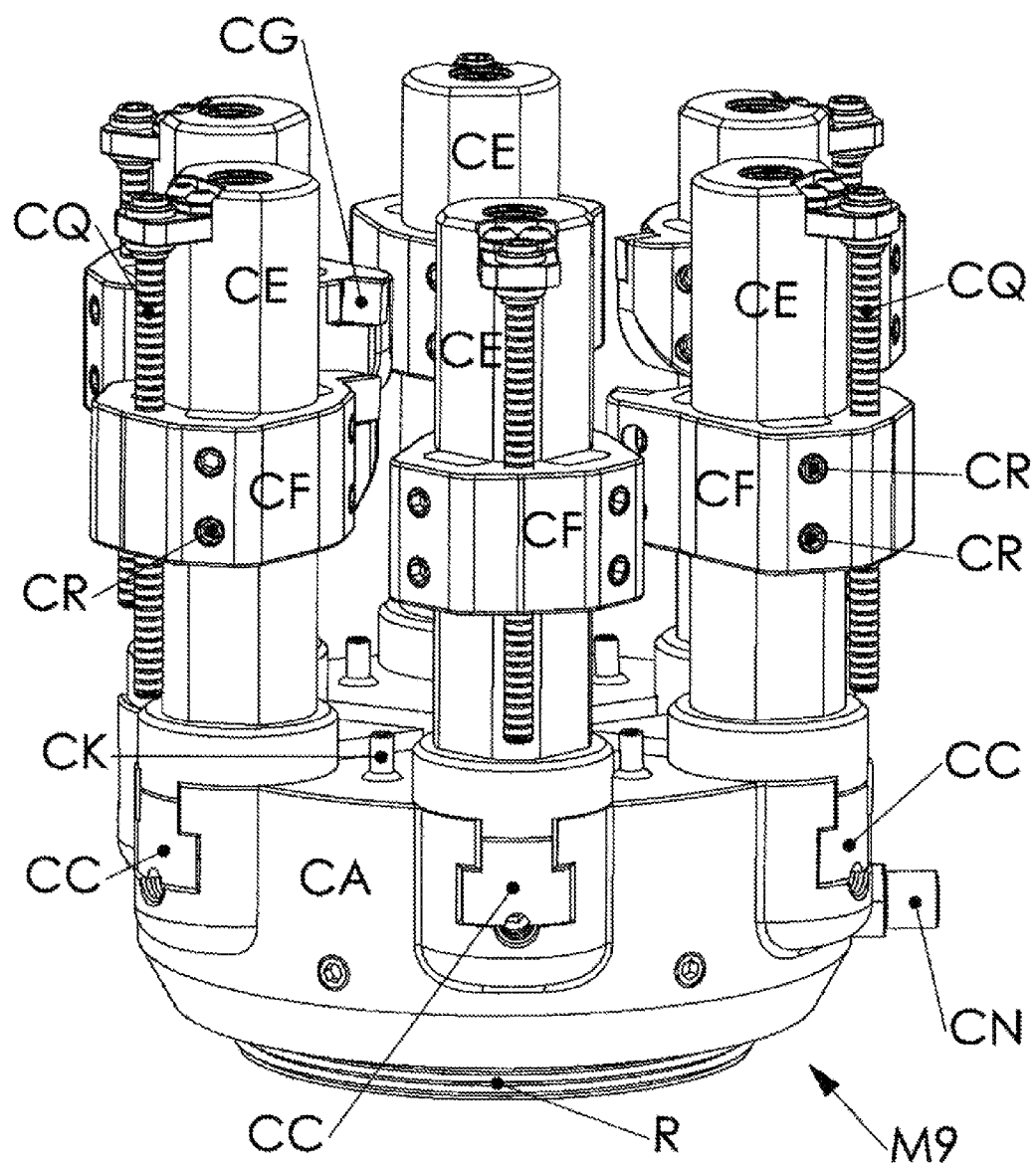
FIG. 34 Shows the side front view of the multicut turning unit M9.
Figure 35:
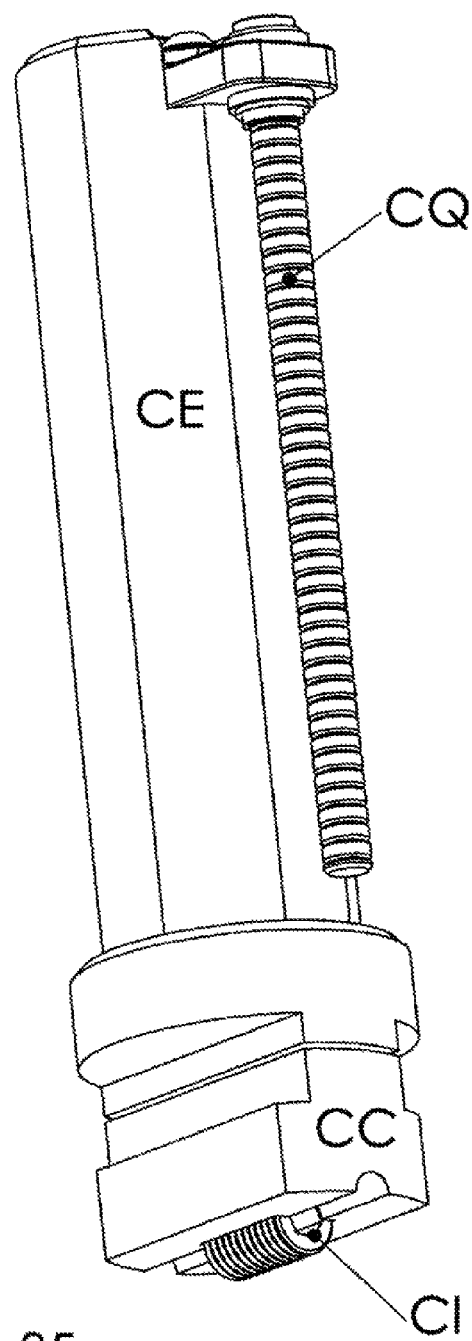
FIG. 35 Shows the underneath side view of the partially assembled multicut turning unit M9 in FIG. 33 and FIG. 34 showing the column CE, columns vertical adjustment screw CQ, tee block CC and adjustment screw CI.

The universal tool mounting system for a machining centre can also have an adapted version of Drum A as shown in FIG. 32 as an alternative replacement option to Drum A shown in FIG. 1 to FIG. 31. In FIG. 32 there are a combination of tool holder unit stations mounted into the front face of drum A and on the periphery of drum A, where tool holder units attach, mount and interchange on them. The adapted version of drum A shown in FIG. 32 has all the same features as drum A shown in FIG. 1 to FIG. 31 with the addition of extra components to make it functional so that the milling tool holder units and the tool holder unit stations function correctly.

One of the main differences in the adapted version of drum A is that the tool holder unit stations and most of their functional componentry are assembled within a cartridge. Then a plurality of these assembled cartridges are located and mounted into drum A. The angle of the periphery of drum A can vary indefinitely depending on how drum A in FIG. 32 has been designed to suit a machine tool process.

One configuration for a universal tool mounting system for a machining centre can include drum A with tool holder unit stations only on the periphery of drum A. The adapted version of drum A shown in FIG. 32 can also hold any extra tool or tools FA by mounting it or them directly or indirectly, to it, in it and on any face of it in any configuration like shown in FIG. 31. Refer mainly to FIG. 1, FIG. 2, FIG. 3, FIG. 3A, FIG. 31 and FIG. 32.

The universal tool mounting system for a machining centre is operated and controlled by CNC controller which gives all moving components and assemblies in the machine their commands. The operation of the universal tool mounting system for a machining centre is best described by a sequence of events describing actions of different assemblies and components with the aid of making reference to FIG. 1 to FIG. 31 as follows.

1. The universal tool mounting system for a machining centre shown in FIG. 1, FIG. 2 and FIG. 3A is mounted onto a purpose built CNC machine where it gains multiple axis's of movement so that it can move to the desired position to commence machining operations on components or workpieces in the machine.
2. As the universal tool mounting system for a machining centre with tool holder units attached and mounted to it is moving towards the component or workpiece to machine it, drum A indexes by rotation to position the next required tool holder unit on it to position VA or one of the extra tool(s) FA mounted directly or indirectly to drum A to the machining position.

Drum A indexes by the following operations occurring.

2A—The tapered index pins E in hydraulic cylinder(s) G disengage out of taper bushes F mounted in spindle B so that the end face of the tapered index pins E moves inside hydraulic cylinder(s) G and clears the end face of the taper bushes F. At the same time this occurs the brake in the magnetic brake drum assembly is activated and holds spindle B and drum A in position to stop rotational movement of them both.

2B—The magnetic brake drum assembly then deactivates the brake and servo gear drive motor AK is activated which indexes drum A and spindle B by rotation in a clockwise or anticlockwise direction through poly vee belt AJ, to either position any of the tool holder units mounted on the tool holder unit stations in drum A or to position the extra tool(s) FA mounted directly or indirectly to drum A, to position VA or the machining position. The spindle and index drive unit W and the index drive unit AE are positioned towards the back end of casting C so that all the components in them clear the back face of hydraulic cylinder L, allowing Drum A to rotate around without it clashing into anything.

2C—When the next required tool holder unit or the next required extra tool FA mounted on drum A has been rotationally positioned via drum A to position VA or the machining position, the brake is reactivated in the magnetic brake drum assembly and the tapered index pins E in hydraulic cylinders G engage into the bushes F. The tapered index pins E are held in position by constant hydraulic pressure from the hydraulic cylinder(s) G to help give the zero clearance contact for rotational lockup between casting C and spindle B. This locks and holds spindle B and the connected Drum A in position after it has indexed around.

3. When a tool holder unit station H with a tool holder unit attached and mounted on it is in position VA the spindle and index drive unit W moves towards Drum A to engage into the rotationally locked up tool holder unit station H on linear guideways BH, by the activation of servo motor AD moving ball screw AB through pulleys and the connecting poly Vee belt AC. This is required so that spline XA and internal spline XB engage into each other and then gear teeth HB on shaft AA engages into the gear teeth HA on the back of the tool holder unit station H to connect them together. Hydraulic cylinder L then activates and the taper pins J disengage from tapered bushes KA in the tool holder unit station H so that they are clear from them, this releases the tool holder unit station from being locked in position and allows rotational movement in a clockwise or anti-clockwise direction. The servo motor Y then is activated which rotates shaft AA around through its connection with poly vee belt Z. This then rotates the tool holder unit station around so that one of the tools on the tool holder unit connected to it is indexed to the machining position to commence machining operations.
4. The hydraulic cylinder L then reactivates and taper pins J engage back into the taper bushes KA. The tapered pins J are held in position by constant hydraulic pressure from hydraulic cylinder L to help give the zero clearance contact for rotational lockup between Drum A and the tool holder unit station H. This locks and holds the tool holder unit station in position after it has indexed around.
5. The machine then commences all machining operations on a component or workpiece with the tool in use until it has finished with that tool, it then changes to another tool by the sequence of events already described by indexing the tool holder unit and or drum A.
6. If one of the live tooling tool holder unit is in position VA, this unit is indexed around by rotation to the next tool or any other tool on it by the same procedures as described above. The tools in the holder are then activated to rotate at the required machining speed by the spindle and index drive unit W retracting so that gear teeth HA and HB are disengaged away from each other but spline XA and internal spline XB are still engaged. The servo motor Y in the spindle and index drive unit W then activates and rotates shaft AA at the required speed for machining. This drives the transmission drive shaft S through internal spline XB. At the front of the transmission drive shaft S is the spline XC which connects into spline U in the end of the main driving geared shaft in all the live tooling tool holder units.
7. When the tool holder unit at position VA has finished machining, the spindle and index drive unit W retracts on the linear guideways BH by the ball screw AB moving it towards the poly vee belt AC at the back of casting C, so that all its components once again clear the back face of Hydraulic cylinder L, allowing Drum A to rotate around without it clashing into anything.
8. Preindexing occurs at position VB so that the desired tool on the tool holder unit attached and mounted on the tool holder unit station in position VB is indexed so that this tool, when drum A is indexed will be in the machining position when its tool holder unit station H reaches position VA. This operation would occur as the universal tool mounting system for a machining centre is moving towards a component or workpiece to machine it or when machining is occurring or at any other time the CNC machine can perform this operation. This feature allows immediate commencement of machining operations when the tool holder unit has indexed to position VA. Preindexing occurs when the indexing drive unit AE moves towards drum A on linear guideways BH at position VB by the activation of hydraulic cylinder AF. This causes the gear teeth HC on shaft AH to engage into the gear teeth HA on the back of the tool holder unit station H.
9. When the index drive unit AE is engaged into the back of the tool holder unit station in position VB the hydraulic cylinder L at position VB then activates and the taper pins J disengage from tapered bushes KA in the tool holder unit station H so that they are clear from them, this releases the tool holder unit station from being locked in position and allows rotational movement in a clockwise and anticlockwise direction. The servo motor AG then activates which rotates shaft AH around through its connection with poly vee belt AI. This then rotates the tool holder unit station in position VB around so the tools on this tool holder unit are indexed around to the next tool or any other tool in the holder ready to commence machining operations when drum A indexes to position VA.
10. The hydraulic cylinder L then reactivates and the taper pins J engage back into taper bushes KA at position VB, this locks and holds the tool holder unit station H in rotational position.
11. When the tool holder unit at position VB has finished indexing the index drive unit AE reacts on the linear guideways BH with the activation of hydraulic cylinder AF to a position near the back of casting C so that all its components once again clear the back face of the hydraulic cylinder L, allowing drum A to index around by rotation without it clashing into anything.
12. The universal tool mounting system for a machining centre then retracts away from the component or workpiece after completing the machining tasks on it and waits until additional tasks are completed by the machine and the operators before the machining cycle starts again.

During machining operations coolant is pumped with a CNC pump through the main pipe in the center of spindle B and through drum A to the coolant manifold blocks AR. With the coolant manifold disc BV also being supplied with coolant. These then pump high pressure coolant to the tools being used by using the through coolant tools, coolant pipes or the adjustable coolant pipes on the coolant manifold blocks. The procedures that have been described above set out an operational sequence that can be used, but the final operational sequence of events will vary all the time from the one described above because it depends on how the universal tool mounting system for a machining centre is programmed by the manufacturer and how the machine is programmed to make component(s) or workpieces by the person using it.

In operation the Multicut Turning Unit has been designed to facilitate the turning of multiple diameters on a component in which a stepped profile of different reduced diameters is produced longitudinally in one passing cut of the unit or to rapidly cut a thread on a component or to perform bar peeling operations to rapidly turn a component to a single reduced diameter at very high feed rates. This is achieved in the following ways after it has been set up. The material rotates around and moves into the fixed and stationary Multicut Turning Unit in between the cutting heads so that the central pivotal axis that the radial cut of each tool/tip insert is set from is on the same pivotable axis of the workpiece or component, or the fixed Multicut Turning Unit moves and passes over the rotating workpiece or component so that the central pivotal axis that the radial cut of each tool/tip insert is set from is on the same pivotable axis of the workpiece or component or the Multicut Turning Unit rotates around at the required cutting/machining speed and passes over the fixed and stationary component so that the central pivotal axis that the radial cut of each tool/tip insert is set from is on the same pivotable axis of the workpiece or component.

Components machined using this unit can be made of varying shapes and sizes from many materials including processed materials such as castings. Any bar stock to be turned can also be hexagonal in shape. All the methods of operation described produce a concentric round surface as found in all lathe turning applications. As the Multicut Turning Unit machines a workpiece or component each tool/tip insert depending on the positioned setting of it is sequentially brought into engagement until all the tools used on the unit are engaged and turning a component or workpiece to the set stepped profile. The operational description of the multicut turning unit M9 is aided by making reference to FIG. 33 to FIG. 39 to fully understand how it works. The principle of operation on how the Multicut Turning Unit removes material is similar to the operation of bar peeling where one or more tools are used to peel the material from bar stock.

The Multicut turning unit also uses one or more cutting heads or tools in its design to remove unwanted material, with the difference that each cutting head or tool when more than one is used is set so that each one can be fully adjusted in two axis's. Firstly the axis of radial cut each cutting head or tool is adjusted to determines the amount of material to be turned off the component or workpiece. Secondly by adjusting the axis of height each cutting head or tool is positioned to relative to the base determines the position where the change in diameter occurs on a component to be turned or the position each one is set to, to position them to the pitch of the thread to be cut.

Both of these adjustments are adjusted by manual operation but with adaptation by incorporating CNC servo motors to the multicut turning unit it can be controlled with a CNC controller and programming. The axis of height is adjusted by having the grub screws CR in the tool sliding block CF loose. Then the tool sliding block CF is moved towards or away from base CA by placing an Allen key in the Allen key cavity at the top of the columns vertical adjustment screw CQ and turning it in a clockwise or anticlockwise direction which moves the tool sliding block along column CE. When the axis of height of the tool sliding block CF with tip insert CG is set all the grub screws CR are tightened adequately against the guideway blocks CO, which pushes them against the flat faces of the column CE and holds it firmly in position.

The position of the radial cut the tool sliding blocks CF and attached tip inserts are set at from the center of base CA is achieved by the movement of the column CE.

To move the column CE the screw CJ is loosened, then the adjustment screw CI at the bottom of the tee block CC and connected to the cut threaded hole CM is turned using an Allen key in the end of the adjustment screw CI, in a clockwise or anticlockwise direction. This moves the column CE, connected tool sliding block CF with tip insert CG and the tee block CC along the tee slot CB in the desired direction. When the column CE is positioned at the desired radial cut the screw CJ is adequately tightened, this pulls the tee block CC against the top of the tee slot CB and holds the column securely in position. When adjusting the multicut turning unit it doesn't matter whether you adjust the axis of height of the tool sliding block CF first or the axis of radial cut with the column(s) CE along the tee slot.

When the Multicut turning unit has been adjusted and set for one of the required objectives the retainer ring CS is placed on the top of the column(s) CE. The retainer ring CS is then secured to the top of column(s) CE with the screws CT. When the strengthening columns CV are also incorporated into the multicut turning unit, the retainer ring CS is secured to these by also using more screws CU.

After the Multicut turning unit has been set the coolant nozzles CK in base CA are adjusted so that they will direct high pressure coolant to the tip inserts CG in the tool sliding block CF. The Multicut turning unit is now fully set to complete one of the objectives it has been set to, in one passing cut of the unit. The feeds, speeds and directional positioning of the Multicut Turning Unit M9 is provided by manual input or through CNC programming to CNC machine tools and conventional machine tools. The tools/tip inserts can be arranged and set in position to provide balanced cutting to a workpiece or component when the unit is set up.

If one Multicut turning unit doesn't completely finish all the roughing applications on a component or workpiece in one passing cut, several of the same type of unit can be used and set to complete the operation. The result of turning multiple diameters on a component or workpiece SA in which a stepped profile of different reduced diameters is produced longitudinally in one passing cut of the unit can be seen in FIG. 38 In FIG. 38 each individual cutting head or tool is adjusted in its two axis's of movement and set so that it turns one of the reduced diameters seen here at the required longitudinal length.

Figure 39:
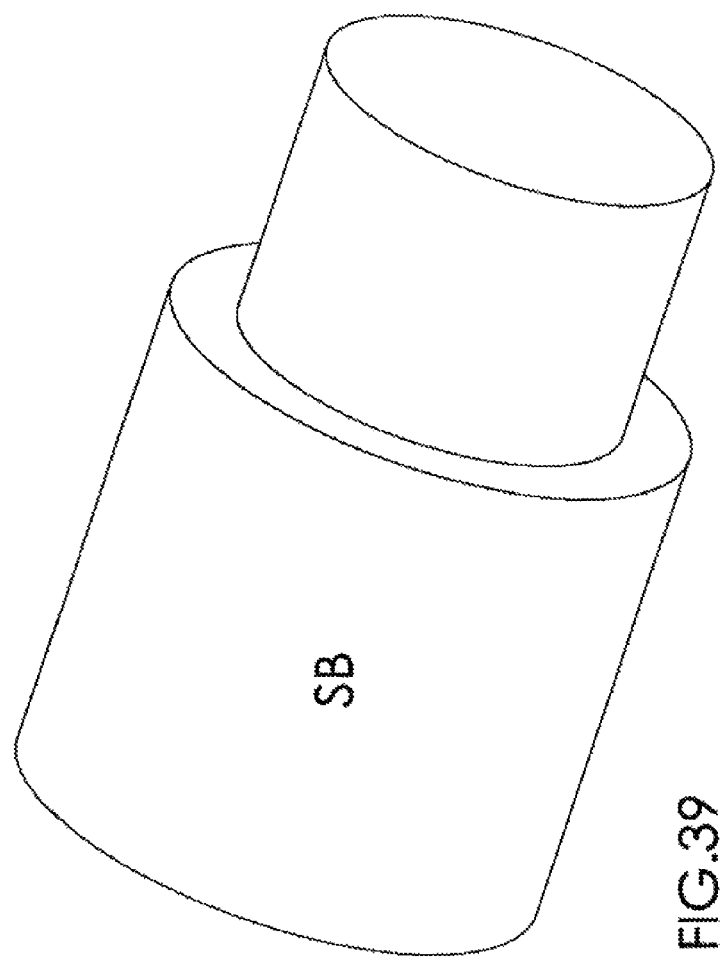
FIG. 39 Shows the result of a bar peeling operation completed on a component or workpiece SB with the Multicut Turning Unit M9.
Figure 40:
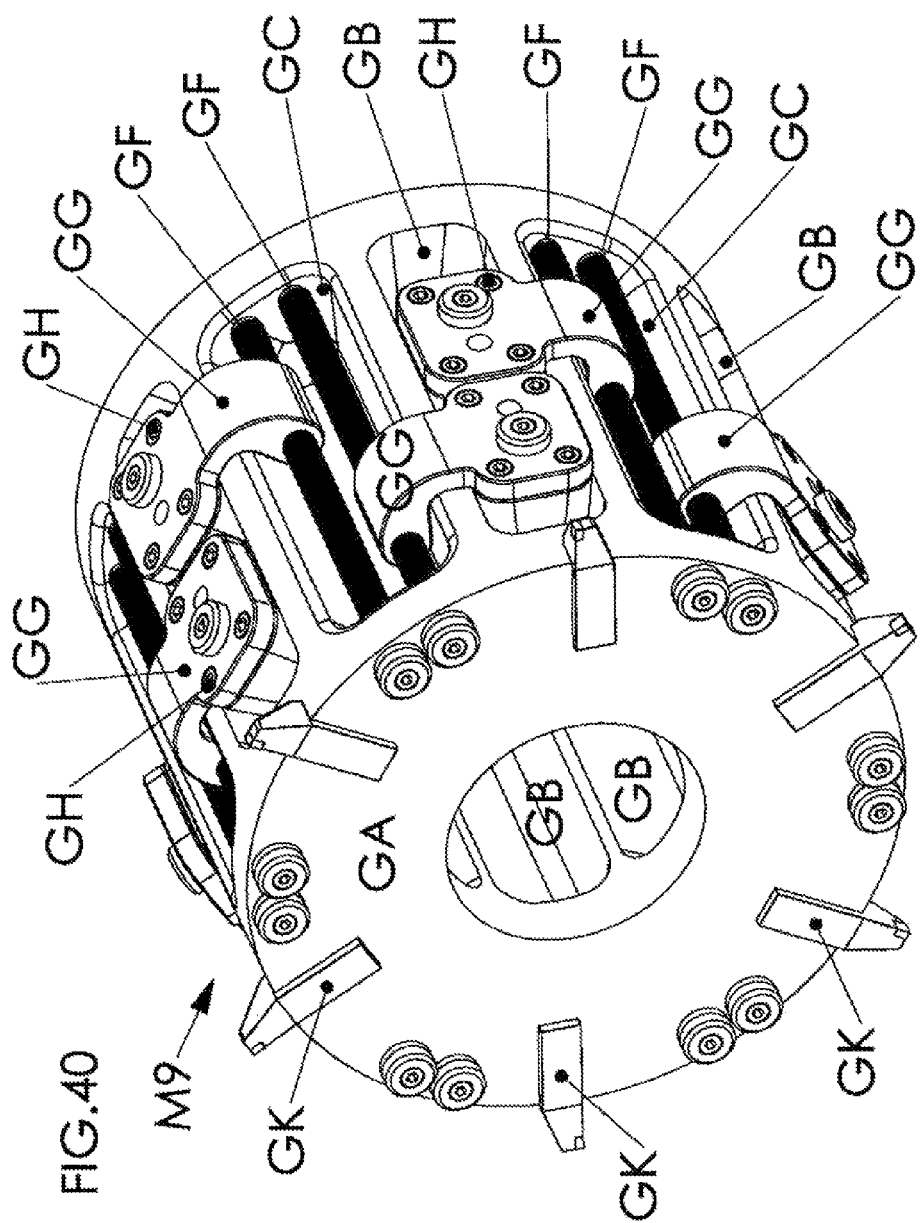
FIG. 40 Shows the front side view of an alternative embodiment of the Multicut Turning Unit M9, shown as M9'.
Figure 41:
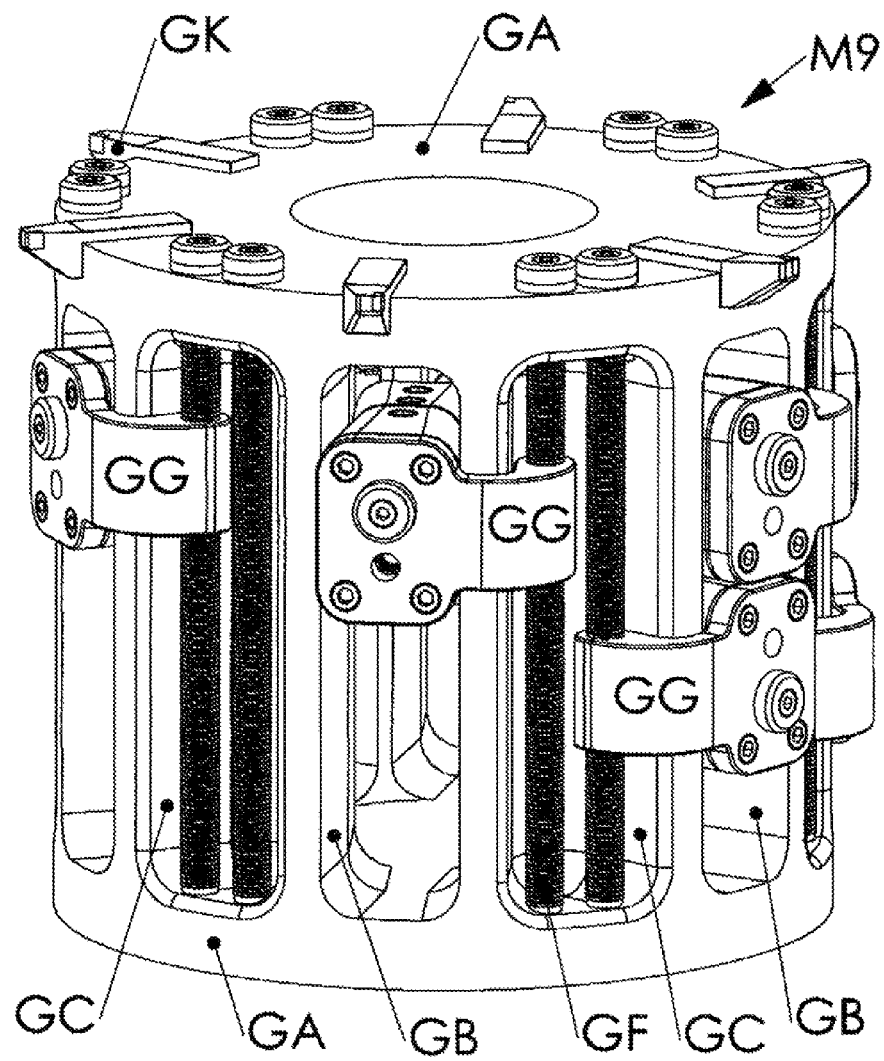
FIG. 41 Shows the side front view of the alternative Multicut Turning Unit M9'.
Figure 42:
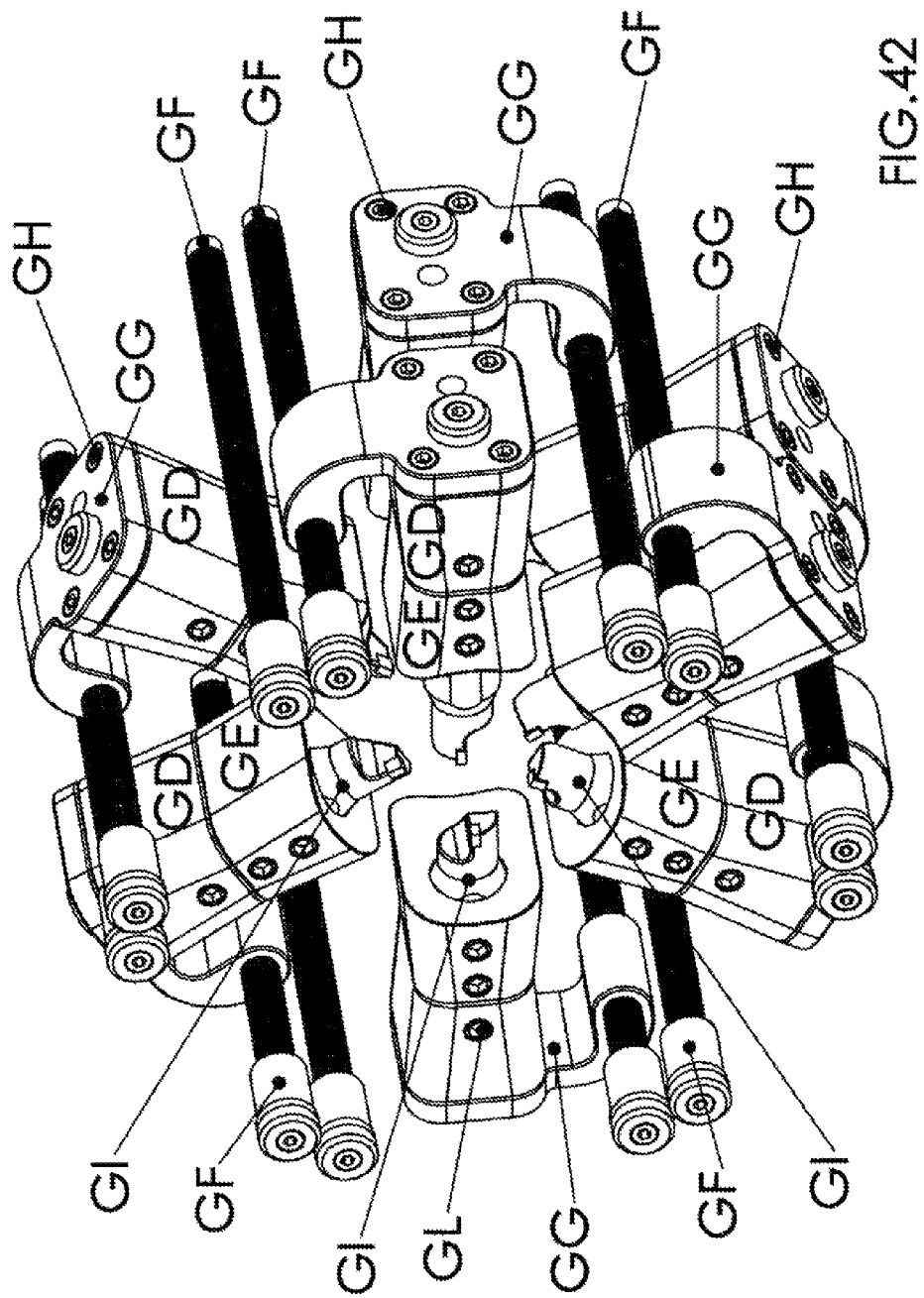
FIG. 42 Shows the front side view of the alternative Multicut Turning Unit M9' with the Main housing GA and the tools GK hidden to show more of the internal componentry of the unit.

The result of a bar peeling operation to rapidly turning down a component or workpiece SB to a single reduced diameter at very high feed rates can be seen in FIG. 39. In FIG. 39 each individual cutting head or tool is adjusted in its two axis's of movement so that they are all set to the same radial cut and height relative to the base. In this configuration several cutting heads or tools engage at once to turn the same reduced single diameter on the component or workpiece, which allows the passing cut of the Multicut turning units feed rate to be dramatically increased. The Multicut turning unit is adjusted and set by the person using it to suit the procedure to be performed on the component or workpiece.

The setting of the radial cut generally will be determined by the optimal depth the tool can turn from the diameter of a component or workpiece. The multicut turning unit M9 can have as many cutting heads on the unit at once up to its maximum amount and depends on machining requirements and people setting up the unit on how many are used. During machining operations the coolant nozzles in the base of the unit pump high pressure coolant through them to blast away the swarf from the cutting edges of the tip inserts and the multicut turning unit.

In operation the Multicut Boring Bar unit M10 has been designed to facilitate the boring of multiple diameter bores in a component or workpiece in which a stepped profile of different increased diameter bores is produced longitudinally in one passing cut of the unit or to rapidly cut a partial depth thread or complete depth thread in a component or workpiece or to perform bore peeling operations to rapidly bore a hole in a component or workpiece to a single increased diameter at very high feed rates. This is achieved in the following ways after it has been set up. The material rotates and moves into the fixed and stationary Multicut Boring Bar Unit so that the pivotal axis that the radial cut of each boring bar is set from is on the same pivotable axis of the workpiece or component, or the fixed Multicut Boring Bar Unit moves and passes over the rotating workpiece or component so that the central pivotal axis that the radial cut of each boring bar is set from is on the same pivotable axis of the workpiece or component, or the Multicut Boring Bar Unit rotates around at the required cutting/machining speed and passes over the fixed and stationary component so that the central pivotal axis that the radial cut of each boring bar is set from is on the same pivotable axis of the workpiece or component.

Components machined using this unit can be made of varying shapes and sizes from many materials including processed materials such as castings. All the methods of operation described produce a concentric round bored surface as found in all lathe boring applications. As the Multicut Boring Bar Unit machines a workpiece or component each boring bar depending on the positioned setting of it is sequentially brought into engagement until all the boring bars or tools used on the unit are engaged and boring a component or workpiece to the set stepped profile. The operational description of the Multicut Boring Bar Unit M10 is aided by making reference to FIG. 45 to FIG. 51 to fully understand how it works. The principle of operation on how the Multicut Boring Bar Unit M10 removes material is similar to the operation of bar peeling where one or more tools are used to peel the material from bar stock.

The Multicut Boring Bar Unit also uses one or more tools/boring bars in its design to remove unwanted material with the difference that each boring bar or tool when more than one is used is set so that each one can be fully adjusted in two axis's.

Firstly the axis of radial cut each boring bar or tool is adjusted to determines the amount of material to be bored out of the component or workpiece. Secondly by adjusting the axis of height each boring bar or tool is positioned to relative to the base determines the position where the change in diameter occurs on a component or workpiece to be bored or the position each one is set to, to position them to the pitch of the thread to be cut. Both of these adjustments are adjusted by manual operation but with adaptation by incorporating CNC servo motors to the Multicut Boring Bar Unit it can be controlled with a CNC controller and programming.

The axis of height is adjusted by having the boring bars DG mounted into hole CP and through the hole in the vertical adjustment plate DB, the grub screws DD in the boring bar holder DA loose and the grub screws DD in the vertical adjustment plate DB tightened against the boring bar(s). Then the vertical adjustment plate DB is moved towards and away from the boring bar holder DA with the attached boring bar DG, by placing an alien key in the alien key cavity at the top of the vertical adjustment screw DC and turning it in a clockwise and anticlockwise direction. When the height of the boring bar(s) has been adjusted and set from base CA the grub screws DD in the boring bar holder DA are tightened adequately against the boring bar to hold it firmly in position.

The radial cut position that the boring bars are set to from the centre of base CA is achieved by the movement of the boring bar holder DA. To move the boring bar holder DA the screws DE inside it are loosened then the adjustment screw CD at the bottom of the tee block CL and connected to the cut threaded hole CM is turned in a clockwise or anticlockwise direction using an Allen key in it. This moves the boring bar holder DA, the boring bar DG mounted inside them, the vertical adjustment plate, the vertical adjustment screw DC and the tee block CL along the tee slot CB in the desired direction. When the boring bars are set at the required redial cut the screws DE inside the boring bar holder DA are adequately tightened, this pulls the tee block CL against the inside top of the tee slot CB and holds the boring bar holder securely in position.

When adjusting the Multicut Boring Bar Unit it doesn't matter whether you adjust the axis of height of the boring bars first or the axis of radial cut of the boring bar holder DA along the tee slot CB. When the Multicut Boring Bar Unit has been adjusted and set for one of the required objectives the retainer ring assembly if used is attached to the boring bars and secured to them. After the Multicut Boring Bar Unit has been set the coolant nozzles CK in base CA are adjusted so that they will direct high pressure coolant to he tip inserts DF in the boring bars DG. The Multicut Boring Bar Unit is now fully set to complete one of the objectives it has been set to, in one passing cut of the unit. The feeds, speeds and directional positioning of components or the Multicut Boring Bar Unit M10 is provided by manual input on conventional machine tools or through CNC programming to CNC machine tools.

Figure 50:
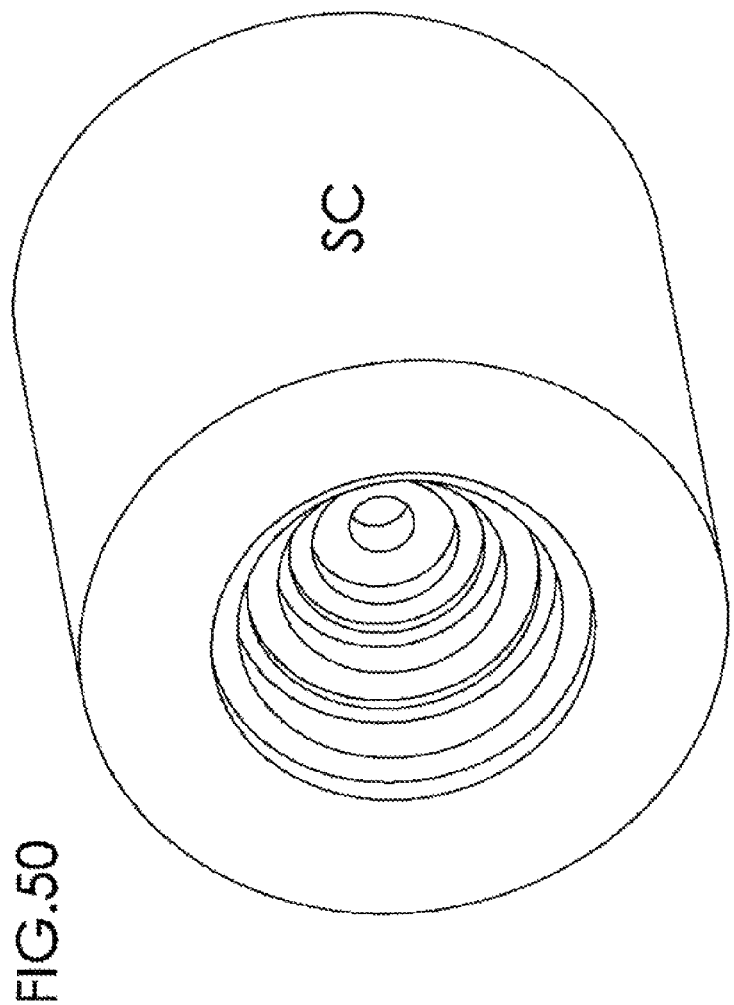
FIG. 50 Shows the result of boring multiple diameters in a component or workpiece SC in which a stepped profile of different increased diameter bores is produced longitudinally in one passing cut of the Multicut Boring Bar Unit M10.
Figure 51:
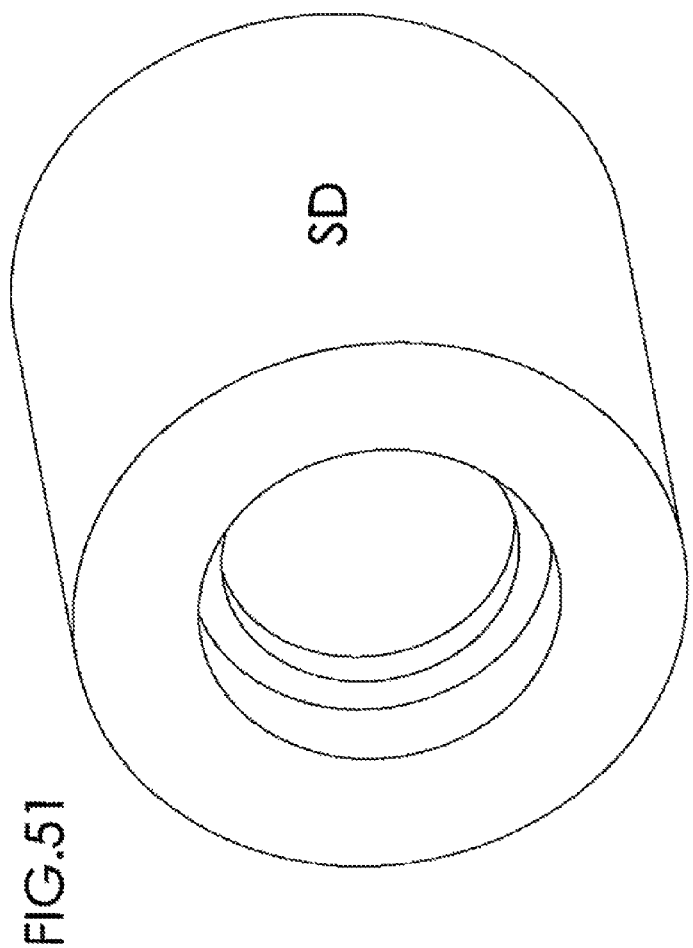
FIG. 51 Shows the result of a bore peeling operation completed in a component or workpiece SD with the Multicut Boring Bar Unit M10.

The boring bars or tools can be arranged and set in position to provide balanced cutting to a workpiece or component when the unit is set up. If one Multicut Boring Bar Unit doesn't completely finish all the roughing applications on a component or workpiece in one passing cut, several of the same type of unit can be used and set to complete the operation. The result of boring multiple bores in a component or workpiece SC in which a stepped profile of different increased diameter bores is produced longitudinally in one passing cut of the unit can be seen in FIG. 50. In FIG. 50 each individual boring bar or tool is adjusted in its two axis's of movement and set so that it bores one of the increased diameter bores seen here at the required longitudinal length. The result of a bore peeling operation to rapidly boring a larger diameter bore in a component or workpiece SD to a single increased bore diameter at very high feed rates can be seen in FIG. 51, where the smaller internal bore is a premachined bore or a machined bore and the bigger increased bore is the result of the bore peeling operation. In FIG. 51 each individual boring bar or tool is adjusted in its two axis's of movement so that they are all set to the same radial cut and height relative to the base. In this configuration several boring bars or tools engage at once to bore the same increased diameter bore in the component or workpiece which allows the passing cut of the Multicut Boring Bar Units feed rate to be dramatically increased.

The Multicut Boring Bar Unit is adjusted and set by the person using it to suit the procedure to be performed on the component or workpiece. The setting of the radial cut generally will be determined by the optimal depth the boring bar can bore an increased diameter bore in a component or workpiece. The Multicut Boring Bar Unit M10 can have as many boring bars or tools on the unit at once up to its maximum amount and depends on machining requirements and the people setting up the unit on how many are used. During machining operations the coolant nozzles in the base of the unit pump high pressure coolant through them to blast away the swarf from the cutting edge of the boring bars and the Multicut Boring Bar Unit. It will be appreciated that the universal tool mounting system for a machining centre, the Multicut Turning Unit M9 and the Multicut Boring Bar Unit M10 broadly consists in the parts, elements and features described in this specification, and is deemed to include any equivalents know in the art which, if substituted for the described integers, would not materially alter the substance of the invention.

Letter Designations for the Universal Tool Mounting System for a Machining Centre.

| Letter designations for the universal tool mounting system for a machining centre. | | | |
|---|---|---|---|
| A | drum A | B | spindle B |
| C | casting C | D | bearings D |
| E | tapered index pin E | F | tapered bush F |

| Letter designations for the universal tool mounting system for a machining centre. | | | |
|---|---|---|---|
| G | hydraulic cylinder G | H | tool holder unit station H |
| HA | gear teeth HA | HB | gear teeth HB |
| HC | gear teeth HC (located on AH) | I | bearings I |
| J | taper pins J | KA | tapered bush KA |
| KB | tapered bush KB | L | hydraulic cylinder L |
| M1 | cutting tool unit M1 | M2 | parting blade unit M2 |
| M3 | ninety degree milling unit M3 | M4 | cutting tool unit M4 |
| M5 | milling unit M5 | M6 | turning unit M6 |
| M7 | milling unit M7 | M8 | multiple tool type tool holder unit |
| M9 | multicut turning unit | M10 | multicut boring bar unit |
| N | taper N | O | location pins O |
| NA | taper NA (located on M1-M10 main bodies) | P | location pin holes P |
| | | Q | thread lock ring Q |
| R | thread R (located on M1-M10 on main bodies) | S | transmission drive shaft S |
| | | T | bearings T |
| U | spline in gear driving shaft of live tooling tool holder units | | |
| VA | position VA | VB | position VB |
| W | spindle and index drive unit W | XA | spline XA |
| XB | internal spline XB (located in shaft S) | XC | spline XC (located on shaft S) |
| Y | servo motor Y | Z | poly vee belt Z |
| AA | shaft AA | AB | ball screw AB |
| AC | poly vee belt AC | AD | servo motor AD |
| AE | index drive unit AE | | |
| AF | hydraulic cylinder AF (located in AE) | AG | servo motor AG |
| AH | shaft AH | AI | poly vee belt AI |
| AJ | poly vee belt AJ | AK | servo gear drive motor AK |
| AL | brake drum AL | AM | magnetic brake disc AM |
| AN | endplate AN | AO | pillars AO |
| AP | endplate AP | AQ | hole(s) AQ |
| AR | coolant manifold blocks AR | AS | pipes AS |
| AT | bearing nuts AT | | |
| AU | main body AU (the main body of H) | AV | bearing nuts AV |
| AW | main body AW | AX | main body AX |
| AY | hydraulic and distribution plate AY | AZ | motor mounting plate AZ (for AK) |
| BA | taper BA (on spindle B) | BB | BB end (BB end of spindle B) |
| BC | endplate BC | BD | recess hole BD |
| BE | brake and pulley drum BE | BF | big diameter end of BE |
| BG | Face BG (on spindle B) | BH | linear guideways BH |
| BI | tapered braking face BI (on BE) | BJ | sheet metal covers BJ |
| BK | holes BK (for AK) | BM | hydraulic cylinder (from G) |
| BN | Hydraulic endcap | BO | tapered bush BO |
| BP | hole BP (Hydraulic cylinder G's mounting hole) | | |
| BQ | Main hole BQ (in casting C) | | |
| BR | holes BR (Series of holes in back face of casting C) | | |
| BS | Threaded hole BS | BT | Hole BT (for taper pins J) |
| BU | Taper BU (on the back of drum A) | BV | Coolant manifold disc |
| BW | Coolant pipe | BX | hole BX |
| EA | Coolant distribution disc | EB | Hole EB (in the center of EA) |
| EC | Hole EC (middle hole in EA) | ED | Top hole ED (in EA) |
| LC | Location and connection configuration | | |
| CNC | Computer numerical control | FA | Tool/machining tool |
| IA | Bed | IB | Headstock |
| IC | Workpiece chuck | ID | Linear guideway |
| IE | Linear guideway | IF | Carriage |
| IG | Centreline IG | IH | Headstock spindle |

Letter Designations for the Multicut Tool Holder Units for the Universal Tool Mounting System for a Machining Centre.

| M9 Multicut turning unit. | | | |
|---|---|---|---|
| CA | base | CB | Tee slots |
| CC | Tee block | CE | Column |
| CF | Tool sliding block | CG | Tip insert |
| CI | Adjustment screw | CJ | Screw |
| CK | Coolant nozzle | CM | Cut threaded hole (in base CA) |
| CN | Inlet connector | CO | Guideway block |
| CQ | Columns vertical adjustment screw | CR | Grub screw |
| CS | Retainer ring | CT | Screw |
| CU | Screw | CV | Strengthening column |
| CW | Thread. | GA | Housing |
| GB | Tapered slot | GC | Recess pocket |
| GD | Tool holder block | GE | Tool holder block |
| GF | Adjustment screw | GG | Adjustable arm bracket |
| GH | Screw | GI | Tool |
| GJ | Adjustment screw | GK | Tool |
| GL | Grub screw | SA | Component or workpiece |
| | | SB | Component or workpiece |

| M10 Multicut boring bar unit. | | | |
|---|---|---|---|
| CA | Base | CB | Tee slots |
| CD | Adjustment screw | CH | Thread |
| CK | Coolant nozzle | CL | Tee block |
| CM | Cut threaded hole (in base CA) | CN | Inlet connector |
| CP | Hole CP | DA | Boring bar holder |
| DB | Vertical adjustment plate | DC | Vertical adjustment screw |
| DD | Grub screws | DE | Screws |
| DF | Tip insert | DG | Boring bars |
| DH | Retainer ring | DI | Boring bar bracket |
| DJ | Screws | SC | Component or workpiece |
| | | SD | Component or workpiece |

The invention claimed is:

1. A universal tool mounting system for a machining center, the universal tool mounting system comprising:

a drum (A) mounted on a spindle (B), which spindle is mounted inside bearings (D), which bearings are mounted in a casting (C), wherein the spindle (B) and drum (A) are mounted so as to be rotationally indexable about an indexing axis that extends in a direction from a front of the universal tool mounting system to a back of the universal tool mounting system;

tapered bushes (F) mounted into the spindle (B);

a brake drum (BE) mounted onto the back of the spindle (B);

a hydraulic cylinder (G) mounted in the front of the casting (C);

hydraulic distribution plates (AY) mounted onto the back of the casting (C);

at least one hydraulic cylinder (L) mounted onto the back of the drum (A);

a plurality of tool holder unit stations (H) spaced about the indexing axis and mounting into a front face of the drum (A);

a plurality of tool holder units (M1, M2, M3, M4, M5, M6, M7, M8, M9, M9', M9", M10), each tool holder unit mounted to a respective one of the tool holder unit stations, each of the tool holder units supporting a plurality of machining tools;

additional machining tools (FA), additional to the machining tools of the tool holder units, mounting on the drum (A);

coolant manifold blocks (AR) that mount onto the drum (A), which coolant manifold blocks are utilized for supplying coolant to the tools of the tool holder units;

a spindle-and-index drive unit (W) mounting to the side of the casting (C) on linear guideways (BH), the spindle-and-index drive unit (W) configured to selectively perform one of:

driving live ones of the tools mounted at one of the tool holder unit stations that is located at a first position (VA), which is a position about the indexing axis, and indexing one of the tool holder units mounted at one of the tool holder unit stations that is located at the first position (VA), which is a position about the indexing axis;

the universal tool mounting system further comprising:

a servo drive motor (AD) mounting to the top of the casting (C), the servo drive motor (AD) being configured to move the spindle-and-index drive unit (W) along on the linear guideways (BH);

an indexing drive unit (AE) mounted to the top of the casting (C) on further linear guideways (BH) the indexing drive unit (AE) configured for indexing one of the tool holder units located at one of the tool holder unit stations that is at a second position (VB) about the indexing axis;

a magnetic brake drum assembly mounted onto the hydraulic distribution plates (AY);

a servo gear drive motor (AK) configured for indexing the drum (A) about the indexing axis and mounted into the back of the casting (C); and sheet metal covers (BJ) mounted on the drum (A) and on the casting (C).

2. The universal tool mounting system for a machining center as claimed in claim 1, wherein the drum (A) includes:

a tapered hole at the back of the drum (A) for mounting the drum (A) onto the spindle (B);

tool holder unit stations (H) mounting holes (AQ); and recess holes (BD);

holes (BT) for taper pins (J), and clearance holes, each clearance hole for receiving a respective bush (KB).

3. The universal tool mounting system for a machining center as claimed in claim 1, wherein rotation of the drum (A) is locked by tapered index pins (E) driven by the hydraulic cylinder (G) that is in the casting (C) to engage into the tapered bushes (F) that are mounted in the spindle (B), wherein the engagement of the tapered index pins into the tapered bushes forms a rigid connection, and wherein when the rotational lock on the drum (A) is released by the tapered index pins (E) being removed from the tapered bushes (F), the drum (A) and the tool holder units are able to be indexed around the indexing axis.

4. The universal tool mounting system for a machining center as claimed in claim 1, wherein the at least one hydraulic cylinder (L) mounted onto the back of the drum (A) uses taper pins (J), which taper pins (J) are connected to a piston inside the respective at least one hydraulic cylinder (L), such that the taper pins (J) act as the hydraulic ram of the at least one hydraulic cylinder (L), to rotationally lock a respective one of the tool holder unit stations mounted in the drum (A) when the taper pins (J) are engaged into taper bushes (KA) of the respective one of the tool holder unit stations.

5. The universal tool mounting system for a machining center as claimed in claim 1, wherein the at least one hydraulic cylinder (L) that is mounted onto the back of the drum (A) includes a plurality of hydraulic cylinders (L).

6. The universal tool mounting system for a machining center as claimed in claim 1, wherein the tool holder unit stations each have gear teeth on the back end of them, and the gear teeth are used to index the respective tool holder unit that is attached to a respective one of the tool holder stations.

7. The universal tool mounting system for a machining center as claimed in claim 1, wherein a location and connection arrangement (LC) includes a male part of the location and connection arrangement and a female part of the location and connection arrangement, wherein a plurality of the location and connection arrangements are provided, such that the male and female parts of the respective location and connection arrangement (LC) are used to detachably mount a respective one of the tool holder units to a respective one of the tool holder unit stations (H), wherein the male part of a respective one of the location and connection arrangements is on the front of the respective tool holder unit station, and wherein the female part of a respective one of the location and connection arrangements is on a respective back face of a respective main body of a respective one of the tool holder units.

8. The universal tool mounting system for a machining center as claimed in claim 1, wherein the spindle-and-index drive unit (W) performs controlled movements in response to control signals sent from a programmed computer numerically controlled CNC controller unit, wherein the spindle-and-index drive unit (W) is operable to perform the indexing of one of the tool holder units mounted at one of the tool holder unit stations that is located at the first position (VA) about the indexing axis via the following:

the spindle-and-index drive unit (W) engaging into the tool holder unit station that is located in the first position (VA) about the indexing axis, by the spindle-and-indexing drive unit (W) moving forward towards the drum (A) on the linear guideways (BH) that are on the side of the casting (C) via activation of a ball screw (AB), so that gear teeth (HA) on the tool holder unit station that is located in the first position (VA) engage together with gear teeth (HB) of the spindle-and-index drive unit (W), then releasing taper pins (J) rotationally holding the one tool holder unit station in rotational position;

then activating a computer numerically controlled CNC motor (Y) of the spindle-and-index drive unit (W), which CNC motor (Y) drives a drive shaft (AA) and a vee belt (Z) to thus index the tool holder unit station, located in the first position (VA), around an axis, in order to present to a working position a different cutting tool of the plurality of machining tools of the tool holder unit located at the tool holder unit station that is located in the first position (VA).

9. The universal tool mounting system for a machining center as claimed in claim 1, wherein the spindle-and-index drive unit (W) acts as a spindle drive unit for driving live ones of the tools mounted at one of the tool holder units that is located at the first position (VA) about the indexing axis via the following:

engaging the spindle-and-indexing drive (W) into the tool holder unit station located at the first position (VA), by the spindle and index drive unit moving forward towards the drum (A) on the linear guideways (BH) that are on the side of the casting (C) via the activation of a ball screw (AB) so that a spline (XA) of the spindle-and-indexing drive (W) and a spline (XB) of the tool holder unit station that is located at the first position (VA) engage together but so that gear teeth (HA) of the tool holder unit station that is located at the first position (VA) and gear teeth (HB) of the spindle-and-index drive (W) do not engage together, wherein the spline (XB) of the tool holder unit station that is located at the first position (VA) is in a back end of a transmission drive shaft (S) mounted in the tool holder unit station that is located in the first position (VA), which tool holder unit station is rotatably mounted in the drum (A) in bearings (I), and wherein the transmission drive shaft (S) extends out the front of the drum and connects into a driving geared shaft of the tool holder located at the first position and having live ones of the tools, then activating a computer numerically controlled CNC motor (Y) of the spindle-and-index drive unit (W), which CNC motor (Y) drives a drive shaft (AA) and a vee belt (Z) in order to rotate the transmission drive shaft (S), in order to rotationally drive live tools of the tool holder unit located at the first position (VA) at machining speeds.

10. The universal tool mounting system for a machining center as claimed in claim 1, wherein the indexing drive unit (AE) is a preindexing drive unit and performs controlled movements in response to control signals sent from a programmed computer numerically controlled CNC controller unit, wherein the preindexing drive unit (AE) is operable to engage into the tool holder unit station that is located at the second position (VB) about the indexing axis, and to indexes the tool holder unit station that is located at the second position, via the following:

activating a hydraulic cylinder (AF) so as to move the indexing drive unit (AE) forward towards the drum (A) on the linear guideways (BH) that are on the top of the casting (C), so that gear teeth (HC) on a drive shaft (AH) of the indexing drive unit (AE) engage into gear teeth (HA) of the tool holder unit station that is located at the second position (VA), then by releasing taper pins (J) rotationally holding the tool holder unit station that is located at the second position, then activating a computer numerically controlled CNC motor (AG) of the indexing drive unit (AE), which CNC motor (AG) drives a vee belt (AI) and the drive shaft (AH) in order to index the tool holder unit station located at the second position (VB) around an axis, in order to adjust positions of the tools that are supported by the tool holder unit that is located at the tool holder unit station located at the second position (VB).

11. The universal tool mounting system for a machining center as claimed in claim 1, wherein the drum (A) includes at least one additional tool holder station on a peripheral face of the drum (A).

12. The universal tool mounting system for a machining center as claimed in claim 1, wherein the plurality of tool holder units includes a multicut boring bar unit (M10), the multicut boring bar unit (M10) comprising:

a base (CA), wherein the base has tee slots (CB), each of the tee slots having a respective threaded cut hole (CM) in the bottom of the respective tee slot for adjustment purposes, tee blocks (CL), each tee block mounting into a respective one of the tee slots, adjustment screws (CD), each adjustment screw mounted between a respective one of the tee blocks (CL) and a respective one of the threaded cut holes (CM), boring bar holders (DA) mounting onto the base (CA), grub screws (DD) mounting into each of the boring bar holders, adjusting screws (DC), each adjusting screw connecting into a respective one of the boring bar holders (DA), adjustment plates (DB), each adjustment plate (DB) connected to a respective one of the adjusting screws (DC), boring bars (DG), each boring bar (DB) mounting into a respective one of the boring bar holders (DA), wherein the boring bar holders (DA) are held to the base (CA) via the tee blocks (CL), wherein a coolant nozzle (CK) and an inlet connector (CN) mount into the base (CA), wherein a respective cutting tip insert (DF) mounts into each of the boring bars (DG), wherein a respective boring bar bracket (DI) mounts to each of the boring bars (DG) with screws (DJ), and wherein a retainer ring (DH) mounts to the boring bar brackets (DI) with screws (DJ).

13. The universal tool mounting system for a machining center as claimed in claim 12, wherein all the attached boring bars (DG) of the multicut boring bar unit (M10) are adjusted in two directions, wherein one of the two directions is a radial cut direction, wherein radial is with respect to a center of the multicut boring bar unit (M10), wherein each of the adjustment screws (CD) is connected to a respective one of the threaded cut holes, and adjusts the respective boring bar holder in the radial cut direction along the respective tee slot by rotating the respective adjustment screw in a clockwise or anticlockwise direction, and wherein the other of the two directions is a height adjustment direction, wherein each of the boring bars is held loosely in a respective one of the boring bar holders and is held tightly in a respective one of the adjustment plates so that when the respective adjustment screw is turned in a clockwise or anticlockwise direction, the height of the respective boring bar with respect to the respective boring bar holder is adjusted.

14. The universal tool mounting system for a machining center as claimed in claim 12, wherein the boring bar brackets are attached to the boring bars, with the retainer ring being attached to the boring bar brackets, in order to hold the boring bars in a rigid state to reduce the vibration from cutting forces imposed when machining components.

15. The universal tool mounting system for a machining center as claimed in claim 12, wherein in operation, the multicut boring bar unit (M10) is capable of performing:

boring of multiple diameter bores in a component or workpiece in which a stepped profile of different increased diameter bores is produced longitudinally with respect to a longitudinal direction of the workpiece in one passing cut of the multicut boring bar unit (M10) in the longitudinal direction, cutting a partial depth thread or complete depth thread in a component or workpiece, or performing bore peeling operations where multiple tools of the multicut boring bar unit (M10) are used to bore a hole in a component or workpiece to a single increased diameter.

16. The universal tool mounting system for a machining center as claimed in claim 1, wherein the plurality of tool holder units includes a multicut turning unit (M9), which multicut turning unit (M9) comprises:

a base (CA), wherein the base has tee slots (CB), each of the tee slots (CB) having a respective threaded cut hole (CM) in the bottom of the respective tee slot for adjustment purposes, tee blocks (CC) each tee block (CC) mounting into a respective one of the tee slots, adjustment screws (CI), each adjustment screw mounted between a respective one of the tee blocks (CC) and a respective one of the threaded cut holes (CM), columns (CE) mounting into the base (CA), wherein a respective screw (CJ) mounts into each of the columns (CE) to secure the respective column to a respective one of the tee blocks (CC) and to secure the respective column to the base (CA), tool sliding blocks (CF), each tool sliding block being linearly adjustable via a respective height adjusting screw (CQ) and being linearly guided via a respective guideway block (CO), wherein each of the tool sliding blocks, each of the height adjusting screws, and each of the guideway blocks are attached to a respective one of the columns (CE), wherein a respective grub screw (CR) secures each respective tool sliding block (CF) to a respective column (CE), wherein a retainer ring (CS) is attached to the top of the columns (CE) with screws, wherein a strengthening columnar member (CV) is attached to the base (CA), and wherein an inlet connector (CN) and a coolant nozzle (CK) are attached to the base (CA).

17. The universal tool mounting system for a machining center as claimed in claim 16, wherein each of the columns (CE) has a round outside surface and has one or more flat sides running down the length of the respective column for clamping a respective one of the guideway blocks (CO) against the respective column, and for preventing rotational movement of a respective one of the tool sliding blocks (CF), wherein each of the tool sliding blocks has a cavity to hold a respective tip insert, a hole in the middle of the respective sliding block to mount the respective sliding block onto a respective one of the columns (CE), and one or more cavities around this hole to mount the guideway blocks into, and wherein each of the tool sliding blocks has grub screw holes therein so that when a grub screw is tightened adequately in respective ones of the grub screw holes, the respective grub screw holds the respective one of the guideway blocks (CO) in a fixed position with respect to the respective column, and also holds the respective tool sliding block with respect to the respective column in a fixed height position on the respective column.

18. The universal tool mounting system for a machining center as claimed in claim 16, wherein the sliding blocks (CF) are each adapted to hold a respective cutting tip insert, and wherein the cutting tip inserts of the multicut turning unit (M9) can be adjusted in two directions, wherein one of the two directions is a radial cut direction, wherein radial is with respect to a center axis of the multicut turning unit, wherein each of the adjustment screws (CI) is connected to a respective one of the threaded cut holes, and adjusts the respective column in the radial cut direction along the respective tee slot by rotating the respective adjustment screw in a clockwise or anticlockwise direction, and wherein the other of the two directions is a height adjustment direction, wherein each of the height adjusting screws is attached to a respective adjustment plate connected to an end of the respective column, and wherein when the respective height adjusting screw is turned in a clockwise or anticlockwise direction, the respective sliding block and connected guideway block slide up and down the respective column, moving the respective sliding block towards or away from the base.

19. The universal tool mounting system for a machining center as claimed in claim 16, wherein the retainer ring is attached to the top of the columns and locked into place with screws, in order to hold the columns in a rigid state to reduce vibration from cutting forces imposed when machining components.

20. The universal tool mounting system for a machining center as claimed in claim 16, wherein in operation, the multicut turning unit (M9) is capable of performing:

turning of multiple diameters on a component in which a stepped profile of different reduced diameters is produced longitudinally with respect to a longitudinal direction of the workpiece in one passing cut of the multicut turning unit in the longitudinal direction, cutting a thread on a component, or performing bar peeling operations where multiple tools of the multicut turning unit (M9) are used to turn a component to a single reduced diameter.

21. The universal tool mounting system for a machining center as claimed in claim 16, wherein the multicut turning unit (M9) is automated and controlled with computer numerically controlled CNC programming.

22. The universal tool mounting system for a machining center as claimed in claim 1, wherein the additional machining tools mount onto a peripheral surface of the drum (A).

23. The universal tool mounting system for a machining center as claimed in claim 1, wherein the servo drive motor (AD) that is mounted to the top of the casting (C) and the servo gear drive motor (AK) that is mounted into the back of the casting (C) are both controlled by a programmed computer numerically controlled CNC controller unit.

24. The universal tool mounting system for a machining center as claimed in claim 1, wherein the universal tool mounting system is mounted onto a lathe, wherein the lathe includes a headstock supporting a workpiece spindle to which a workpiece chuck is mounted for rotation about a rotation axis;

wherein the lathe includes a tailstock having a subspindle that is mounted for rotation about said rotation axis;

wherein the spindle-and-index drive unit (W) is configured to index the one of the tool holder units that is mounted at the one of the tool holder unit stations that is located at the first position (VA), which indexing is an indexing about a pivot axis offset from said indexing axis of the drum (A);

and wherein said rotation axis, said indexing axis, and said pivot axis are all located in a common plane.

* * * * *